(12) United States Patent
Baumann et al.

(10) Patent No.: US 8,228,590 B2
(45) Date of Patent: Jul. 24, 2012

(54) ELECTRO-OPTIC SYSTEM CONFIGURED TO REDUCE A PERCEIVED COLOR CHANGE

(75) Inventors: Kelvin L. Baumann, Holland, MI (US); John A. VanderPloeg, Zeeland, MI (US); David A. Theiste, Byron Center, MI (US); Thomas F. Guarr, Holland, MI (US); Henry W. Luten, Holland, MI (US); George A. Neuman, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 12/852,790

(22) Filed: Aug. 9, 2010

(65) Prior Publication Data

US 2012/0033285 A1   Feb. 9, 2012

(51) Int. Cl.
*G02F 1/153* (2006.01)
(52) U.S. Cl. .......................... 359/267; 359/265
(58) Field of Classification Search .................. 359/267
See application file for complete search history.

(56) References Cited

U.S. PATENT DOCUMENTS

| | | |
|---|---|---|
| 3,280,701 A | 10/1966 | Donnelly et al. |
| 4,187,316 A | 2/1980 | Metcalf et al. |
| 4,297,401 A | 10/1981 | Chern et al. |
| 4,308,316 A | 12/1981 | Gordon |
| 4,418,102 A | 11/1983 | Ferrato |
| 4,419,386 A | 12/1983 | Gordon |
| 4,440,822 A | 4/1984 | Gordon |
| 4,588,267 A | 5/1986 | Pastore |
| 4,630,904 A | 12/1986 | Pastore |
| 4,695,490 A | 9/1987 | McClelland et al. |
| 4,741,603 A | 5/1988 | Miyagi et al. |
| 4,882,565 A | 11/1989 | Gallmeyer |
| 4,902,108 A | 2/1990 | Byker |

(Continued)

FOREIGN PATENT DOCUMENTS

CA     1031346     5/1978

(Continued)

OTHER PUBLICATIONS

U.S. Appl. No. 12/691,830, filed Jan. 22, 2010, by Tonar et al.

(Continued)

*Primary Examiner* — James Jones
(74) *Attorney, Agent, or Firm* — Price Heneveld LLP; Scott P. Ryan

(57) ABSTRACT

An electro-optic system is provided that includes a front element having first and second surfaces, a rear element including third and fourth surfaces, wherein the front and rear elements are sealably bonded together in a spaced-apart relationship to define a chamber, and an electro-optic medium contained in the chamber, and the electro-optic medium is adapted to be in at least a high transmittance state and a low transmittance state. The electro-optic system further includes a display device in optical communication with the electro-optic element, the display device including at least one light source and is configured to emit at least a first primary and a second primary, the first and second primaries each having a first hue ($h_{ab}$) when viewed through the electro-optic element in approximately the high transmittance state and a second hue ($h_{ab}'$) when viewed through the electro-optic element in approximately the low transmittance state, wherein a change in the first and second hues ($\Delta h_{ab}$) for both first and second primaries is less than approximately 31 degrees.

42 Claims, 39 Drawing Sheets

U.S. PATENT DOCUMENTS

| | | | |
|---|---|---|---|
| 4,917,477 A | 4/1990 | Bechtel et al. |
| 5,014,167 A | 5/1991 | Roberts |
| 5,066,112 A | 11/1991 | Lynam et al. |
| 5,069,535 A | 12/1991 | Baucket et al. |
| 5,076,673 A | 12/1991 | Lynam et al. |
| 5,115,346 A | 5/1992 | Lynam |
| 5,128,799 A | 7/1992 | Byker |
| 5,136,419 A | 8/1992 | Shabrang |
| 5,189,537 A | 2/1993 | O'Farrell |
| 5,202,787 A | 4/1993 | Byker et al. |
| 5,204,778 A | 4/1993 | Bechtel |
| 5,207,492 A | 5/1993 | Roberts |
| 5,253,109 A | 10/1993 | O'Farrell et al. |
| 5,278,693 A | 1/1994 | Theiste et al. |
| 5,280,380 A | 1/1994 | Byker |
| 5,282,077 A | 1/1994 | Byker |
| 5,285,060 A | 2/1994 | Larson et al. |
| 5,294,376 A | 3/1994 | Byker |
| 5,313,335 A | 5/1994 | Gray et al. |
| 5,336,448 A | 8/1994 | Byker |
| 5,355,284 A | 10/1994 | Roberts |
| 5,361,190 A | 11/1994 | Roberts et al. |
| 5,395,698 A | 3/1995 | Neuman et al. |
| 5,416,313 A | 5/1995 | Larson et al. |
| 5,426,568 A | 6/1995 | Lamers et al. |
| 5,434,407 A | 7/1995 | Bauer et al. |
| 5,446,576 A | 8/1995 | Lynam et al. |
| 5,448,397 A | 9/1995 | Tonar |
| 5,451,822 A | 9/1995 | Bechtel et al. |
| 5,481,409 A | 1/1996 | Roberts |
| 5,500,760 A | 3/1996 | Varaprasad et al. |
| 5,504,478 A | 4/1996 | Knapp |
| 5,528,422 A | 6/1996 | Roberts |
| 5,587,699 A | 12/1996 | Faloon et al. |
| 5,596,023 A | 1/1997 | Tsubota et al. |
| 5,596,024 A | 1/1997 | Horie et al. |
| 5,619,374 A | 4/1997 | Roberts |
| 5,619,375 A | 4/1997 | Roberts |
| 5,660,457 A | 8/1997 | Lyons |
| 5,668,663 A | 9/1997 | Varaprasad et al. |
| 5,669,704 A | 9/1997 | Pastrick |
| 5,669,705 A | 9/1997 | Pastrick et al. |
| 5,724,187 A | 3/1998 | Varaprasad et al. |
| D394,833 S | 6/1998 | Muth |
| 5,760,962 A | 6/1998 | Schofield et al. |
| 5,788,357 A | 8/1998 | Muth et al. |
| 5,818,625 A | 10/1998 | Forgette et al. |
| 5,825,527 A | 10/1998 | Forgette et al. |
| 5,863,116 A | 1/1999 | Pastrick et al. |
| 5,883,605 A | 3/1999 | Knapp |
| D409,540 S | 5/1999 | Muth |
| 5,928,572 A | 7/1999 | Tonar et al. |
| 5,929,786 A | 7/1999 | Schofield et al. |
| 5,940,201 A | 8/1999 | Ash et al. |
| 5,959,367 A | 9/1999 | O'Farrell et al. |
| 5,998,617 A | 12/1999 | Srinivasa et al. |
| 6,005,724 A | 12/1999 | Todd |
| 6,007,222 A | 12/1999 | Thau |
| 6,020,987 A | 2/2000 | Baumann et al. |
| 6,037,471 A | 3/2000 | Srinivasa et al. |
| 6,045,243 A | 4/2000 | Muth et al. |
| D425,466 S | 5/2000 | Todd et al. |
| D426,506 S | 6/2000 | Todd et al. |
| D426,507 S | 6/2000 | Todd et al. |
| D427,128 S | 6/2000 | Mathieu |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,106,121 A | 8/2000 | Buckley et al. |
| 6,111,684 A | 8/2000 | Forgette et al. |
| 6,141,137 A | 10/2000 | Byker et al. |
| 6,142,656 A | 11/2000 | Kurth |
| 6,157,480 A | 12/2000 | Anderson et al. |
| 6,163,083 A | 12/2000 | Kramer et al. |
| 6,166,848 A | 12/2000 | Cammenga et al. |
| 6,170,956 B1 | 1/2001 | Rumsey et al. |
| 6,175,164 B1 | 1/2001 | O'Farrell et al. |
| 6,176,602 B1 | 1/2001 | Pastrick et al. |
| 6,222,177 B1 | 4/2001 | Bechtel et al. |
| 6,359,274 B1 | 3/2002 | Nixon et al. |
| 6,379,013 B1 | 4/2002 | Bechtel et al. |
| 6,402,328 B1 | 6/2002 | Bechtel et al. |
| 6,521,916 B2 | 2/2003 | Roberts et al. |
| 6,550,949 B1 | 4/2003 | Bauer et al. |
| 6,639,360 B2 | 10/2003 | Roberts et al. |
| 6,700,692 B2 | 3/2004 | Tonar et al. |
| 6,870,655 B1 | 3/2005 | Northman et al. |
| 6,980,092 B2 | 12/2005 | Turnball et al. |
| 7,253,448 B2 | 8/2007 | Roberts et al. |
| 7,256,924 B2 | 8/2007 | Guarr et al. |
| 7,342,707 B2 | 3/2008 | Roberts et al. |
| 7,417,781 B2 | 8/2008 | Tonar et al. |
| 7,428,091 B2 | 9/2008 | Baumann et al. |
| 7,489,031 B2 | 2/2009 | Roberts et al. |
| 7,524,097 B2 | 4/2009 | Turnbull et al. |
| 7,543,946 B2 | 6/2009 | Ockerse et al. |
| 7,567,291 B2 | 7/2009 | Bechtel et al. |
| 7,679,809 B2 | 3/2010 | Tonar et al. |
| 7,688,495 B2 | 3/2010 | Tonar et al. |
| 7,719,185 B2 | 5/2010 | Jin et al. |
| 7,746,534 B2 | 6/2010 | Tonar et al. |
| 7,869,113 B2 | 1/2011 | Jang et al. |
| 2006/0061530 A1* | 3/2006 | Yuasa ............... 345/88 |
| 2007/0201122 A1 | 8/2007 | Dozeman et al. |
| 2007/0206263 A1 | 9/2007 | Neuman et al. |
| 2008/0068520 A1 | 3/2008 | Minikey, Jr. et al. |
| 2008/0266642 A1 | 10/2008 | Burrell et al. |
| 2008/0302657 A1 | 12/2008 | Luten et al. |
| 2008/0310005 A1 | 12/2008 | Tonar et al. |
| 2009/0002822 A1 | 1/2009 | Tonar et al. |
| 2009/0040588 A1 | 2/2009 | Tonar et al. |
| 2009/0096937 A1 | 4/2009 | Bauer et al. |
| 2009/0207343 A1 | 8/2009 | Mifune |
| 2009/0207513 A1 | 8/2009 | Luten et al. |
| 2009/0296190 A1 | 12/2009 | Anderson et al. |
| 2010/0073754 A1 | 3/2010 | Baumann |
| 2010/0110553 A1 | 5/2010 | Anderson et al. |
| 2010/0215903 A1 | 8/2010 | Tonar |

FOREIGN PATENT DOCUMENTS

| | | |
|---|---|---|
| CA | 2028461 | 11/1994 |
| EP | 0450162 | 12/1990 |
| EP | 0728618 | 8/1996 |
| EP | 0769419 | 4/1997 |
| GB | 2326489 | 12/1998 |
| JP | 56143416 | 9/1981 |
| KR | 1020030072123 | 9/2003 |
| WO | 9530495 | 11/1995 |

OTHER PUBLICATIONS

U.S. Appl. No. 09/001,855, filed Dec. 31, 1997, by Bechtel.

"Lab color space," Wikipedia, 7 pages, Jun. 11, 2010, Found at: http://en.wikipedia.org/wiki/Lab_color_space.

"CIE 1931 color space," Wikipedia, 10 pages, Jun. 7, 2010, Found at: http://en.wikipedia.org/wiki/CIE_1931_color_space.

G.C. de Cries, "Electrochromic variable transmission glass for picture tubes," *Electrochimica Acta* 44, pp. 3185-3193, (1999).

U.S. 5,698,709, (withdrawn).

Patent Cooperation Treaty, International Searching Authority, International Search Report, Written Opinion of the International Searching Authority and Notification of Transmittal, Feb. 17, 2012, 12 pages.

* cited by examiner

| LED | ΔEu',v' (PRIOR ART) | ΔEu',v' |
|---|---|---|
| RED | 0.010 | 0.019 |
| GREEN | 0.065 | 0.036 |
| BLUE | 0.094 | 0.046 |
| WHITE | 0.091 | 0.059 |
| YELLOW | 0.097 | 0.055 |
| AMBER | 0.114 | 0.060 |

|  | EXAMPLE 1 (PRIOR ART) | | | EXAMPLE 2 | | |
|---|---|---|---|---|---|---|
|  | RED | | | RED | | |
|  | u' | v' | $h_{ab}$ | u' | v' | $h_{ab}$ |
| HIGH T | 0.4046 | 0.5304 | 39.532821 | 0.4068 | 0.5305 | 40.312374 |
| INT T | 0.3998 | 0.5281 | 36.693982 | 0.404 | 0.5278 | 36.950414 |
| LOW T | 0.3993 | 0.5214 | 20.260877 | 0.4003 | 0.5199 | 25.629261 |
| ΔEu'v' | 0.010445 | | | 0.012434 | | |
|  | GREEN | | | GREEN | | |
|  | u' | v' | $h_{ab}$ | u' | v' | $h_{ab}$ |
| HIGH T | 0.1572 | 0.5638 | 123.78843 | 0.1596 | 0.5638 | 123.77408 |
| INT T | 0.1315 | 0.5642 | 137.19527 | 0.1472 | 0.5638 | 130.50541 |
| LOW T | 0.0918 | 0.5621 | 155.32353 | 0.1095 | 0.5634 | 148.78453 |
| ΔEu'v' | 0.065422 | | | 0.050102 | | |
|  | BLUE | | | BLUE | | |
|  | u' | v' | $h_{ab}$ | u' | v' | $h_{ab}$ |
| HIGH T | 0.1278 | 0.321 | 90.797968 | 0.1276 | 0.3217 | 91.867117 |
| INT T | 0.1134 | 0.3504 | 103.46725 | 0.1275 | 0.318 | 91.27702 |
| LOW T | 0.0859 | 0.4046 | 132.01785 | 0.1092 | 0.354 | 106.91655 |
| ΔEu'v' | 0.093512 | | | 0.037173 | | |
|  | YELLOW | | | YELLOW | | |
|  | u' | v' | $h_{ab}$ | u' | v' | $h_{ab}$ |
| HIGH T | 0.2248 | 0.5548 | 89.714233 | 0.2287 | 0.5546 | 89.560595 |
| INT T | 0.1879 | 0.5565 | 110.15056 | 0.2104 | 0.5555 | 98.882972 |
| LOW T | 0.1277 | 0.5571 | 145.10003 | 0.1557 | 0.5565 | 132.09673 |
| ΔEu'v' | 0.097127 | | | 0.073025 | | |
|  | AMBER | | | AMBER | | |
|  | u' | v' | $h_{ab}$ | u' | v' | $h_{ab}$ |
| HIGH T | 0.3061 | 0.5425 | 56.57025 | 0.3099 | 0.5421 | 56.687906 |
| INT T | 0.2688 | 0.5439 | 65.738873 | 0.292 | 0.542 | 59.40306 |
| LOW T | 0.192 | 0.5454 | 112.18612 | 0.2313 | 0.5429 | 84.136208 |
| ΔEu'v' | 0.114137 | | | 0.078604 | | |
|  | WHITE | | | WHITE | | |
|  | u' | v' |  | u' | v' |  |
| HIGH T | 0.2046 | 0.5062 |  | 0.2082 | 0.5072 |  |
| INT T | 0.1697 | 0.5058 |  | 0.1915 | 0.5009 |  |
| LOW T | 0.1133 | 0.5115 |  | 0.1423 | 0.4978 |  |
| ΔEu'v' | 0.091454 | | | 0.066567 | | |

FIG. 17A

|  | EXAMPLE 3 | | | | EXAMPLE 4 | | |
| --- | --- | --- | --- | --- | --- | --- | --- |
|  | RED | | | | RED | | |
|  | u' | v' | $h_{ab}$ | | u' | v' | $h_{ab}$ |
| HIGH T | 0.4072 | 0.5308 | 40.791361 | HIGH T | 0.4074 | 0.5304 | 40.275933 |
| INT T | 0.4022 | 0.5256 | 34.536274 | INT T | 0.4034 | 0.5262 | 35.210429 |
| LOW T | 0.4033 | 0.5178 | 18.566187 | LOW T | 0.4004 | 0.5166 | 17.268353 |
| $\Delta$Eu'v' | | 0.013572 | | $\Delta$Eu'v' | | 0.015474 | |
|  | GREEN | | | | GREEN | | |
|  | u' | v' | $h_{ab}$ | | u' | v' | $h_{ab}$ |
| HIGH T | 0.1595 | 0.5637 | 123.7974 | HIGH T | 0.1596 | 0.5636 | 123.78792 |
| INT T | 0.1369 | 0.564 | 135.65179 | INT T | 0.1404 | 0.564 | 133.88486 |
| LOW T | 0.1023 | 0.563 | 151.78383 | LOW T | 0.1019 | 0.5631 | 151.82628 |
| $\Delta$Eu'v' | | 0.057204 | | $\Delta$Eu'v' | | 0.057702 | |
|  | BLUE | | | | BLUE | | |
|  | u' | v' | $h_{ab}$ | | u' | v' | $h_{ab}$ |
| HIGH T | 0.1275 | 0.3217 | 91.889726 | HIGH T | 0.1279 | 0.3216 | 91.745764 |
| INT T | 0.1265 | 0.3177 | 91.601143 | INT T | 0.1289 | 0.3129 | 89.815909 |
| LOW T | 0.1055 | 0.36 | 110.14911 | LOW T | 0.108 | 0.3555 | 107.8967 |
| $\Delta$Eu'v' | | 0.044169 | | $\Delta$Eu'v' | | 0.039309 | |
|  | YELLOW | | | | YELLOW | | |
|  | u' | v' | $h_{ab}$ | | u' | v' | $h_{ab}$ |
| HIGH T | 0.2285 | 0.5546 | 89.544764 | HIGH T | 0.2287 | 0.5546 | 89.568226 |
| INT T | 0.195 | 0.5555 | 107.93792 | INT T | 0.1998 | 0.5555 | 105.02635 |
| LOW T | 0.1436 | 0.5565 | 138.81735 | LOW T | 0.1439 | 0.5565 | 138.59927 |
| $\Delta$Eu'v' | | 0.084921 | | $\Delta$Eu'v' | | 0.084821 | |
|  | AMBER | | | | AMBER | | |
|  | u' | v' | $h_{ab}$ | | u' | v' | $h_{ab}$ |
| HIGH T | 0.3092 | 0.5424 | 57.036911 | HIGH T | 0.3114 | 0.5422 | 56.533878 |
| INT T | 0.2754 | 0.5418 | 63.129907 | INT T | 0.2827 | 0.5417 | 61.172772 |
| LOW T | 0.2135 | 0.5426 | 97.267507 | LOW T | 0.2173 | 0.5417 | 94.07589 |
| $\Delta$Eu'v' | | 0.0957 | | $\Delta$Eu'v' | | 0.094101 | |
|  | WHITE | | | | WHITE | | |
|  | u' | v' | | | u' | v' | |
| HIGH T | 0.208 | 0.507 | | HIGH T | 0.2081 | 0.5068 | |
| INT T | 0.1778 | 0.4948 | | INT T | 0.1821 | 0.4951 | |
| LOW T | 0.1313 | 0.4971 | | LOW T | 0.1326 | 0.4948 | |
| $\Delta$Eu'v' | | 0.077336 | | $\Delta$Eu'v' | | 0.076448 | |

FIG. 17B

|  | EXAMPLE 5 | | | | EXAMPLE 6 | | |
| --- | --- | --- | --- | --- | --- | --- | --- |
|  | RED | | | | RED | | |
|  | u' | v' | $h_{ab}$ |  | u' | v' | $h_{ab}$ |
| HIGH T | 0.4059 | 0.5304 | 39.921925 | HIGH T | 0.407367 | 0.530653 | 40.386586 |
| INT T | 0.4013 | 0.5261 | 34.783092 | INT T | 0.402336 | 0.526631 | 35.466319 |
| LOW T | 0.3984 | 0.5187 | 18.857422 | LOW T | 0.402209 | 0.517855 | 18.146529 |
| $\Delta Eu'v'$ |  | 0.013897 |  | $\Delta Eu'v'$ |  | 0.013799 |  |
|  | GREEN | | | | GREEN | | |
|  | u' | v' | $h_{ab}$ |  | u' | v' | $h_{ab}$ |
| HIGH T | 0.16 | 0.5637 | 123.52008 | HIGH T | 0.159544 | 0.563561 | 123.76744 |
| INT T | 0.1366 | 0.5643 | 135.68256 | INT T | 0.134644 | 0.564068 | 136.68646 |
| LOW T | 0.099 | 0.5631 | 152.99054 | LOW T | 0.096686 | 0.562613 | 154.02066 |
| $\Delta Eu'v'$ |  | 0.061003 |  | $\Delta Eu'v'$ |  | 0.062865 |  |
|  | BLUE | | | | BLUE | | |
|  | u' | v' | $h_{ab}$ |  | u' | v' | $h_{ab}$ |
| HIGH T | 0.1272 | 0.323 | 92.145455 | HIGH T | 0.127029 | 0.322123 | 91.94672 |
| INT T | 0.1221 | 0.3291 | 95.481389 | INT T | 0.119536 | 0.335432 | 97.756607 |
| LOW T | 0.0998 | 0.374 | 116.30951 | LOW T | 0.095631 | 0.384536 | 121.44812 |
| $\Delta Eu'v'$ |  | 0.057894 |  | $\Delta Eu'v'$ |  | 0.069866 |  |
|  | YELLOW | | | | YELLOW | | |
|  | u' | v' | $h_{ab}$ |  | u' | v' | $h_{ab}$ |
| HIGH T | 0.2286 | 0.5546 | 89.395137 | HIGH T | 0.228135 | 0.554673 | 89.495554 |
| INT T | 0.1946 | 0.5561 | 107.85015 | INT T | 0.192185 | 0.556055 | 109.19656 |
| LOW T | 0.139 | 0.5568 | 141.13548 | LOW T | 0.135676 | 0.557027 | 142.35369 |
| $\Delta Eu'v'$ |  | 0.089627 |  | $\Delta Eu'v'$ |  | 0.092489 |  |
|  | AMBER | | | | AMBER | | |
|  | u' | v' | $h_{ab}$ |  | u' | v' | $h_{ab}$ |
| HIGH T | 0.3129 | 0.542 | 55.869781 | HIGH T | 0.314925 | 0.541571 | 55.151677 |
| INT T | 0.2795 | 0.542 | 61.970133 | INT T | 0.279766 | 0.542137 | 61.991686 |
| LOW T | 0.213 | 0.5427 | 97.545105 | LOW T | 0.211455 | 0.542687 | 98.579769 |
| $\Delta Eu'v'$ |  | 0.099902 |  | $\Delta Eu'v'$ |  | 0.103476 |  |
|  | WHITE | | | | WHITE | | |
|  | u' | v' |  |  | u' | v' |  |
| HIGH T | 0.208 | 0.5076 |  | HIGH T | 0.207559 | 0.507101 |  |
| INT T | 0.1767 | 0.5 |  | INT T | 0.17408 | 0.501113 |  |
| LOW T | 0.1266 | 0.5012 |  | LOW T | 0.12291 | 0.504696 |  |
| $\Delta Eu'v'$ |  | 0.081651 |  | $\Delta Eu'v'$ |  | 0.084682 |  |

FIG. 17C

| | EXAMPLE 7 | | | | EXAMPLE 8 | | |
|---|---|---|---|---|---|---|---|
| | RED | | | | RED | | |
| | u' | v' | $h_{ab}$ | | u' | v' | $h_{ab}$ |
| HIGH T | 0.4068 | 0.5307 | 40.112942 | HIGH T | 0.4064 | 0.5306 | 40.157991 |
| INT T | 0.4029 | 0.5253 | 33.665512 | INT T | 0.4028 | 0.524 | 32.616321 |
| LOW T | 0.406 | 0.5152 | 17.924193 | LOW T | 0.4023 | 0.5156 | 19.96418 |
| $\Delta Eu'v'$ | 0.015521 | | | $\Delta Eu'v'$ | 0.01555 | | |
| | GREEN | | | | GREEN | | |
| | u' | v' | $h_{ab}$ | | u' | v' | $h_{ab}$ |
| HIGH T | 0.1597 | 0.5638 | 123.68637 | HIGH T | 0.1595 | 0.5637 | 123.58285 |
| INT T | 0.1436 | 0.564 | 132.33039 | INT T | 0.1412 | 0.5636 | 133.66404 |
| LOW T | 0.1117 | 0.5634 | 148.11838 | LOW T | 0.1131 | 0.5633 | 147.21315 |
| $\Delta Eu'v'$ | 0.048002 | | | $\Delta Eu'v'$ | 0.046402 | | |
| | BLUE | | | | BLUE | | |
| | u' | v' | $h_{ab}$ | | u' | v' | $h_{ab}$ |
| HIGH T | 0.1272 | 0.3237 | 92.164104 | HIGH T | 0.1274 | 0.3221 | 91.774848 |
| INT T | 0.1339 | 0.301 | 85.881767 | INT T | 0.135 | 0.2963 | 84.681479 |
| LOW T | 0.1192 | 0.3295 | 96.619866 | LOW T | 0.1222 | 0.3217 | 93.887341 |
| $\Delta Eu'v'$ | 0.009881 | | | $\Delta Eu'v'$ | 0.005215 | | |
| | YELLOW | | | | YELLOW | | |
| | u' | v' | $h_{ab}$ | | u' | v' | $h_{ab}$ |
| HIGH T | 0.2281 | 0.5546 | 89.369232 | HIGH T | 0.2276 | 0.5548 | 89.558284 |
| INT T | 0.2037 | 0.5552 | 102.49074 | INT T | 0.1996 | 0.555 | 104.8583 |
| LOW T | 0.1571 | 0.5558 | 132.03302 | LOW T | 0.1582 | 0.5554 | 131.17961 |
| $\Delta Eu'v'$ | 0.07101 | | | $\Delta Eu'v'$ | 0.069403 | | |
| | AMBER | | | | AMBER | | |
| | u' | v' | $h_{ab}$ | | u' | v' | $h_{ab}$ |
| HIGH T | 0.3148 | 0.5419 | 55.293126 | HIGH T | 0.3133 | 0.5419 | 55.636668 |
| INT T | 0.2908 | 0.5403 | 57.046867 | INT T | 0.2852 | 0.5401 | 58.293727 |
| LOW T | 0.2377 | 0.5397 | 76.962042 | LOW T | 0.238 | 0.539 | 76.347417 |
| $\Delta Eu'v'$ | 0.077131 | | | $\Delta Eu'v'$ | 0.075356 | | |
| | WHITE | | | | WHITE | | |
| | u' | v' | | | u' | v' | |
| HIGH T | 0.2079 | 0.5084 | | HIGH T | 0.2073 | 0.5073 | |
| INT T | 0.1867 | 0.493 | | INT T | 0.183 | 0.4887 | |
| LOW T | 0.1443 | 0.4882 | | LOW T | 0.1465 | 0.4845 | |
| $\Delta Eu'v'$ | 0.066731 | | | $\Delta Eu'v'$ | 0.064934 | | |

FIG. 17D

|  | EXAMPLE 9 | | | EXAMPLE 10 | | |
|---|---|---|---|---|---|---|
| RED | | | | | | |
|  | u' | v' | $h_{ab}$ | u' | v' | $h_{ab}$ |
| HIGH T | 0.4062 | 0.5304 | 40.053651 | 0.4076 | 0.5305 | 40.153284 |
| INT T | 0.4017 | 0.5246 | 33.227684 | 0.4031 | 0.5231 | 31.700072 |
| LOW T | 0.3987 | 0.5156 | 22.741947 | 0.4012 | 0.5129 | 21.048188 |
| $\Delta Eu'v'$ | 0.016592 | | | 0.018728 | | |
| GREEN | | | | | | |
|  | u' | v' | $h_{ab}$ | u' | v' | $h_{ab}$ |
| HIGH T | 0.1599 | 0.5637 | 123.74355 | 0.1599 | 0.5637 | 123.52778 |
| INT T | 0.1392 | 0.5644 | 134.29372 | 0.144 | 0.5638 | 132.14892 |
| LOW T | 0.1143 | 0.5656 | 145.00874 | 0.1236 | 0.5643 | 141.86609 |
| $\Delta Eu'v'$ | 0.04564 | | | 0.036305 | | |
| BLUE | | | | | | |
|  | u' | v' | $h_{ab}$ | u' | v' | $h_{ab}$ |
| HIGH T | 0.1276 | 0.3217 | 91.800198 | 0.1271 | 0.3234 | 92.200977 |
| INT T | 0.1318 | 0.3062 | 87.613869 | 0.1405 | 0.2833 | 81.05478 |
| LOW T | 0.1253 | 0.3184 | 92.212268 | 0.1401 | 0.2795 | 80.710774 |
| $\Delta Eu'v'$ | 0.004022 | | | 0.045784 | | |
| YELLOW | | | | | | |
|  | u' | v' | $h_{ab}$ | u' | v' | $h_{ab}$ |
| HIGH T | 0.2285 | 0.5546 | 89.580338 | 0.2285 | 0.5547 | 89.333296 |
| INT T | 0.1977 | 0.5557 | 106.2982 | 0.2032 | 0.5547 | 102.90827 |
| LOW T | 0.1609 | 0.5571 | 128.50314 | 0.1733 | 0.5553 | 121.87672 |
| $\Delta Eu'v'$ | 0.067646 | | | 0.055203 | | |
| AMBER | | | | | | |
|  | u' | v' | $h_{ab}$ | u' | v' | $h_{ab}$ |
| HIGH T | 0.315 | 0.5418 | 55.547139 | 0.3113 | 0.5422 | 56.22316 |
| INT T | 0.2842 | 0.5406 | 59.435254 | 0.2856 | 0.5397 | 57.904937 |
| LOW T | 0.2426 | 0.5401 | 75.102778 | 0.2519 | 0.538 | 67.823609 |
| $\Delta Eu'v'$ | 0.07242 | | | 0.059548 | | |
| WHITE | | | | | | |
|  | u' | v' | | u' | v' | |
| HIGH T | 0.2083 | 0.5075 | | 0.2078 | 0.5074 | |
| INT T | 0.1811 | 0.4926 | | 0.1868 | 0.4838 | |
| LOW T | 0.1501 | 0.4853 | | 0.1627 | 0.4699 | |
| $\Delta Eu'v'$ | 0.06229 | | | 0.058654 | | |

FIG. 17E

|  | EXAMPLE 11 | | | | EXAMPLE 12 | | |
| --- | --- | --- | --- | --- | --- | --- | --- |
| | RED | | | | RED | | |
| | u' | v' | $h_{ab}$ | | u' | v' | $h_{ab}$ |
| HIGH T | 0.4067 | 0.5307 | 40.777892 | HIGH T | 0.4074 | 0.5303 | 40.587225 |
| INT T | 0.4025 | 0.5232 | 32.277314 | INT T | 0.4035 | 0.5246 | 34.061302 |
| LOW T | 0.4022 | 0.5146 | 22.989407 | LOW T | 0.4036 | 0.5171 | 25.752015 |
| $\Delta Eu'v'$ | 0.016717 | | | $\Delta Eu'v'$ | 0.013736 | | |
| | GREEN | | | | GREEN | | |
| | u' | v' | $h_{ab}$ | | u' | v' | $h_{ab}$ |
| HIGH T | 0.1596 | 0.5637 | 123.72329 | HIGH T | 0.16 | 0.5635 | 123.91347 |
| INT T | 0.1436 | 0.5638 | 132.3175 | INT T | 0.1466 | 0.5647 | 130.12928 |
| LOW T | 0.1258 | 0.5643 | 140.76042 | LOW T | 0.1287 | 0.5655 | 138.45038 |
| $\Delta Eu'v'$ | 0.033805 | | | $\Delta Eu'v'$ | 0.031364 | | |
| | BLUE | | | | BLUE | | |
| | u' | v' | $h_{ab}$ | | u' | v' | $h_{ab}$ |
| HIGH T | 0.1276 | 0.3236 | 92.372472 | HIGH T | 0.129 | 0.3173 | 90.859983 |
| INT T | 0.1408 | 0.2823 | 80.978499 | INT T | 0.1407 | 0.2868 | 81.757448 |
| LOW T | 0.1411 | 0.2768 | 80.153448 | LOW T | 0.1403 | 0.2832 | 81.380412 |
| $\Delta Eu'v'$ | 0.048708 | | | $\Delta Eu'v'$ | 0.035924 | | |
| | YELLOW | | | | YELLOW | | |
| | u' | v' | $h_{ab}$ | | u' | v' | $h_{ab}$ |
| HIGH T | 0.2296 | 0.5544 | 89.306631 | HIGH T | 0.2296 | 0.5544 | 89.780911 |
| INT T | 0.2041 | 0.5545 | 102.9038 | INT T | 0.2074 | 0.5553 | 101.18388 |
| LOW T | 0.1768 | 0.555 | 120.07154 | LOW T | 0.1803 | 0.5563 | 117.22969 |
| $\Delta Eu'v'$ | 0.052803 | | | $\Delta Eu'v'$ | 0.049337 | | |
| | AMBER | | | | AMBER | | |
| | u' | v' | $h_{ab}$ | | u' | v' | $h_{ab}$ |
| HIGH T | 0.3146 | 0.5418 | 56.041217 | HIGH T | 0.315 | 0.5415 | 56.068526 |
| INT T | 0.2891 | 0.5391 | 57.197572 | INT T | 0.2926 | 0.5404 | 58.431653 |
| LOW T | 0.2572 | 0.5372 | 65.573648 | LOW T | 0.2611 | 0.5391 | 66.494292 |
| $\Delta Eu'v'$ | 0.057584 | | | $\Delta Eu'v'$ | 0.053953 | | |
| | WHITE | | | | WHITE | | |
| | u' | v' | | | u' | v' | |
| HIGH T | 0.2083 | 0.5062 | | HIGH T | 0.209 | 0.5059 | |
| INT T | 0.1871 | 0.4818 | | INT T | 0.191 | 0.489 | |
| LOW T | 0.1646 | 0.4676 | | LOW T | 0.1679 | 0.4771 | |
| $\Delta Eu'v'$ | 0.058307 | | | $\Delta Eu'v'$ | 0.050186 | | |

FIG. 17F

| | EXAMPLE 13 | | | | EXAMPLE 14 | | |
|---|---|---|---|---|---|---|---|
| | RED | | | | RED | | |
| | u' | v' | $h_{ab}$ | | u' | v' | $h_{ab}$ |
| HIGH T | 0.4079 | 0.5301 | 40.375173 | HIGH T | 0.4077 | 0.5302 | 40.450738 |
| INT T | 0.4042 | 0.5255 | 34.964396 | INT T | 0.405 | 0.5255 | 35.063039 |
| LOW T | 0.4024 | 0.5167 | 24.558805 | LOW T | 0.4036 | 0.5172 | 25.967142 |
| $\Delta Eu'v'$ | 0.014485 | | | $\Delta Eu'v'$ | 0.013631 | | |
| | GREEN | | | | GREEN | | |
| | u' | v' | $h_{ab}$ | | u' | v' | $h_{ab}$ |
| HIGH T | 0.16 | 0.5638 | 123.56362 | HIGH T | 0.1602 | 0.5637 | 123.47875 |
| INT T | 0.1441 | 0.565 | 131.14326 | INT T | 0.1492 | 0.5644 | 128.7885 |
| LOW T | 0.1206 | 0.566 | 141.61146 | LOW T | 0.1287 | 0.5654 | 138.38456 |
| $\Delta Eu'v'$ | 0.039461 | | | $\Delta Eu'v'$ | 0.031546 | | |
| | BLUE | | | | BLUE | | |
| | u' | v' | $h_{ab}$ | | u' | v' | $h_{ab}$ |
| HIGH T | 0.1293 | 0.3181 | 90.792333 | HIGH T | 0.1295 | 0.3168 | 90.47831 |
| INT T | 0.1345 | 0.3026 | 86.146315 | INT T | 0.1409 | 0.2865 | 81.526199 |
| LOW T | 0.13 | 0.309 | 88.971686 | LOW T | 0.1408 | 0.2813 | 80.839874 |
| $\Delta Eu'v'$ | 0.009127 | | | $\Delta Eu'v'$ | 0.037255 | | |
| | YELLOW | | | | YELLOW | | |
| | u' | v' | $h_{ab}$ | | u' | v' | $h_{ab}$ |
| HIGH T | 0.2292 | 0.5546 | 89.798224 | HIGH T | 0.2288 | 0.5545 | 89.920418 |
| INT T | 0.2041 | 0.5561 | 102.682 | INT T | 0.2108 | 0.5553 | 99.040664 |
| LOW T | 0.1691 | 0.5578 | 122.93412 | LOW T | 0.1797 | 0.5562 | 117.39192 |
| $\Delta Eu'v'$ | 0.060185 | | | $\Delta Eu'v'$ | 0.049129 | | |
| | AMBER | | | | AMBER | | |
| | u' | v' | $h_{ab}$ | | u' | v' | $h_{ab}$ |
| HIGH T | 0.3138 | 0.5419 | 56.562314 | HIGH T | 0.3133 | 0.5418 | 56.573697 |
| INT T | 0.2885 | 0.5414 | 60.182475 | INT T | 0.2949 | 0.5407 | 58.166335 |
| LOW T | 0.2492 | 0.5413 | 73.628034 | LOW T | 0.2607 | 0.5391 | 66.454393 |
| $\Delta Eu'v'$ | 0.064603 | | | $\Delta Eu'v'$ | 0.052669 | | |
| | WHITE | | | | WHITE | | |
| | u' | v' | | | u' | v' | |
| HIGH T | 0.2086 | 0.5058 | | HIGH T | 0.2084 | 0.5055 | |
| INT T | 0.1873 | 0.4943 | | INT T | 0.1938 | 0.4898 | |
| LOW T | 0.1574 | 0.4851 | | LOW T | 0.1675 | 0.4749 | |
| $\Delta Eu'v'$ | 0.055226 | | | $\Delta Eu'v'$ | 0.05108 | | |

FIG. 17G

|  | EXAMPLE 15 | | | EXAMPLE 16 | | |
|---|---|---|---|---|---|---|
|  | RED | | | RED | | |
|  | u' | v' | $h_{ab}$ | u' | v' | $h_{ab}$ |
| HIGH T | 0.4076 | 0.5302 | 40.262993 | 0.4076 | 0.5304 | 40.718755 |
| INT T | 0.4037 | 0.5253 | 34.50413 | 0.404 | 0.5248 | 34.256682 |
| LOW T | 0.4047 | 0.519 | 26.890329 | 0.4027 | 0.5178 | 26.140148 |
| $\Delta Eu'v'$ | 0.011569 | | | 0.013519 | | |
|  | GREEN | | | GREEN | | |
|  | u' | v' | $h_{ab}$ | u' | v' | $h_{ab}$ |
| HIGH T | 0.16 | 0.5638 | 123.55342 | 0.1603 | 0.5636 | 123.5249 |
| INT T | 0.1426 | 0.5652 | 131.68546 | 0.1451 | 0.5647 | 130.78761 |
| LOW T | 0.124 | 0.5663 | 139.9102 | 0.1256 | 0.5656 | 139.70775 |
| $\Delta Eu'v'$ | 0.036087 | | | 0.034758 | | |
|  | BLUE | | | BLUE | | |
|  | u' | v' | $h_{ab}$ | u' | v' | $h_{ab}$ |
| HIGH T | 0.1288 | 0.3188 | 91.011406 | 0.1294 | 0.3171 | 90.633474 |
| INT T | 0.1346 | 0.3016 | 85.928969 | 0.1383 | 0.2917 | 83.19767 |
| LOW T | 0.1312 | 0.3072 | 88.078527 | 0.1361 | 0.2938 | 84.304471 |
| $\Delta Eu'v'$ | 0.011846 | | | 0.024244 | | |
|  | YELLOW | | | YELLOW | | |
|  | u' | v' | $h_{ab}$ | u' | v' | $h_{ab}$ |
| HIGH T | 0.2289 | 0.5547 | 89.724563 | 0.2292 | 0.5544 | 89.855757 |
| INT T | 0.202 | 0.5563 | 103.78636 | 0.2048 | 0.5556 | 102.46728 |
| LOW T | 0.1741 | 0.5577 | 119.96113 | 0.1762 | 0.5566 | 119.47256 |
| $\Delta Eu'v'$ | 0.054882 | | | 0.053046 | | |
|  | AMBER | | | AMBER | | |
|  | u' | v' | $h_{ab}$ | u' | v' | $h_{ab}$ |
| HIGH T | 0.3114 | 0.5423 | 57.080733 | 0.3124 | 0.542 | 56.84192 |
| INT T | 0.2838 | 0.5419 | 61.597676 | 0.2879 | 0.541 | 59.995991 |
| LOW T | 0.2499 | 0.5417 | 73.359996 | 0.2554 | 0.5403 | 69.937388 |
| $\Delta Eu'v'$ | 0.061503 | | | 0.057025 | | |
|  | WHITE | | | WHITE | | |
|  | u' | v' | | u' | v' | |
| HIGH T | 0.2085 | 0.5064 | | 0.2087 | 0.5057 | |
| INT T | 0.1855 | 0.4938 | | 0.1883 | 0.4901 | |
| LOW T | 0.1603 | 0.486 | | 0.1639 | 0.4799 | |
| $\Delta Eu'v'$ | 0.052339 | | | 0.051698 | | |

FIG. 17H

EXAMPLE 17

RED
|  | $u'$ | $v'$ | $h_{ab}$ |
|---|---|---|---|
| HIGH T | 0.4058 | 0.5299 | 39.567384 |
| INT T | 0.4026 | 0.5256 | 34.787587 |
| LOW T | 0.3999 | 0.5148 | 23.694242 |
| $\Delta Eu'v'$ | 0.016212 | | |

GREEN
|  | $u'$ | $v'$ | $h_{ab}$ |
|---|---|---|---|
| HIGH T | 0.1582 | 0.5635 | 123.34419 |
| INT T | 0.1503 | 0.5643 | 127.12497 |
| LOW T | 0.1267 | 0.565 | 138.60238 |
| $\Delta Eu'v'$ | 0.031536 | | |

BLUE
|  | $u'$ | $v'$ | $h_{ab}$ |
|---|---|---|---|
| HIGH T | 0.1302 | 0.3134 | 88.773949 |
| INT T | 0.1406 | 0.2845 | 80.465643 |
| LOW T | 0.1425 | 0.2767 | 78.815902 |
| $\Delta Eu'v'$ | 0.038706 | | |

YELLOW
|  | $u'$ | $v'$ | $h_{ab}$ |
|---|---|---|---|
| HIGH T | 0.2245 | 0.5547 | 90.411227 |
| INT T | 0.211 | 0.5552 | 97.255119 |
| LOW T | 0.1765 | 0.5558 | 117.90623 |
| $\Delta Eu'v'$ | 0.048013 | | |

AMBER
|  | $u'$ | $v'$ | $h_{ab}$ |
|---|---|---|---|
| HIGH T | 0.303 | 0.5427 | 57.912858 |
| INT T | 0.2881 | 0.5416 | 59.40751 |
| LOW T | 0.2484 | 0.5395 | 70.816293 |
| $\Delta Eu'v'$ | 0.054694 | | |

WHITE
|  | $u'$ | $v'$ |
|---|---|---|
| HIGH T | 0.2049 | 0.5043 |
| INT T | 0.1944 | 0.4916 |
| LOW T | 0.1653 | 0.4727 |
| $\Delta Eu'v'$ | 0.050663 | |

FIG. 17I

| Primaries (Wavelength (nm)) | ΔEu',v' |
|---|---|
| 420/600 | 0.278 |
| 420/650 | 0.061 |
| 500/650 | 0.074 |
| 450/600 | 0.162 |
| 420/490/650 | 0.098 |
| 420/490/690 | 0.081 |

| Primary Combinations (Wavelength (nm)) | Δ Eu',v' |
|---|---|
| 405/565 | 0.001 |
| 405/630 | 0.005 |
| 405/565/630 | 0.008 |
| 460/550 | 0.002 |
| 460/635 | 0.027 |
| 460/550/635 | 0.010 |

Primary Wavelengths

| 460 | 550 | 635 | Avg. ΔEu',v' | Max ΔEu',v' |
|---|---|---|---|---|
| 90 | 5 | 5 | 0.010 | 0.015 |
| 5 | 90 | 5 | 0.003 | 0.005 |
| 5 | 5 | 90 | 0.010 | 0.013 |
| 70 | 15 | 15 | 0.022 | 0.035 |
| 15 | 70 | 15 | 0.010 | 0.017 |
| 15 | 15 | 70 | 0.018 | 0.025 |
| 50 | 25 | 25 | 0.025 | 0.041 |
| 25 | 50 | 25 | 0.016 | 0.028 |
| 25 | 25 | 50 | 0.020 | 0.032 |
| 90 | 0 | 10 | 0.005 | 0.007 |
| 10 | 0 | 90 | 0.019 | 0.026 |
| 70 | 0 | 30 | 0.015 | 0.020 |
| 30 | 0 | 70 | 0.029 | 0.039 |
| 90 | 10 | 0 | 0.002 | 0.003 |
| 10 | 90 | 0 | 0.001 | 0.001 |
| 70 | 30 | 0 | 0.004 | 0.005 |
| 30 | 70 | 0 | 0.002 | 0.003 |
| 0 | 90 | 10 | 0.002 | 0.002 |
| 0 | 10 | 90 | 0.017 | 0.024 |
| 0 | 70 | 30 | 0.006 | 0.008 |
| 0 | 30 | 70 | 0.016 | 0.022 |

FIG. 31

| ITO Thickness (Å) | Dark State Reflectance (%) |
|---|---|
| 70 | 9.4 |
| 80 | 9.2 |
| 90 | 8.6 |
| 100 | 7.7 |
| 110 | 6.7 |
| 120 | 5.8 |
| 130 | 5.1 |
| 140 | 4.9 |
| 150 | 5 |
| 160 | 5.5 |
| 170 | 6.2 |
| 180 | 7.0 |
| 190 | 7.7 |
| 200 | 8.2 |
| 210 | 8.5 |

FIG. 32

| Stack | Reflectance in Dark State (%) |
|---|---|
| 1/2 wave with 1.68 RI base layer | 5.9 |
| 1/2 wave with 2.0 RI base layer | 10.8 |
| 1/2 wave with 2.2 RI base layer | 15.5 |
| 1/2 wave with 2.3 RI base layer | 18.0 |

FIG. 33

| Thickness | Reflectance | a* | b* | C* |
|---|---|---|---|---|
| 70 | 9.4 | -9.5 | -3.8 | 10.2 |
| 80 | 9.2 | -10.0 | -0.4 | 10.0 |
| 90 | 8.8 | -10.1 | 3.4 | 10.6 |
| 100 | 8.2 | -9.6 | 6.4 | 11.5 |
| 110 | 7.4 | -8.2 | 7.0 | 10.8 |
| 120 | 6.7 | -6.1 | 4.1 | 7.4 |
| 130 | 6.2 | -3.9 | -1.6 | 4.2 |
| 140 | 5.9 | -2.6 | -7.7 | 8.1 |
| 150 | 5.9 | -2.8 | -12.3 | 12.6 |
| 160 | 6.2 | -4.8 | -14.4 | 15.2 |
| 170 | 6.7 | -8.1 | -13.8 | 16.0 |
| 180 | 7.2 | -11.7 | -11.0 | 16.0 |
| 190 | 7.8 | -14.9 | -6.4 | 16.2 |
| 200 | 8.2 | -16.9 | -0.9 | 16.9 |
| 210 | 8.5 | -17.3 | 4.4 | 17.9 |

| Coating Stack | Layer Thicknesses | Reflected Color | | |
|---|---|---|---|---|
| | | Y | a* | b* |
| Glass/Mid*/ITO | 81nm/149nm | 5.48 | 0.44 | -2.45 |
| Glass/IZO#/SiO2##/ITO | 15nm/37nm/149nm | 5.17 | -0.09 | -0.02 |
| Glass/Simulated Gradient**/ITO | 100nm/149nm | 5.74 | -3.59 | -0.2 |

| Position across substrate (in) | Glass Thickness (mm) | TiO$_2$ (Å) | ITO (Å) | Cr (Å) | Ru (Å) | Silver Alloy (Å) | % T | % R |
|---|---|---|---|---|---|---|---|---|
| -5 | 1.6 | 480 | 180 | 174 | 19.7 | 55.8 | 7.1 | 57.7 |
| -4.75 | 1.6 | 480 | 180 | 73.4 | 10.4 | 118 | 16 | 56.9 |
| -4.5 | 1.6 | 480 | 180 | 1.18 | 0.72 | 184 | 31.9 | 56 |
| -4.375 | 1.6 | 480 | 180 | 0 | 0 | 183 | 33 | 55.6 |
| -2.25 | 1.6 | 480 | 180 | 0.07 | 0.01 | 183 | 33 | 55.6 |
| -2 | 1.6 | 480 | 180 | 0.33 | 0.08 | 186 | 32.1 | 56.3 |
| -1.75 | 1.6 | 480 | 180 | 7.9 | 1.1 | 181 | 29.1 | 57.1 |
| -1.5 | 1.6 | 480 | 180 | 21.1 | 2.6 | 177 | 24.2 | 58.1 |
| -1.25 | 1.6 | 480 | 180 | 52.8 | 6.6 | 150 | 17.8 | 58.8 |
| -1 | 1.6 | 480 | 180 | 121 | 14.5 | 98 | 10.2 | 59.7 |
| -0.75 | 1.6 | 480 | 180 | 235 | 26.8 | 60 | 3.6 | 60.5 |
| -0.5 | 1.6 | 480 | 180 | 359 | 38.4 | 63 | 0.95 | 61.3 |
| -0.25 | 1.6 | 480 | 180 | 442 | 45.4 | 71 | 0.31 | 62.3 |
| 0 | 1.6 | 480 | 180 | 476 | 48.1 | 78 | 0.25 | 63 |
| 0.25 | 1.6 | 480 | 180 | 497 | 49.8 | 85 | 0.2 | 63.9 |
| 0.5 | 1.6 | 480 | 180 | 500 | 49.9 | 92 | 0.18 | 64.9 |
| 5 | 1.6 | 480 | 180 | 500 | 50 | 92 | 0.18 | 64.9 |

FIG. 36

| Position across substrate (in) | Glass Thickness (mm) | TiO$_2$ (Å) | ITO (Å) | Cr (Å) | Ru (Å) | Silver Alloy (Å) | % T | % R |
|---|---|---|---|---|---|---|---|---|
| -5.50 | 1.6 | 480 | 180 | 454 | 46.5 | 92.2 | 0.3 | 65.0 |
| -5.25 | 1.6 | 480 | 180 | 387 | 40.9 | 90.9 | 0.6 | 65.0 |
| -5.00 | 1.6 | 480 | 180 | 273 | 30.6 | 90 | 2.0 | 65.0 |
| -4.75 | 1.6 | 480 | 180 | 149 | 17.88 | 119 | 6.6 | 65.0 |
| -4.50 | 1.6 | 480 | 180 | 66.5 | 8.3 | 177 | 12.5 | 65.0 |
| -4.25 | 1.6 | 480 | 180 | 26.2 | 3.3 | 213 | 17.5 | 65.0 |
| -4.00 | 1.6 | 480 | 180 | 10 | 1.4 | 227 | 20.5 | 65.0 |
| -3.75 | 1.6 | 480 | 180 | 1.1 | 0.4 | 234 | 22.6 | 65.0 |
| -3.50 | 1.6 | 480 | 180 | 0 | 0 | 234 | 22.6 | 65 |
| -3.25 | 1.6 | 480 | 180 | 0 | 0 | 234 | 22.6 | 65 |
| -3.00 | 1.6 | 480 | 180 | 0 | 0 | 234 | 22.6 | 65 |
| -2.75 | 1.6 | 480 | 180 | 0 | 0 | 234 | 22.6 | 65 |
| -2.50 | 1.6 | 480 | 180 | 0 | 0 | 234 | 22.6 | 65 |
| -2.25 | 1.6 | 480 | 180 | 0 | 0 | 234 | 22.6 | 65 |
| -2.00 | 1.6 | 480 | 180 | 0 | 0 | 234 | 22.6 | 65 |
| -1.75 | 1.6 | 480 | 180 | 0 | 0 | 234 | 22.6 | 65 |
| -1.50 | 1.6 | 480 | 180 | 1.1 | 0.4 | 234 | 22.6 | 65.0 |
| -1.25 | 1.6 | 480 | 180 | 10 | 1.4 | 227 | 20.5 | 65.0 |
| -1.00 | 1.6 | 480 | 180 | 26.2 | 3.3 | 213 | 17.5 | 65.0 |
| -0.75 | 1.6 | 480 | 180 | 66.5 | 8.3 | 177 | 12.5 | 65.0 |
| -0.50 | 1.6 | 480 | 180 | 149 | 17.8 | 119 | 6.6 | 65.0 |
| -0.25 | 1.6 | 480 | 180 | 273 | 30.6 | 90 | 2.0 | 65.0 |
| 0.00 | 1.6 | 480 | 180 | 387 | 40.9 | 90.9 | 0.6 | 65.0 |
| 0.25 | 1.6 | 480 | 180 | 454 | 46.5 | 92.2 | 0.3 | 65.0 |
| 0.50 | 1.6 | 480 | 180 | 480 | 48.5 | 92.6 | 0.2 | 65.0 |
| 0.75 | 1.6 | 480 | 180 | 496 | 49.8 | 92.7 | 0.2 | 65.0 |
| 1.00 | 1.6 | 480 | 180 | 497 | 49.7 | 92.8 | 0.2 | 65.0 |
| 1.50 | 1.6 | 480 | 180 | 494 | 49.4 | 92.7 | 0.2 | 65.0 |
| 2.00 | 1.6 | 480 | 180 | 488 | 48.8 | 92.7 | 0.2 | 65.0 |
| 6.00 | 1.6 | 480 | 180 | 488 | 48.8 | 92.7 | 0.2 | 65.0 |

FIG. 37

ELECTRO-OPTIC SYSTEM CONFIGURED TO REDUCE A PERCEIVED COLOR CHANGE

FIELD OF THE INVENTION

The present invention relates to an electro-optic system, and more particularly, an electro-optic system configured to reduce a perceived change of color of light emitted from a display device and viewed through a variable electro-optic element.

BACKGROUND OF THE INVENTION

Generally, various rearview mirrors for motor vehicles have been proposed which change from the full reflectance mode (day) to the partial reflectance mode(s) (night) for glare-protection purposes from light emanating from the headlights of vehicles approaching from the rear. The reflectance is varied by positioning a transmittance altering device between the viewer and the reflector. Among such devices are those wherein the transmittance is varied by thermochromic, photochromic, or electro-optic means (e.g., liquid crystal, dipolar suspension, electrophoretic, or electrochromic), and where the variable transmittance characteristic affects electromagnetic radiation that at least partly includes the visible spectrum. Devices of reversibly variable transmittance to electromagnetic radiation have been proposed as the variable transmittance element in variable transmittance light-filters, variable reflectance mirrors, and display devices, which employ such light-filters or mirrors in conveying information. These variable transmittance light filters have included windows.

In the past, information, images or symbols from displays, such as vacuum fluorescent displays, have been displayed in electrochromic rearview mirrors for motor vehicles with reflective layers on the third surface or fourth surface of the mirror. In one such device the display is visible to the vehicle occupant by removing all of the reflective layer on a portion of the selected layer and placing the display in that area. FIG. 1 shows a one type of electrochromic mirror device 10, having front and rear planar elements 12 and 16, respectively. A transparent conductive coating 14 is placed on the rear face of the front element 12, and another transparent conductive coating 18 is placed on the front face of rear element 16. A reflector (20*a*, 20*b* and 20*c*), typically having a silver metal layer 20*a* covered by a protective copper metal layer 20*b*, and one or more layers of protective paint 20*c*, is disposed on the rear face of the rear element 16. For clarity of description of such a structure, the front surface of the front glass element is sometimes referred to as the first surface, and the inside surface of the front glass element is sometimes referred to as the second surface. The inside surface of the rear glass element is sometimes referred to as the third surface, and the back surface of the rear glass element is sometimes referred to as the fourth surface. The front and rear elements are held in a parallel and spaced-apart relationship by seal 22, thereby creating a chamber 26. The electrochromic medium 24 is contained in space 26. The electrochromic medium 24 is in direct contact with transparent electrode layers 14 and 18, through which passes electromagnetic radiation whose intensity is reversibly modulated in the device by a variable voltage or potential applied to electrode layers 14 and 18 through clip contacts and an electronic circuit.

The electrochromic medium 24 placed in space 26 may include surface-confined, electrodeposition-type or solution-phase-type electrochromic materials. In an all solution-phase medium, the electrochemical properties of the solvent, optional inert electrolyte, anodic materials, cathodic materials, and any other components that might be present in the solution can be selected, such that no significant electrochemical or other changes occur at a potential difference which oxidizes anodic material and reduces the cathodic material other than the electrochemical oxidation of the anodic material, electrochemical reduction of the cathodic material, and the self-erasing reaction between the oxidized form of the anodic material and the reduced form of the cathodic material.

In most cases, when there is no electrical potential difference between transparent conductors 14 and 18, the electrochromic medium 24 in space 26 is essentially colorless or nearly colorless, and incoming light ($I_o$) enters through front element 12, passes through transparent coating 14, electrochromic containing chamber 26, transparent coating 18, rear element 16, and reflects off layer 20*a* and travels back through the device and out front element 12. Typically, the magnitude of the reflected image ($I_R$) with no electrical potential difference is about forty-five percent (45%) to about eighty-five percent (85%) of the incident light intensity ($I_o$). The exact value depends on many variables outlined below, such as, for example, the residual reflection ($I'_R$) from the front face of the front element, as well as secondary reflections from the interfaces between: the front element 12 and the front transparent electrode 14, the front transparent electrode 14 and the electrochromic medium 24, the electrochromic medium 24 and the second transparent electrode 18, and the second transparent electrode 18 and the rear element 16. These reflections are well known in the art and are due to the difference in refractive indices between one material and another as the light crosses the interface between the two. If the front element and the back element are not substantially parallel, then the residual reflectance ($I'_R$) or other secondary reflections will not superimpose with the reflected image ($I_R$) from mirror surface 20*a*, and a double image will appear (where an observer would see what appears to be double (or triple) the number of objects actually present in the reflected image).

There are minimum requirements for the magnitude of the reflected image depending on whether the electrochromic mirrors are placed on the inside or the outside of the vehicle. For example, according to some requirements from most automobile manufacturers, inside mirrors have a high end reflectivity greater than fifty-five percent (55%) and in some cases approximately of at least seventy percent (70%), and outside mirrors have a high end reflectivity of at least thirty-five percent (35%).

Electrode layers 14 and 18 are connected to electronic circuitry which is effective to electrically energize the electrochromic medium, such that when a potential is applied across the transparent conductors 14 and 18, electrochromic medium in space 26 darkens, such that incident light ($I_o$) is attenuated as the light passes toward the reflector 20*a* and as it passes back through after being reflected. By adjusting the potential difference between the transparent electrodes, such a device can function as a "gray-scale" device, with continuously variable transmittance over a wide range. For solution-phase electrochromic systems, when the potential between the electrodes is removed or returned to zero, the device spontaneously returns to the same, zero-potential, equilibrium color and transmittance as the device had before the potential was applied. Other electrochromic materials are available for making electrochromic devices. For example, the electrochromic medium may include electrochromic materials that are solid metal oxides, redox active polymers, and hybrid combinations of solution-phase and solid metal oxides or redox active polymers; however, the above-described solution-phase design is typical of most of the electrochromic devices presently in use.

Others have the reflector on the third surface of the structure which simultaneously acts as an electrode for the electrochromic system. Over time, the reflective surface has changed from being on the fourth surface to being on the third surface. Silver or silver alloys such as silver gold are commonly used as the third surface reflector electrode. The thickness of the silver gold layer is commonly adjusted such that the system has a so-call transflective property, wherein the system has both appreciable transmittance and reflectance. Silver based materials are particularly well suited for this application due to their low absorption of visible light. Displays are often placed behind transflective systems. The transflective nature of the system shields the display from the viewer providing a stealthy characteristic.

SUMMARY OF THE INVENTION

According to one aspect of the present invention, an electrochromic system is provided that includes an electrochromic element that has a front element having first and second surfaces, a rear element including third and fourth surfaces, wherein the front and rear elements are sealably bonded together in a spaced-apart relationship to define a chamber, such that the second surface and the third surface face one another, a transparent first electrode including a layer of conductive material carried on the second surface, an electrochromic medium contained in the chamber, wherein the electrochromic medium is adapted to be in at least a high transmittance state and a low transmittance state, and an at least partially transmissive, partially reflective second electrode. The electrochromic system further includes a display device in optical communication with the electrochromic element, the display device including at least one light source, and being configured to emit at least a first primary and a second primary, and the first and second primaries each having a first hue ($h_{ab}$) when viewed through the electrochromic element in approximately the high transmittance state and a second hue ($h_{ab}'$) when viewed through the electrochromic device in approximately the low transmittance state, wherein a change in the first and second hues ($\Delta h_{ab}$) for both first and second primaries is less than approximately 31 degrees.

According to another aspect of the present invention, a rearview mirror is provided that includes an electro-optic element that has a front element having first and second surfaces, a rear element including third and fourth surfaces, at least one reflective surface, and an electro-optic medium in optical communication between the front element and the rear element, wherein the electro-optic medium is configured to adjust between at least a high transmittance state and a low transmittance state. The rearview mirror also includes a display device in optical communication with the electro-optic element, the display device including at least one light source, and being configured to emit at least a first primary and a second primary, and the first and second primaries each having a first hue ($h_{ab}$) when viewed through the electro-optic element in approximately the high transmittance state and a second hue ($h_{ab}'$) when viewed through the electro-optic element in approximately the low transmittance state, wherein a change in the first and second hues ($\Delta h_{ab}$) for both first and second primaries is less than approximately 31 degrees.

According to another aspect of the present invention, an electrochromic system is provided that includes an electrochromic element that has a front element having first and second surfaces, a rear element including third and fourth surfaces, wherein the front and rear elements are sealably bonded together in a spaced-apart relationship to define a chamber, such that the second surface and the third surface face one another, a transparent first electrode including a layer of conductive material carried on the second surface, an electrochromic medium contained in the chamber, wherein the electrochromic medium is adapted to be in at least a high transmittance state and a low transmittance state, and a partially transmissive, partially reflective layer. The electrochromic system further includes a display device in optical communication with the electrochromic element, the display device including at least one light source, and being configured to emit at least one primary that is light having at least one of a yellow hue and an amber hue, and the at least one primary having a first hue ($h_{ab}$) when viewed through the electrochromic element in approximately the high transmittance state and a second hue ($h_{ab}'$) when viewed through the electrochromic device in approximately the low transmittance state, wherein a change in the first and second hues ($\Delta h_{ab}$) is less than approximately 55 degrees.

According to yet another aspect of the present invention, an electrochromic system is provided that includes an electrochromic element that has a front element having first and second surfaces, a rear element including third and fourth surfaces, wherein the front and rear elements are sealably bonded together in a spaced-apart relationship to define a chamber, such that the second surface and the third surface face one another, a transparent first electrode including a layer of conductive material carried on the second surface, an electrochromic medium contained in the chamber, wherein the electrochromic medium is adapted to be in at least a high transmittance state and a low transmittance state, and a partially transmissive, partially reflective layer. The electrochromic system further includes a display device in optical communication with the electrochromic element, the display device including at least one light source, and being configured to emit a primary that is light having a blue hue, and the primary having a first hue ($h_{ab}$) when viewed through the electrochromic element in approximately the high transmittance state and a second hue ($h_{ab}'$) when viewed through the electrochromic device in approximately the low transmittance state, wherein a change in the first and second hues ($\Delta h_{ab}$) is less than approximately 49 degrees.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIGS. 17A-17I are tables illustrating various examples of perceived color change, in accordance with various embodiments of the present invention and the prior art;

FIG. 31 is a table illustrating $\Delta E_{u',v'}$ values for exemplary primaries, in accordance with one embodiment of the present invention;

FIG. 32 is a table illustrating ITO thickness with respect to low reflectance state percentage, in accordance with one or more embodiments of the present invention;

FIG. 33 is a table illustrating a reflectance in low reflectance state with respect to exemplary stacks, in accordance with one or more embodiments of the present invention;

FIG. 36 is a table illustrating various characteristics of a stack in an electrochromic system, in accordance with one or more embodiments of the present invention;

FIG. 37 is a table illustrating various characteristics of a stack in an electrochromic system, in accordance with one or more embodiments of the present invention;

DETAILED DESCRIPTION

Figure 1:
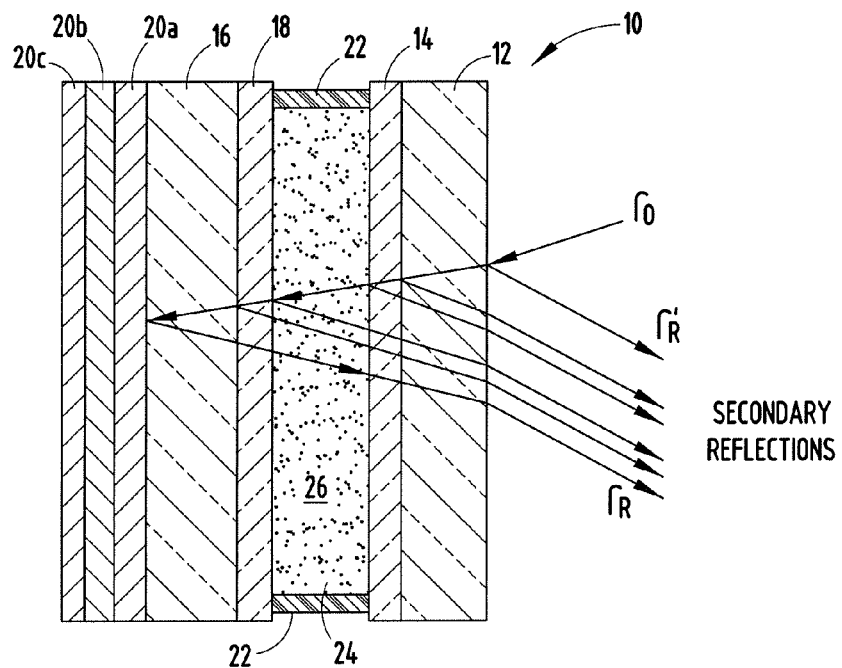
FIG. 1 is a cross-sectional view of a prior art electrochromic mirror assembly.
Figure 2:
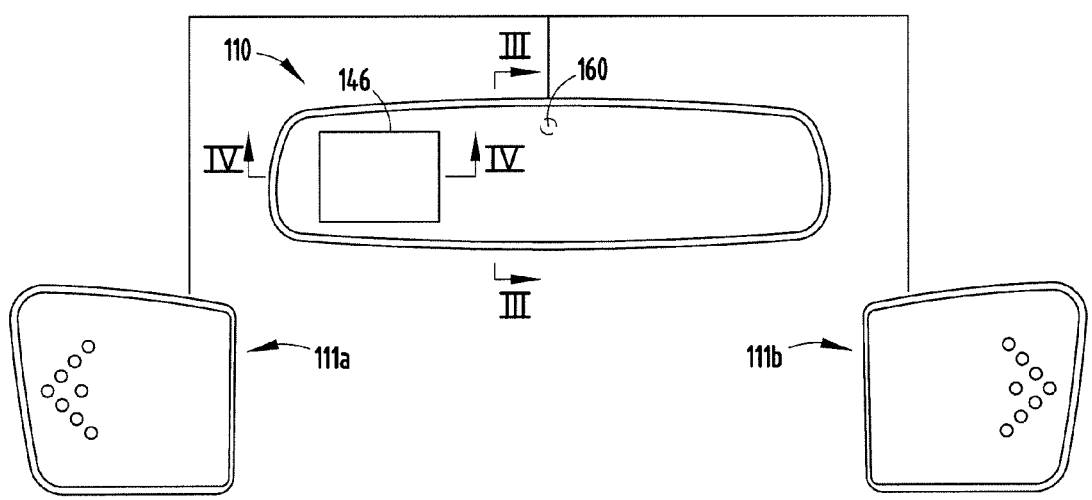
FIG. 2 is a front elevational view schematically illustrating an inside/outside electrochromic rearview mirror system for motor vehicles, wherein the inside and outside mirrors incorporate an electro-optic system, in accordance with one embodiment of the present invention.

With respect to FIG. 2, an inside mirror assembly 110 and two outside rearview mirror assemblies 111a and 111b are schematically illustrated for the driver-side and passenger-side, respectively, all of which can be adapted to be installed on a motor vehicle in a conventional manner and where the mirrors face the rear of the vehicle and can be viewed by the driver of the vehicle to provide a rearward view, according to one embodiment. The inside mirror assembly 110 and the outside rearview mirror assemblies 111a and 111b may incorporate light-sensing electronic circuitry of the type illustrated and described in Canadian Patent No. 1,300,945, entitled "AUTOMATIC REARVIEW MIRROR SYSTEM FOR AUTOMOTIVE VEHICLES," U.S. Pat. No. 5,204,778, entitled "CONTROL SYSTEM FOR AUTOMATIC REAR VIEW MIRRORS," U.S. Pat. No. 5,451,822, entitled "ELECTRONIC CONTROL SYSTEM," U.S. Pat. No. 6,359,274, entitled "PHOTODIODE LIGHT SENSOR," U.S. Pat. No. 6,402,328, entitled "AUTOMATIC DIMMING MIRROR USING SEMICONDUCTOR LIGHT SENSOR WITH INTEGRAL CHARGE COLLECTION," U.S. Pat. No. 6,379,013, entitled "VEHICLE EQUIPMENT CONTROL WITH SEMICONDUCTOR LIGHT SENSORS," or U.S. Pat. No. 7,543,946, entitled "DIMMABLE REARVIEW ASSEMBLY HAVING A GLARE SENSOR," the entire references hereby being incorporated herein by reference, and other circuits capable of sensing glare and ambient light and applying a drive potential to the electrochromic element. The mirror elements contained in the mirror assemblies 110, 111a, and 111b are essentially identical in that like numbers identify like components of the inside and outside mirrors 110, 111a, 111b. These components may be slightly different in configuration, but function in substantially the same manner and obtain substantially the same results as similarly numbered components. For example, the shape of the front glass element of the inside mirror 110 is generally longer and narrower than the outside mirrors 111a and 111b. There are also some different performance standards placed on the inside mirror 110 as compared to the outside mirrors 111a and 111b. For example, the inside mirror 110 generally, when fully cleared, should have a reflectance value of greater than fifty percent (50%), and in some cases of about fifty-five percent (55%) to about eighty-five percent (85%) or higher, whereas the outside minors often have a reflectance of about forty percent (40%) to about sixty-five percent (65%). Also, in the United States (as supplied by the automobile manufacturers), the passenger-side mirror 111b typically has a convex shape, whereas the driver-side mirror 111a and inside mirror 110 presently must be flat. In Europe, the driver-side mirror 111a is commonly flat or aspheric, whereas the passenger-side mirror 111b has a convex or aspheric shape. In Japan, both outside mirrors have a convex shape. The following description is generally applicable to all mirror assemblies of the present invention.

Figure 3:
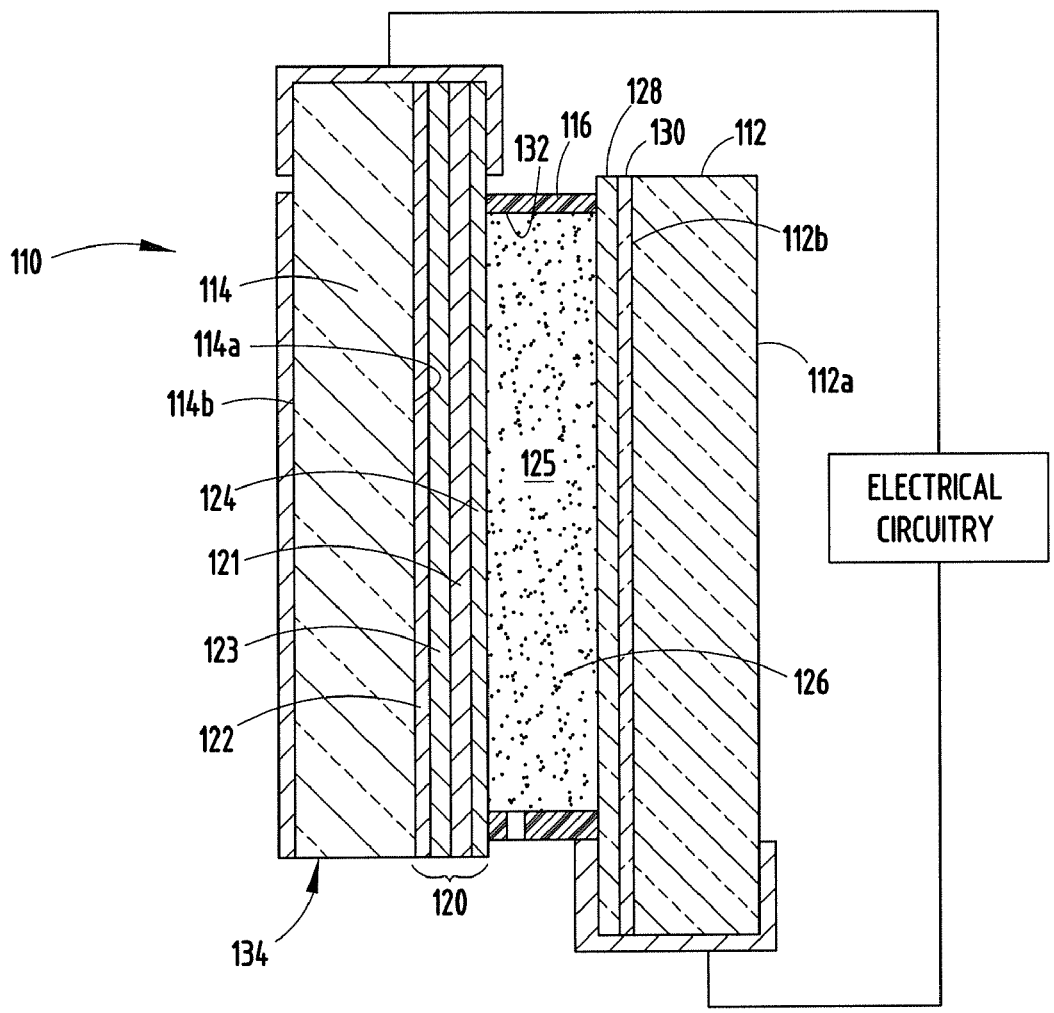
FIG. 3 is a cross-sectional view of the inside electrochromic rearview mirror incorporating a third surface reflector/electrode illustrated in FIG. 2, taken on the line thereof, in accordance with one embodiment of the present invention.

Regarding to FIG. 3, an exemplary cross-sectional view of minor assembly 110 is illustrated having a front transparent element 112 having a front or first surface 112a and a rear or second surface 112b, and a rear element 114 having a front or third surface 114a and a rear or fourth surface 114b. For clarity of description of such a structure, the following designations will be used hereinafter. The front surface 112a of the front transparent element 112 will be referred to as the first surface, and the back surface 112b of the front transparent element 112 will be referred to as the second surface. The front surface 114a of the rear transparent element 114 will be referred to as the third surface, and the back surface 114b of the rear transparent element 114 will be referred to as the fourth surface. A chamber 125 can be defined by one or more layers that make up an at least partially transparent conductor 128 (carried on second surface 112b), a reflector/electrode 120 (disposed on third surface 114a), and an inner circumferential wall 132 of sealing member 116. An electrochromic medium 126 can be contained within a chamber 125. According to one embodiment, the reference to an electrode or layer as being "carried" on at least a portion of the surface of an element, refers to both electrodes or layers that are disposed directly on at least a portion of the surface of an element or disposed at least partially on another coating, layer, or layers that are disposed directly on at least a portion of the surface of the element.

The front element 112, the rear element 114, and the electrochromic medium 126 contained in the chamber 125 can be included in an electrochromic element, generally indicated at reference identifier 134 (FIGS. 3-9G, 35, and 38), according to one embodiment. A display device or light engine 136 (FIGS. 7A-9E, 19, 20, 35, and 38) can be in optical communication with the electrochromic element 134, such that the display device 136 is configured to emit light that is viewed through the electrochromic element 134. Typically, the display device 136 can be configured to emit light in a plurality of colors. Alternatively, the electrochromic medium 126 contained in the chamber 125 can be any suitable electro-optic medium, such that an electro-optic element can include a front element 112, the rear element 114, and an electro-optic medium, and the display device 136 is in optical communication with the electro-optic element. According to one embodiment, an electrochromic system, generally indicated at reference identifier 138 (FIGS. 7A-9G, 20-22, 35, and 38), includes the electrochromic element 134 and the display device 136. The electrochromic system 138 and the electro-optic element are described herein with respect to a rearview mirror for purposes of explanation and not limitation, and can be other types of systems or devices, such as, but not limited to, an electrochromic or electro-optic window.

The electrochromic system 138 can include an electrochromic element 134 having the front element 112 including the first surface 112a and the second surface 112b, and the rear element 114 including the third surface 114a and the fourth surface 114b, wherein the front and rear elements 112, 114 are sealably bonded together in a spaced-apart relationship to define the chamber 125, according to one embodiment. The electrochromic element 134 can also include the transparent first electrode 128 having one or more layers with at least one of which is a conductive material carried on the second surface 112b, the electrochromic medium 126 contained in the chamber 125, wherein the electrochromic medium 126 is adapted to be in at least a high transmittance state and a low transmittance state, and a partially transmissive, partially reflective second electrode 120. The partially transmissive partially reflective second electrode 120 can be disposed over at least a portion of the third surface 114a and/or the fourth surface 114b. The electrochromic system 138 can further include the display device 136 in optical communication with the electrochromic element 134, wherein the display device 136 includes at least one light source 140.

Generally, the electrochromic element 134 and display device 136 can have a plurality of elements that affect the light (e.g., intensity versus wavelength and/or $h_{ab}$) emitted by a light source 140 of the display device 136. Thus, light passing through all of the optical elements after the light has been emitted by the light source 140, and viewed through one or more elements of the display device 136 and the electrochromic element 134, typically has different intensity levels across the visible spectrum than the original light that could be viewed directly from the light source 140. In some embodiments, it may be important for the light passing through all of the components to have certain characteristics such as meeting a certain color gamut. In embodiments where there is not a perfect match of the color before and after a given component, the components may be designed or selected to compensate for weaknesses or characteristics in the other components of the electrochromic system 138. The electrochromic element 134, the display device 136, or a combination thereof, can have one or more components configured to enhance the actual perceived light due to any adverse affects one or more components of the electrochromic element 134 and the display device 136 may have on the emitted light, as described in greater detail herein.

Figure 20:
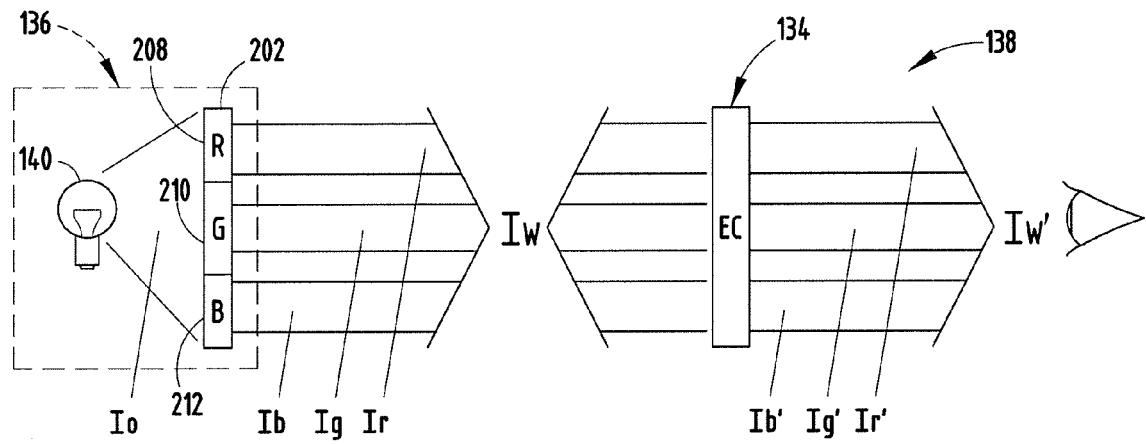
FIG. 20 is a schematic diagram of an electrochromic system, in accordance with one embodiment of the present invention.
Figure 40:
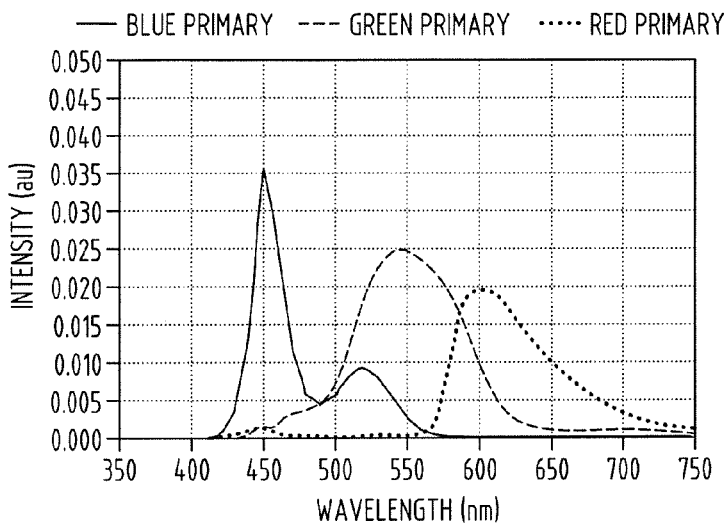
FIG. 40 is a chart illustrating an output from a display device, in accordance with one embodiment of the present invention.

As illustrated in FIG. 20, by way of example, the electrochromic system 138 can include the electrochromic element 134 and the display device 136, wherein the display device 136 can include the light source 140 and the display element 202. In such an embodiment, the display device 136 can be an LCD. Typically, the light emitted by the light source 140 includes light at various wavelengths ($I_O$). The light when viewed through the display element 202, which is exemplary illustrated as having a red filter 208, a green filter 210, and a blue filter 212. Generally, the light emitted from the light source 140 when viewed through the red filter 208 appears as red $I_r$, the light emitted from the light source 140 when viewed through the green filter 210 appears as green $I_g$, and the light emitted from the light source 140 when viewed through the blue filter 212 appears as blue $I_b$ to generate the red, green, and blue primaries; although other primaries may be used. The red, green, and blue primaries, $I_r$, $I_g$, $I_b$ can blend together $I_w$ to have a hue that can be based upon the intensity of the red, green, and blue primaries $I_r$, $I_g$, $I_b$. The light output of the display device is illustrated in the chart of FIG. 40.

Figure 41A:
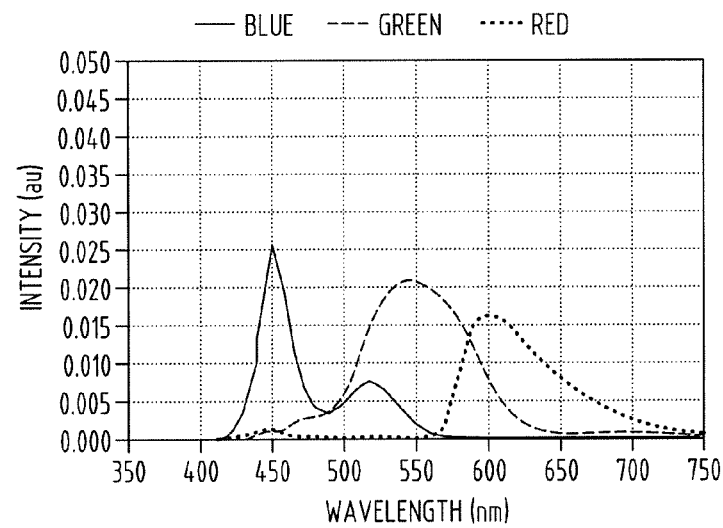
FIG. 41A is a chart illustrating an output of light viewed through an electrochromic medium in approximately its high transmittance state, in accordance with one embodiment of the present invention.
Figure 41B:
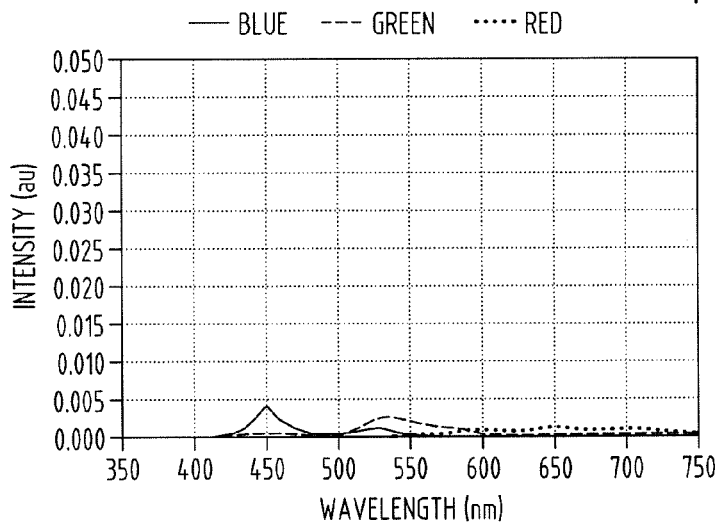
FIG. 41B is a chart illustrating an output of light viewed through an electrochromic medium in approximately its low transmittance state, in accordance with one embodiment of the present invention.

These the red, green, and blue primaries $I_r$, $I_g$, $I_b$ and combinations thereof can be viewed through the display device 136 by the user. The red, green, and blue primaries $I_r$, $I_g$, $I_b$ may be altered by the electrochromic element 134 in the high transmittance state, wherein the altered primaries are represented in FIG. 20 by $I_r'$, $I_g'$, and $I_b'$, respectively. The output of light viewed through the electrochromic medium 126 in approximately the high transmittance state is illustrated in the chart of FIG. 41A. Furthermore, the red, green, and blue primaries $I_r$, $I_g$, $I_b$ may be altered by the electrochromic element 134 in a reduced transmittance state, and such altered primaries can also be represented in FIG. 20 by $I_r'$, $I_g'$, and $I_b'$, respectively. The output of light viewed through the electrochromic medium 126 in approximately the low transmittance state is illustrated in the chart of FIG. 41B. Typically, the electrochromic system 138 is configured such that the final colors have the proper characteristics. This is, by way of example, illustrated in the charts of FIGS. 41A and 41B, which show a ratio of the red, green, and blue light that will appear approximately color neutral to a viewer when the electrochromic medium 126 is in approximately its high and low transmittance state, respectively.

As described in greater detail herein, the electrochromic element 134, the display device 136, or a combination thereof can be configured to reduce the perceived hue difference between $I_r'$, $I_g'$, and $I_b'$ and when the electrochromic element 134 is in approximately the high transmittance state and in a reduced transmittance state. This is exemplary illustrated in the chart of FIG. 40, which shows the red, green, and blue primaries projected to a level that will appear approximately color neutral to a viewer. As described in greater detail herein, the electrochromic element 134, the display device 136, or a combination thereof can be configured to eliminate or reduce the perceived color difference between $I_r'$, $I_g'$, and $I_b'$ when the electrochromic element 134 is driven from a high transmittance state to a reduced transmittance state. Various embodiments are proposed to achieve adequate color preservation for different applications. One embodiment of the present invention is illustrated in FIGS. 41A and 41B, which show the same primaries when modulated by the electrochromic element 134 in approximately the high transmittance state and approximately the low transmittance state.

The display device 136 can be an emissive display that uses the principles of additive color mixing to achieve a range of colors used in the display device 136, according to one embodiment. Typically, in additive color mixing three "primaries" (e.g., red, green, and blue) can be mixed with various intensities to produce a desired color, although other primaries may be used.

The display device 136 can include the light source 140, and the light source 140 can include one or more lighting elements (e.g., light emitting diodes (LEDs)). According to one embodiment, the light source 140 can be a white lighting element. Alternatively, the light source 140 can include a plurality of red, green, and blue (RGB) lighting elements. Exemplary devices are described in U.S. Patent Application Publication 2008/0068520, entitled "VEHICLE REARVIEW MIRROR ASSEMBLY INCLUDING A HIGH INTENSITY DISPLAY," and U.S. Pat. No. 6,521,916, entitled "RADIATION EMITTER DEVICE HAVING AN ENCAPSULANT WITH DIFFERENT ZONES OF THERMAL CONDUCTIVITY," the entire references hereby being incorporated herein by reference.

Figure 19:
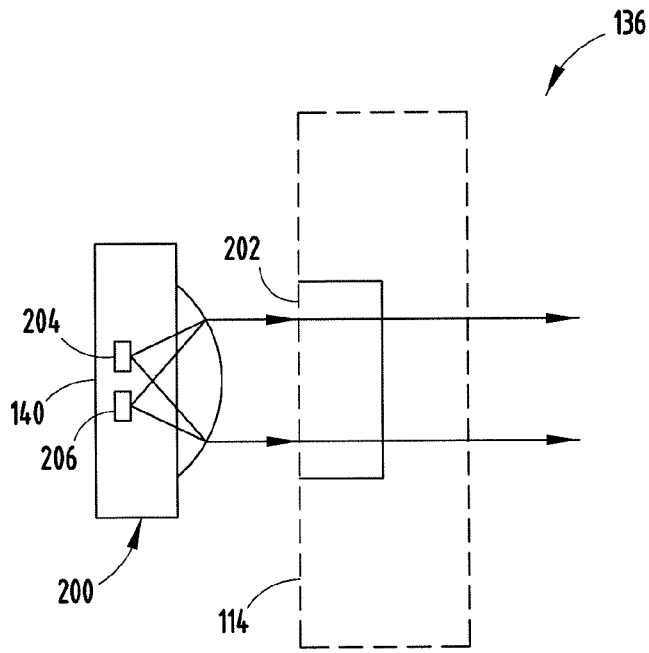
FIG. 19 is a block diagram of a display device, in accordance with one embodiment of the present invention.

FIG. 19 exemplary illustrates an embodiment, wherein an illumination device generally indicated at reference identifier 200 is positioned behind a display element 202 for projecting light through the display element 202. The display element 202 may be a dynamically variable light shutter, such as an LCD or an electrochromic display provided on or near the rear element 114. Examples of display elements in the form of an appliqué positioned behind an electrochromic mirror are disclosed in U.S. Pat. No. 6,870,655, entitled "REARVIEW MIRROR DISPLAY," the entire reference hereby being incorporated herein by reference.

The illumination device 200 may include one or more light emitting packages, such as, but not limited to, NICHIA™ Corp. part number NSSW064A, or packages disclosed in commonly assigned U.S. Pat. No. 6,335,548, entitled "SEMICONDUCTOR RADIATION EMITTER PACKAGE," the entire reference hereby being incorporated herein by reference. The light source 140 can include a plurality of lighting elements 204 and 206, such as, but not limited to, LED chips or other semiconductor radiation emitters that can be provided in a single package and may be individually activated by selective application of power to different leads that are attached to the LED chips. At least two LED chips can be included in the package, with one LED 204 emitting red light and another LED 206 emitting green light so as to mix and form amber light that is emitted from the display device 136. It should be appreciated by those skilled in the art that illumination device 200 may be positioned behind, about the edges, or slightly in front of display element 202. The illumination device 200 can be used to provide backlighting for the display element 202, which can be an LCD element or the like. The LCD element used can be a twisted nematic, super twist, active matrix, dichroic, dichroic phase change, cholesteric, smectic, ferroelectric, IPS, or MVA type.

The display device 136 may be any type of photo-emissive source having more than one color, for example, include a vacuum fluorescent display that utilizes a combination of red and green phosphors (or another combination thereof). An example of the display device can be a subassembly, such as, but not limited to, TOSHIBA™ display part number LTA035B3J1F with fifty percent (50%) color gamut compared to NTSC. Similarly, an LED display may be constructed utilizing two or more colors, such as, red, green, and blue, or different colored LEDs. Thus, as broadly defined herein, the display device 136 may include one or more "lighting elements" for emitting light of first and second colors, according to one embodiment. Such light sources may include photoluminescent light sources such as phosphorescent or fluorescent materials, and/or may include electroluminescent light sources, including, but not limited to, semiconductor radiation emitters such as LEDs, OLEDs, LEPs, etc.

LEDs of the display device 136 may be of the type trade named "Pixar" by HEWLETT PACKARD. Due to the loss of light in the transflective coating, bright LEDs are needed. AlInGaP based LEDs are suitable for this application and are available in green, red, amber, and various similar colors. Blue and green colors can be achieved by using InGaN LEDs. When using InGaN LEDs, there are many fewer LEDs needed than would be used in a segmented display. As an alternative to using packaged LEDs such as the "Pixar" LED, they can be bonded to the circuit board directly using a technique commonly known in the industry as Chip-On-Board.

Exemplary light engines or display devices are described in U.S. Pat. No. 6,639,360, entitled "HIGH POWER RADIATION EMITTER DEVICE AND HEAT DISSIPATING PACKAGE FOR ELECTRONIC COMPONENTS," U.S. Pat. No. 7,075,112, entitled "HIGH POWER RADIATION EMITTER DEVICE AND HEAT DISSIPATING PACKAGE FOR ELECTRONIC COMPONENTS," U.S. Pat. No. 7,489,031, entitled "HIGH POWER RADIATION EMITTER DEVICE AND HEAT DISSIPATING PACKAGE FOR ELECTRONIC COMPONENTS," U.S. Pat. No. 5,803,579, entitled "ILLUMINATOR ASSEMBLY INCORPORATING LIGHT EMITTING DIODES," U.S. Pat. No. 6,132,072, entitled "LED ASSEMBLY," U.S. Pat. No. 6,523,976, entitled "WHITE LIGHT-EMITTING DISCRETE LED COMPONENT, LED ASSEMBLY, AND LICENSE PLATE ILLUMINATOR," U.S. Pat. No. 7,524,097, entitled "LIGHT EMITTING ASSEMBLY," U.S. Pat. No. 6,828,170, entitled "METHOD OF MAKING A SEMICONDUCTOR RADIATION EMITTER," U.S. Pat. No. 7,253,448, entitled "SEMICONDUCTOR RADIATION EMITTER PACKAGE," U.S. Pat. No. 7,342,707, entitled "INDICATORS AND ILLUMINATORS USING A SEMICONDUCTOR," and U.S. Patent Application Publication No. 2009/0096937, entitled "VEHICLE REARVIEW ASSEMBLY INCLUDING A DISPLAY FOR DISPLAYING VIDEO CAPTURED BY A CAMERA AND USER INSTRUCTIONS," the entire references hereby being incorporated herein by reference.

With respect to the electrochromic element 134, the various layers or components typically affect the light that is viewed through the electrochromic element 134. The rear element 114 can have a transflective coating, such that the rear element 114 can have an optical configuration that reflects at least a portion of light incident from at least one side, and transmits at least a portion of light incident from at least one side. Typically, the light viewed through the rear element 114 can be attenuated, but can compensate for adverse attenuation effects of other components of the electrochromic element 134. The transflective elements can be substantially color neutral to reduce adverse color rendering effects of the emitted light. Exemplary transflective elements are disclosed in U.S. Provisional Patent Application No. 60/587,113, entitled "HIGH BRIGHTNESS DISPLAY IN MIRROR," U.S. Pat. No. 7,502,156, entitled "VARIABLE REFLECTANCE MIRRORS AND WINDOWS," U.S. Pat. No. 7,679,809, entitled "VARIABLE REFLECTANCE MIRRORS AND WINDOWS," U.S. Patent Application Publication No. 2009/0296190, entitled "REARVIEW MIRROR ASSEMBLIES WITH ANISOTROPIC POLYMER LAMINATES," and U.S. Patent Application Publication No. 2010/0165437, entitled "VARIABLE REFLECTANCE MIRRORS AND WINDOWS," the entire references hereby being incorporated herein by reference.

Generally, the electrochromic medium 126 can be adapted to be in the high transmittance state, the low transmittance state, and transmittance states intermediate thereto. When the electrochromic medium 126 is in the high transmittance state and the display device 136 is OFF, the user can view a reflection from the reflector. If the display device 136 is ON and the electrochromic medium 126 is in the high transmittance state, the electrochromic medium 126 may slightly attenuate the emitted light. There is, however, greater attenuation of the emitted light when the electrochromic medium is in the low transmittance state. In embodiments where the electrochromic system 138 is configured for a given color, the high transmittance state may define the reference color condition that the low transmittance states are compared against. The electrochromic medium 126 can include one or more components to reduce adverse affects of color rendering on light viewed through the electrochromic medium 126.

The front element 112 may also have one or more coating layers, which may include a transparent electrode, which typically has a lower reflectivity than the coating on the rear element 114. The light viewed through the front element 112 may be attenuated by the coating layers on the front element 112, however, the transmittance properties of these coating layers may be controlled to compensate for adverse attenuation effects of other components of the electrochromic element 134. The transparent electrode on the front element 112 generally has a substantially neutral color to reduce adverse color rendering effects of the emitted light.

Thus, there typically is a change in intensity and/or hue (e.g., $h_{ab}$) of light viewed directly from the display device 136 as compared to light viewed through the electrochromic element 134, either due to the electrochromic medium 126, substrates, coatings, or a combination thereof. Such a change in intensity and/or hue is generally greater when the electrochromic medium 126 is in the low transmittance state (or intermediate states) as compared to when the electrochromic medium 126 is in the high transmittance state.

Figure 10:
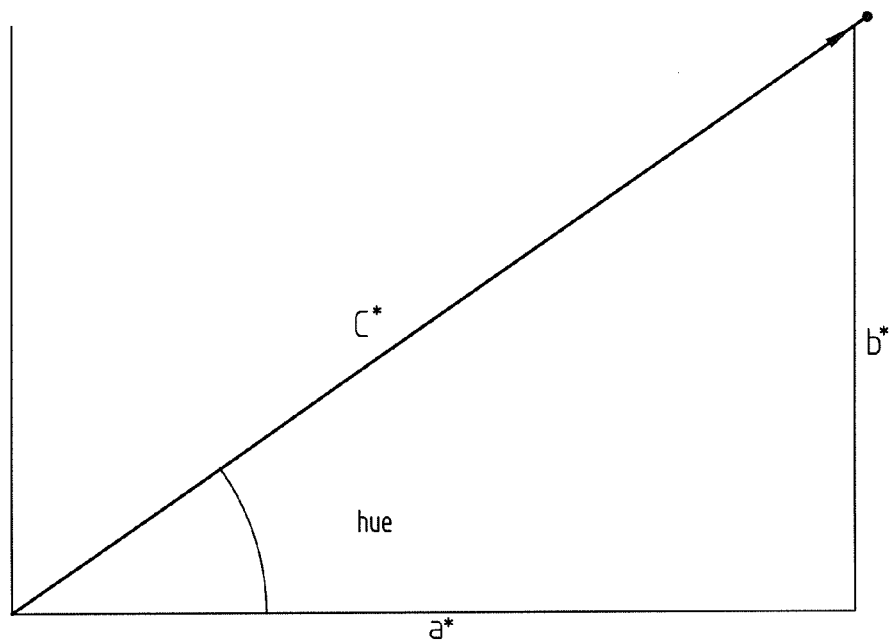
FIG. 10 is a diagram illustrating characteristics of an emitted light with respect to a*, b*, C*, and hue values.
Figure 13:
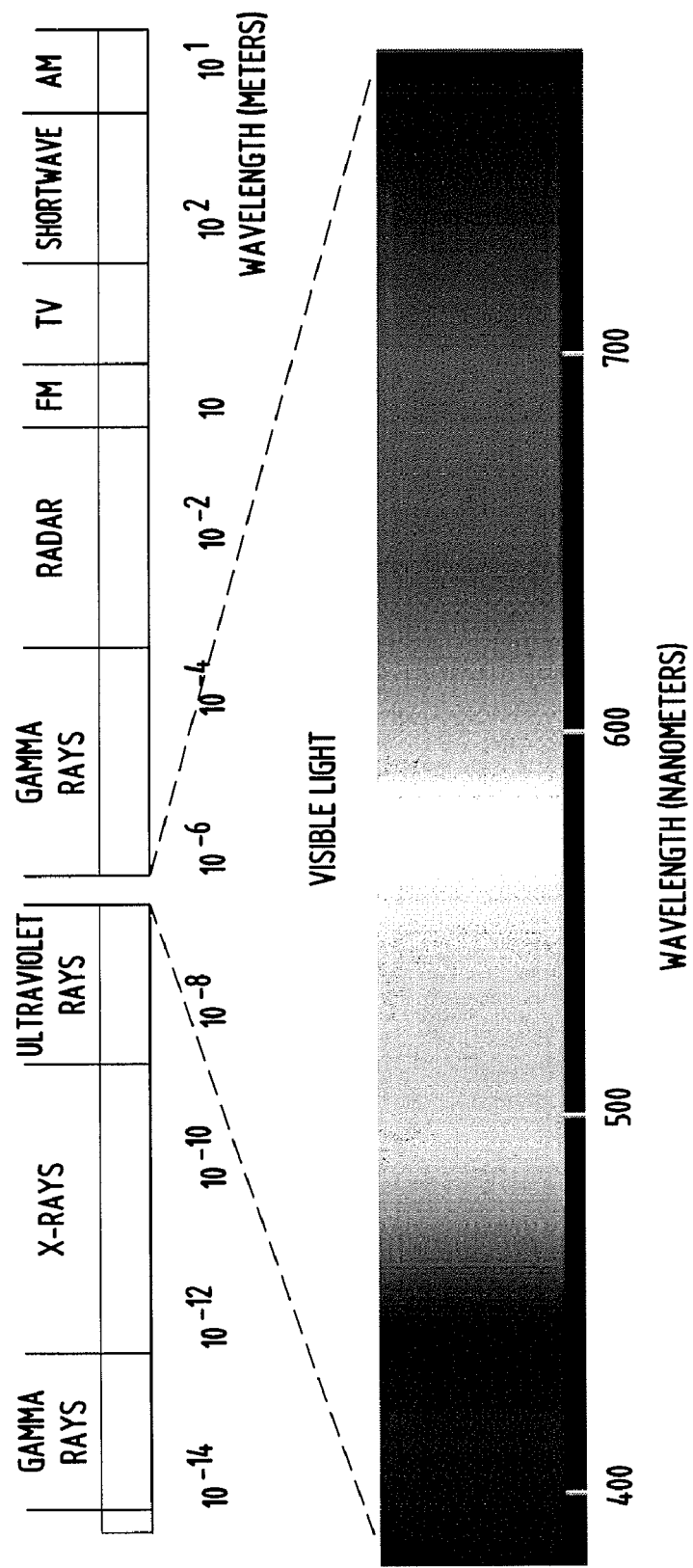
FIG. 13 is a chart illustrating a spectrum of visible light.

In various examples described herein, references are made to the spectral properties of models of electrochromic systems constructed or modeled in accordance with the parameters specified in each example. In discussing colors, it is useful to refer to the Commission Internationale de l'Eclairage's (CIE) 1976 CIELAB Chromaticity Diagram (commonly referred to as the L*a*b* chart). The technology of color is relatively complex, but a fairly comprehensive discussion is given by F. W. Billmeyer and M. Saltzman in *Principles of Color Technology*, 2nd Edition, J. Wiley and Sons Inc. (1981), and the present disclosure, as it relates to color technology and terminology, generally follows that discussion, the entire reference hereby incorporated herein by reference. In describing the invention we will use three different color spaces, which includes the CIELAB color space, Yx,y color space, and the $Y_{u',v'}$ color diagram. On the L*a*b* chart, L* defines lightness, a denotes the red/green value, and b* denotes the yellow/blue value. Typically the electrochromic medium 126 has a transmission spectra at each particular voltage that may be converted to a three number designation, their L*a*b* values. To calculate a set of color coordinates, such as L*a*b* values, from the spectral transmission or reflectance, two additional items are generally needed. One is the spectral power distribution of the light source or illuminant. The present disclosure uses CIE Standard Illuminant A to simulate light from automobile headlamps and uses CIE Standard Illuminant $D_{65}$ to simulate daylight. The second item is the spectral response of the observer. The present disclosure can use the 2 degree CIE standard observer. The illuminant/observer combination generally used for mirrors is then represented as A/2 degree and the combination generally used for windows is represented as $D_{65}$/2 degree. The value C*, which is also described below, is equal to the square root of $(a*)^2+(b*)^2$, and hence, provides a measure for quantifying color neutrality. To further describe the invention, the CIELAB color space, in particular, the values of L*, $C*_{ab}$ (chroma), and $h_{ab}$ (hue) can be referenced (FIG. 10). According to one embodiment, a hue or $h_{ab}$ can be a range or variation of colors within a particular color region (FIG. 13). In the u',v' color diagram we introduce the value $(\Delta E_{u',v'})$, defined as the square root of $(\Delta u')^2+(\Delta v')^2$, wherein $\Delta u'$ and $\Delta v'$ are the differences in the u' and v' for a display element (e.g., one or more primaries) viewed through the electrochromic element 134 in approximately the high and low transmission (or intermediate) states, respectively.

The display device 136 can be configured to project a display element in a plurality of colors. Thus, the primaries can project the display element. When the display element is viewed through the electrochromic device 134 when in the high transmittance state, the user perceives the display element in one or more colors (e.g., the first hue) $h_{ab}$. When the electrochromic device 134 is driven to a lower transmittance state, the attenuation characteristics of the electrochromic medium 126 change, which may alter the perceived color of the display element when viewed through the electrochromic device 134 (e.g., a second hue) $h_{ab}'$, as compared to when the electrochromic element 134 is in the high transmittance state. As described in greater detail herein, the electrochromic element 134, the display device 136, or a combination thereof, can be configured to reduce the change in color ($\Delta h_{ab}$) (e.g., a change in the first and second hues) of the emitted light perceived by the user when the electrochromic device 134 alters between the high transmittance state and a lower transmittance state.

This hue change of the display element is quantified as $\Delta h_{ab}$. The $\Delta h_{ab}$ of the display element (or the primaries) from the display device 136 when viewed through the electrochromic device 134 is controlled by the components in the electrochromic medium 126, the components of the front and rear elements 112, 114, the light emitted by the display device 136, or a combination thereof, as described in greater detail herein. Such control can reduce the perceived color change or reduce the change in $h_{ab}$ (or the change in hue ($\Delta h_{ab}$)) of the display element when the electrochromic device is driven from the high transmittance state to a state of lower transmittance.

Figure 11:
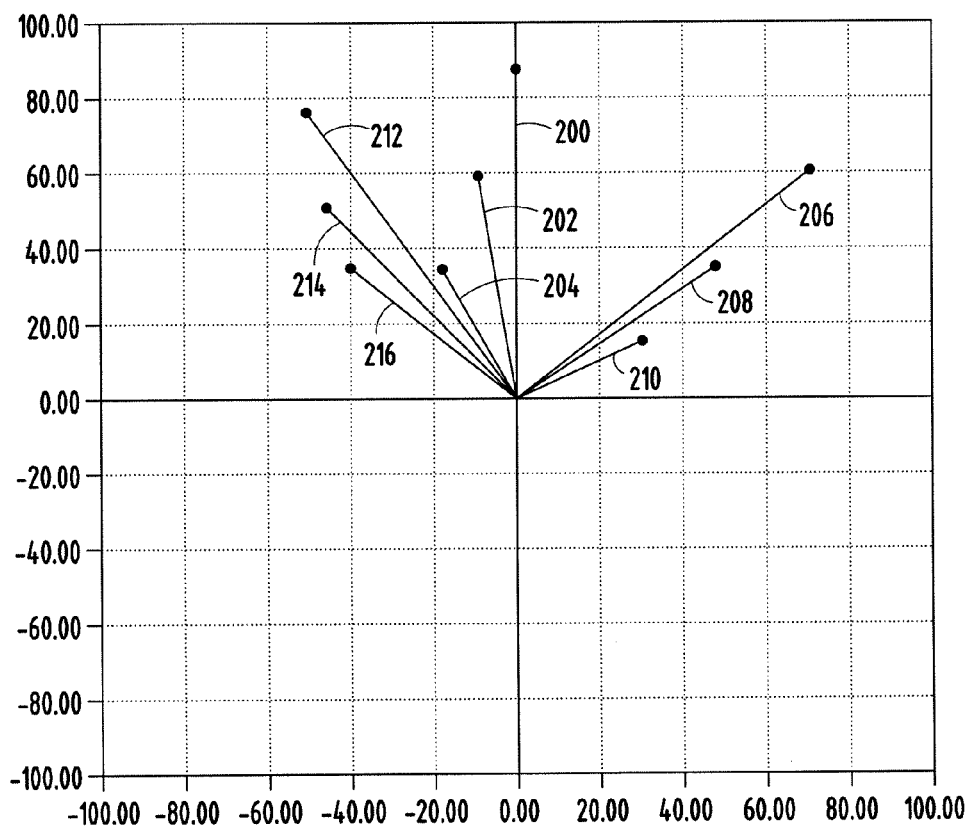
FIG. 11 is a chart illustrating changes in $h_{ab}$ for various primaries emitted from a display device that are viewed through an electrochromic medium that is altered between approximately a high transmittance state and approximately a low transmittance state, in accordance with one embodiment of the present invention.
Figure 12:
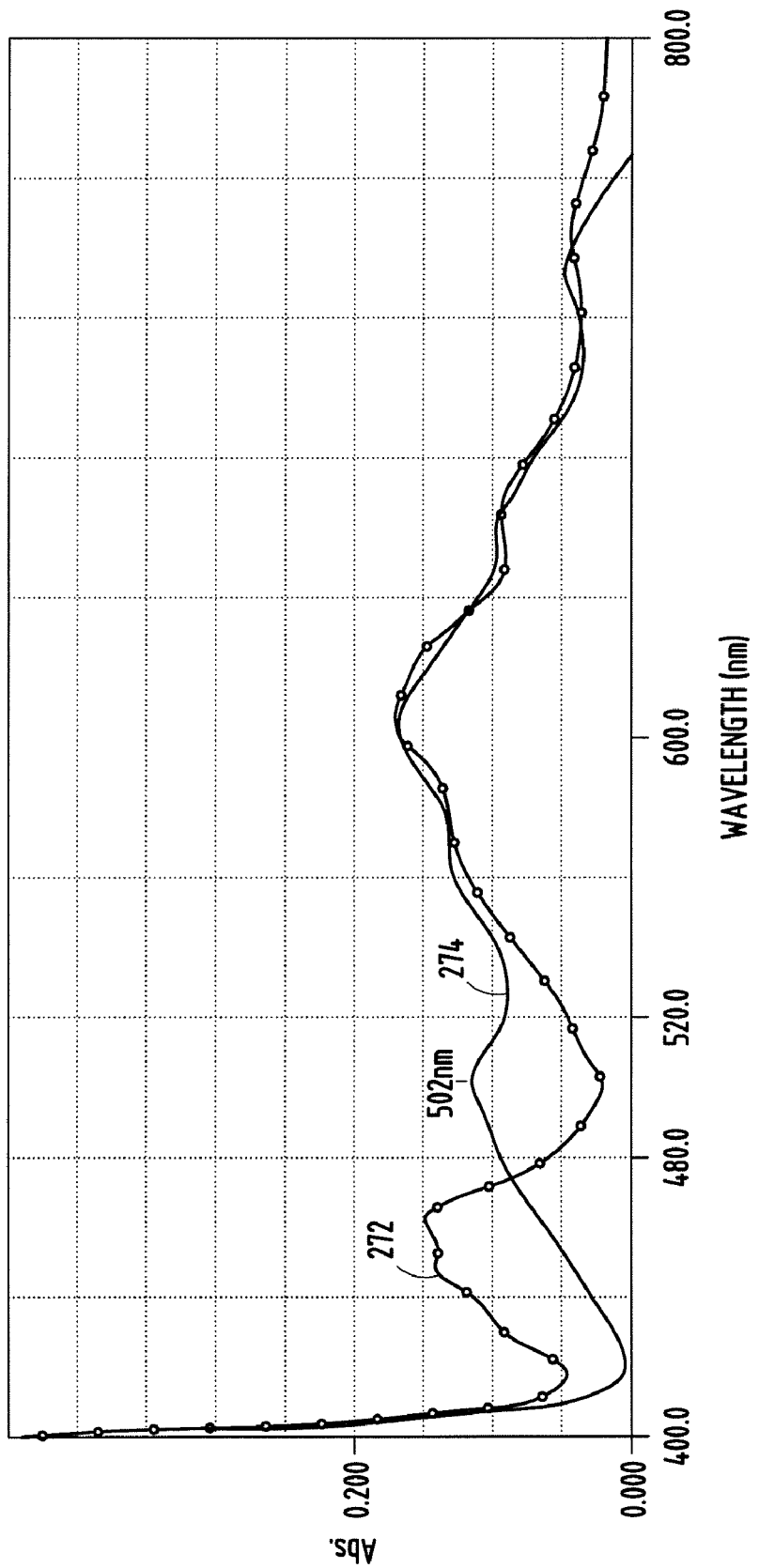
FIG. 12 is a chart illustrating a comparison of light absorption by an electrochromic medium with respect to wavelength for a prior art electrochromic element and an electrochromic medium in accordance with one embodiment of the present invention.

FIG. 11 exemplary illustrates various $h_{ab}$ for a display element in Example 14 having a green hue, a display element having a yellow hue, and a display element having a red hue. The $h_{ab}$ of the display element can be controlled to reduce a change in $h_{ab}$ between transmittance states by active control of the display device 136 (e.g., altering light emitted by a light source 140 therein), the components of the electrochromic element 134, or a combination thereof. Typically, the difference between the $h_{ab}$ values of the display element 136 when viewed through the electrochromic medium 126 when in approximately the high transmittance state and in approximately the low transmittance state are reduced. As described herein, reducing the change in $h_{ab}$ of a display element from the display device 136 when viewed through the electrochromic element 134 from its high transmittance state to its low transmittance state can be achieved by selecting one or more components in the electrochromic element 134 and/or by altering the light by the display device 136 emitted to compensate for the influence of the electrochromic medium 126 on the emitted light.

Figure 14:
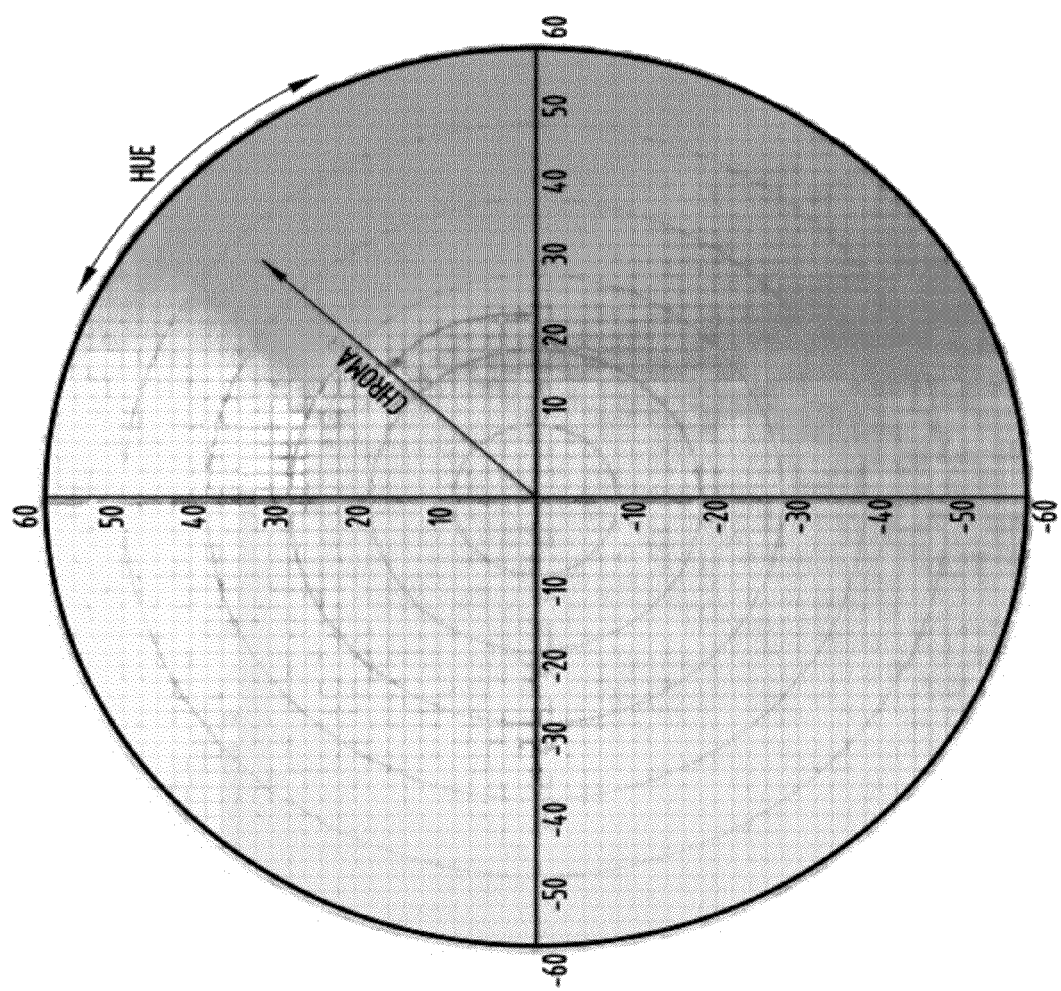
FIG. 14 is a chart illustrating in the L*a*b* color space, a* and b* being converted into C* and a hue.

With respect to both FIGS. 11 and 14, line 200 (FIG. 11) can represent a primary that is light having a yellow hue, which is emitted by the display device 136 and viewed by a user through the electrochromic element 134 when the electrochromic medium 126 is in approximately the high transmittance state. Line 202 (FIG. 11) can represent the primary that is light having the yellow hue, which is emitted by the display device 136 and viewed by a user through the electrochromic element 134 when the electrochromic medium 126 is in an intermediate transmittance state, and line 204 (FIG. 11) can represent the primary that is light having the yellow hue, which is emitted by the display device 136 and viewed through the electrochromic element 134 when the electrochromic medium 126 is in approximately the low transmittance state. When considering lines 200, 202, and 204 with respect to FIG. 11, the color perceived by the user maintains the yellow hue even as the transmittance state of the electrochromic medium 126 is altered between the high and low transmittance states. Thus, a change in $h_{ab}$ between lines 200 and 204 is a value (approximately forty-five degrees (45°)) that remains approximately representative of light having the yellow hue, rather than having a larger change in $h_{ab}$, such that the perceived light no longer has a yellow hue (e.g., has a green hue).

Similarly, in regards to both FIGS. 11 and 14, line 206 (FIG. 11) can represent a primary that is light having a red hue, which is emitted by the display device 136 and viewed through the electrochromic element 134 when the electrochromic medium 126 is in approximately the high transmittance state. Line 208 (FIG. 11) can represent the primary that is light having the red hue, which is emitted by the display device 136 and viewed through the electrochromic element 134 when the electrochromic medium 126 is in the intermediate transmittance state, and line 210 (FIG. 11) can represent the primary that is light having the red hue, which is emitted by the display device 136 and viewed through the electrochromic element 134 when the electrochromic medium 126 is in approximately the low transmittance state. When considering lines 206, 208, and 210 with respect to FIG. 11, the color perceived by the user maintains the red hue even as the transmittance state of the electrochromic medium 126 is altered between the high and low transmittance states. Thus, a change in $h_{ab}$ between lines 206 and 210 is a value (approximately fifteen degrees (15°)) that remains approximately representative of light having the red hue, rather than having a larger change in $h_{ab}$, such that the perceived light no longer has a red hue.

Another example with respect to both FIGS. 11 and 14, is line 212 (FIG. 11) representing a primary that is light having a green hue, which is emitted by the display device 136 and viewed through the electrochromic element 134 when the electrochromic medium 126 is in approximately the high transmittance state. Line 214 (FIG. 11) can represent the primary that is light having the green hue, which is emitted by the display device 136 and viewed through the electrochromic element 134 when the electrochromic medium 126 is in an intermediate transmittance state, and line 216 (FIG. 11) can represent the primary that is light having the green hue, which is emitted by the display device 136 and viewed through the electrochromic element 134 when the electrochromic medium 126 is in approximately the low transmittance state. When considering lines 212, 214, and 216, with respect to FIG. 11, the color perceived by the user maintains the green hue even as the transmittance state of the electrochromic medium 126 is altered between the high and low transmittance states. Thus, a change in $h_{ab}$ between lines 212 and 216 is a value (approximately twenty-five degrees) (25°)) that remains approximately representative of light having the green hue, rather than having a larger change in $h_{ab}$, such that the perceived light no longer has a green hue.

Typically, the reduced change in $h_{ab}$ as the transmittance state is altered is independent of a C* value. In further regards to FIG. 11, lines 200, 202, 204, 206, 208, 210, 212, 214, and 216 illustrates the hue (angle) in addition to a chroma (i.e., the length of the line).

According to one embodiment, primaries emitted by the display device 136 can include at least one red primary, one green primary, and one blue primary light. Typically, the display device 136 can be configured to emit one primary or combine two or more primaries to emit light of another color. Alternatively, the primaries can include at least one red, at least one green, at least one blue, and at least one yellow. The display device 136 can be configured as a white light source with variable filters (e.g., typical LCD), or can have a plurality of light sources 140 that emit light at various wavelengths, as described above.

With continued reference to the L* a* b* color space, the display device 136 can be configured to emit at least a first primary and a second primary. The first and second primaries, as viewed through the electrochromic medium 126 in an approximately the high transmittance state (e.g., a first hue $h_{ab}$), in approximately the low transmittance state (e.g., a second hue $h_{ab}'$), and all intermediate transmittance states exhibit a change in $h_{ab}$ ($\Delta h_{ab}$) (e.g., a change in the first and second hues) of less than approximately thirty one degrees (31°).

The change in $h_{ab}$ between approximately the high transmittance state and approximately the low transmittance state for both the first and second primaries can be less than approximately twenty-five degrees (25°), according to one embodiment. However, the change in $h_{ab}$ between approximately the high and low transmittance states for both the first and second primaries can be less than approximately fifteen degrees (15°). Typically, the first and secondary primaries have different hues, such as, but not limited to, the first primary being light having a red hue and the second primary being light having a green hue (FIG. 13). In such an embodiment, the change in $h_{ab}$ between approximately the high and low transmittance states for light having a red hue can range from approximately twenty-three degrees (23°) to approximately thirteen degrees (13°), and the change in $h_{ab}$ for light having a green hue can range from approximately thirty-one degrees (31°) to approximately fourteen degrees (14°) (FIGS. 17A-17I).

The display device 136 can be further configured to emit a third primary, wherein a change in $h_{ab}$ of the third primary between when the electrochromic medium 126 is in approximately the high transmittance state (e.g., a first hue $h_{ab}$) and in approximately the low transmittance state (e.g., a second hue $h_{ab}'$) can be less than approximately forty-one degrees (41°). Alternatively, the change in $h_{ab}$ of the third primary can be less than approximately thirty-five degrees (35°), the change in $h_{ab}$ of the third primary can be less than approximately twenty degrees (20°), or the change in $h_{ab}$ of the third primary can be less than approximately ten degrees (10°). According to one embodiment, the third primary can be a different color than the first and second primaries, such as, but not limited to, light having a blue hue (FIG. 13). In such an embodiment, the change in $h_{ab}$ for light having a blue hue can range from approximately forty-one degrees (41°) to approximately zero degrees (0°) (FIGS. 17A-17I).

Additionally and alternatively, the display device 136 can be configured to emit a fourth primary. In such an embodiment, a change in $h_{ab}$ of the fourth primary when the electrochromic medium 126 is in approximately the high transmittance state and in approximately the low transmittance state can be less than approximately fifty-five degrees) (55°). It should be appreciated that additional primaries beyond four, or alterative primaries, can be used in a manner as taught herein for embodiments in which such an approach would be advantageous.

Alternatively, the change in $h_{ab}$ between approximately the high and low transmittance states for the fourth primary can be less than approximately fifty degrees (50°), the change in $h_{ab}$ for the fourth primary can be less than approximately forty degrees (40°), or the change in $h_{ab}$ for the fourth primary can be less than approximately thirty degrees (30°). A further alternative can be wherein the differences in $h_{ab}$ for the fourth primary can be less than approximately fifteen degrees (15°).

Typically, the fourth and any additional primaries are different colors, such as, but not limited to, the fourth primary being light having a yellow hue (FIG. 13). As described above, hues other than those of the primaries can be obtained by mixing of two or more primaries. In this manner, a yellow hue can be obtained, for example, by the mixing of red and green primaries at a suitable ratio. An amber hue can also be obtained by the mixing of primaries, for example red and green in a ratio slightly different than that for yellow. In such an embodiment, the change in $h_{ab}$ between the approximately high and approximately low transmittance states for light having a yellow hue can range from approximately fifty-five degrees (55°) to approximately twenty-seven degrees (27°), and the change in $h_{ab}$ between the approximately high and approximately low transmittance states for light having an amber hue can range from approximately fifty-five degrees (55°) to approximately nine degrees (9°) (FIGS. 17A-17I).

According to one embodiment, the rear view mirror 110 can include the electro-optic device having the front element 112 that includes the first and second surfaces 112a, 112b, the rear element 114 having a third and fourth surfaces 114a, 114b, and the electro-optic medium 126 in optical communication between the front element 112 and the rear element 114, wherein the electro-optic medium 126 can be configured to dynamically adjust between a high transmittance state and a low transmittance state. The rear view mirror 110 can further include the display device 136 in optical communication with the electro-optic device. The display device 136 can include the at least one light source 100, and the display device 136 can be configured to emit at least a first primary and a second primary. The first and second primaries can each have a first hue ($h_{ab}$) when viewed through the electro-optic element 134 in approximately the high transmittance state and a second hue ($h_{ab}'$) when viewed through the electro-optic element 134 in approximately the low transmittace state, wherein a change in the first and second hues (($h_{ab}$) is less than approximately thirty-one degrees (31°).

Figures 15A, 15B:
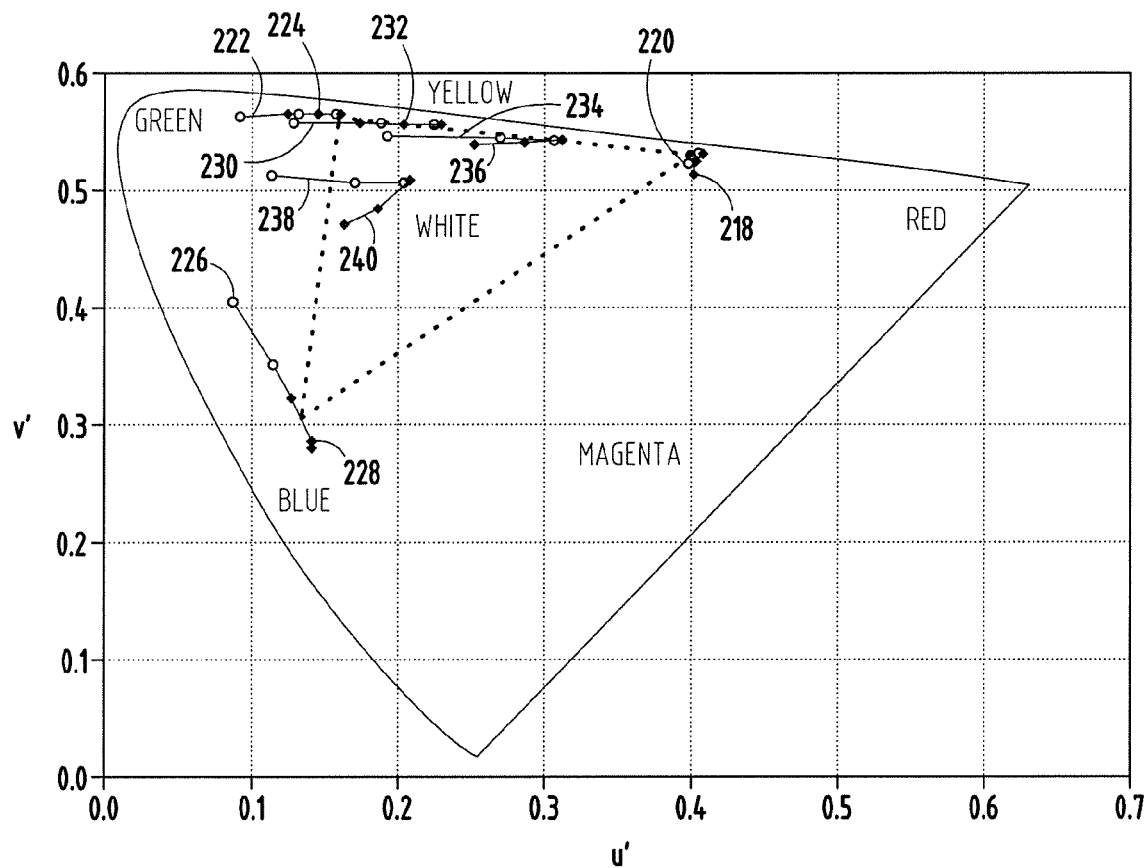
FIG. 15A is a chart illustrating a comparison of a perceived change in color in the u',v' color diagram as a transmittance state varies for a prior art electrochromic element and an electrochromic system in accordance with one embodiment of the present invention.
FIG. 15B is a table illustrating a comparison of a perceived color change in the u',v' color diagram illustrated in FIG. 15A.

Another exemplary illustration in reduced color change is illustrated in FIGS. 15A and 15B, which shows color change in the $Y_{u',v'}$ color diagram. The $Y_{u',v'}$ color diagram is a color space adopted by CIE in 1976 as transformation of the 1931 CIE Yx,y color space, but which attempted perceptual uniformity. The insert triangle may represent a portion of the u',v' color diagram addressable by the display device 136 (i.e., the color gamut), which illustrates the subset of color capability of a particular embodiment of a RGB display. This chart illustrates the color changes of emitted light having a plurality of hues as the electrochromic medium 126 is altered between the high transmittance state and the low transmittance state. The magnitude of color changes of a prior art electrochromic medium may be considered less desirable by the viewer.

The lines of FIG. 15A directly compare the change in color for an embodiment of the present invention described in Example 12 with the change in color of a prior art configuration described in Example 1, wherein a display element of the display device 136 is viewed through the electrochromic element 134, while the electrochromic medium 126 is in various transmittance states. Line 218 represents a display element having a red color of a prior art system at various transmittance states of the electrochromic system, and line 220 represents a display element having a red color in accordance with one embodiment of the present invention at various transmittance states. According to one embodiment, a display element can emit light, such as, but not limited to, and indicator light, a symbol, text, and image, emitted light viewed through one or more pixels, the like, or a combination thereof.

Line 222 represents a display element having a green color of a prior art system at various transmittance states of the electrochromic system, and line 224 represents a display element having a green color in accordance with one embodiment of the present invention at various transmittance states of the electrochromic system. Line 226 represents a display element having a blue color of a prior art system at various transmittance states of the electrochromic system 138, and line 228 represents a display element having a blue color in accordance with one embodiment of the present invention at various transmittance states of the electrochromic system 138. As shown in FIG. 15, line 228 maintains the blue color, whereas line 226 extends towards a green region of the u',v' color diagram, and thus, illustrates an undesirable color change for a prior art system shown by line 226 compared to a system of the present invention as shown by line 228.

With continued reference to FIG. 15A, line 230 represents a display element having a yellow color of a prior art system at various transmittance states of the electrochromic system, and line 232 represents a display element having a yellow color in accordance with one embodiment of the present invention at various transmittance states of the electrochromic system 138. Line 232 maintains the yellow color, whereas line 230 extends towards a green region of the u',v' color diagram, and thus, illustrates an undesirable color change for a prior art system shown by line 230 compared to a system of the present invention as shown by line 232. Line 234 represents a display element having a amber color of a prior art system at various transmittance states of the electrochromic system 138, and line 236 represents a display element having an amber color in accordance with one embodiment of the present invention at various transmittance states of the electrochromic system 138. Line 236 maintains the amber color, whereas the line 234 extends towards a green region of the u',v' color diagram, and thus, illustrates an undesirable color change for a prior art system shown by line 234 compared to a system of the present invention as shown by line 236. Line 238 represents a display element having a white color of a prior art system at various transmittance states of the electrochromic system, and line 240 represents a display element having a white color in accordance with one embodiment of the present invention at various transmittance states of the electrochromic system 138. As shown by the comparison of lines in FIG. 15A, the perceived color change of the emitted light is reduced as compared to the prior art. Thus, lines 220, 224, 228, 232, 236, and 240 remain closer to their respective starting point (the point where the electrochromic system 138 is in its approximately high transmittance state) for each respective color, and remain closer to the starting color as the electrochromic system 138 changes from its high transmittance state to its low transmittance state, as compared to the prior art lines 218, 222, 226, 230, 234, and 238, which illustrate an undesirable color change in the prior art.

Continuing to reference the u',v' color diagram and FIG. 15B, the first and second primaries viewed through the electrochromic medium 126 in approximately the high transmittance state and in approximately the low transmittance state exhibit a change in color ($\Delta E_{u',v'}$) of less than approximately 0.06. The color change, $\Delta E_{u',v'}$, for both the first and second primaries can be less than approximately 0.05, according to one embodiment. However, the color change, $\Delta E_{u',v'}$, for both the first and second primaries can be less than approximately 0.04. Typically, the first and second primaries have different colors, such as, but not limited to, the first primary being light having a red color and the second primary being light having a green color (FIG. 15A).

The display device 136 can be further configured to emit a third primary, wherein a color change, $\Delta E_{u',v'}$, of the third primary when the electrochromic medium 126 is in approximately the high transmittance state and in approximately the low transmittance state is less than approximately 0.08. Alternatively, the color change, $\Delta E_{u',v'}$, of the third primary can be less than approximately 0.07, the color change, $\Delta E_{u',v'}$, of the third primary can be approximately 0.06, or the color change, $\Delta E_{u',v'}$, of the third primary can be less than approximately 0.05. According to one embodiment, the third primary can be a different color than the first and second primaries, such as, but not limited to, light having a blue color (FIG. 15A).

The display device 136 can be configured to emit a fourth primary, according to one embodiment. In such an embodiment, a color change, $\Delta E_{u',v'}$, of the fourth primary when the electrochromic medium 126 is in approximately the high transmittance state and in approximately the low transmittance state is less than approximately 0.08, a color change, $\Delta E_{u',v'}$, of light having an amber color when the electrochromic medium 126 is in approximately the high transmittance state and in approximately the low transmittance state can be less than approximately 0.09, or a combination thereof.

Alternatively, the color change, $\Delta E_{u',v'}$, for at least one of the fourth and any additional primaries can be less than approximately 0.08, a color change, $\Delta E_{u',v'}$, for at least one of the fourth and any additional primaries can be less than approximately 0.07, a color change, $\Delta E_{u',v'}$, for at least one of the fourth and any additional primaries can be less than approximately 0.06, or a color change, $\Delta E_{u',v'}$, for at least one of the fourth and any additional primaries can be less than approximately 0.05. Accordingly to one embodiment, the fourth primary can be light having a yellow hue.

For purposes of explanation and not limitation, in operation, the electrochromic system 138 can be configured to emit light via the display device 136 through the layers of the electrochromic element 134 to display an image to the user or occupant of the motor vehicle. Further, the electrochromic system 138 can be configured to display this image in a manner viewable by the user without regard as to the transmittance states of the electrochromic medium 126, and thus, any change in the perceived color of the displayed image is reduced, even though the transmittance level of the electrochromic medium 126 is being altered. The color change, $\Delta E_{u',v'}$, of the image viewed by the user is reduced even as the transmittance states of the electrochromic medium 126 is being altered, such that, in a non-limiting example, an image that appears yellow when the electrochromic medium 126 is in the high transmittance state does not appear green when the electrochromic medium 126 is in the low transmittance state.

In another embodiment, the color accuracy can be based upon light emitted from the display device 136 that is viewed through the electrochromic element 134 having a plurality of primary colors, as compared to a broadband source, such as daylight (e.g., Illuminat $D_{65}$ or Illuminat A). Thus, coatings of the front and rear elements 112, 114, components of the electrochromic medium 126, active control of the display device 136, or a combination thereof can be adapted to compensate for adverse attenuation affects the electrochromic medium 126 has on the light viewed there through at various transmittance states. As described above, the display device 136 can be configured to at least partially compensate for adverse attenuation of the emitted light by other components of the electrochromic system 138. When the display device 136 is configured to at least partially enhance the color accuracy (e.g., reduce a perceived color change), the display device 136 can be an LCD, wherein the backlighting source(s) and/or the filters (e.g., RGB, RGB-Yellow) are adapted to at least partially compensate for a color change that is a result of the emitted light viewed through the electrochromic medium 126. Thus, the LCD can be enhanced to give color accuracy to two or more primaries. This tuning might include, but not limited to, modifying the instructions in video driver circuitry and/or programming to actively or passively compensate for the same color shift.

The backlighting and display filter of the display device 136, the attenuation of the emitted light viewed through the electrochromic medium 134, or a combination thereof, can affect color balance of the perceived light. Additionally or alternatively, an intensity and/or color of a backlighting light source of the display device 136 (e.g., RGB light source, white phosphor light source, etc.) can be configured to actively or passively compensate for attenuation of the emitted light viewed through the electrochromic medium 126. The backlighting of the display device 136 can be, but is not limited to, direct lighting or edge lighting.

A magnitude of perceived color change can be approximately inversely proportional to a width of a color filter (e.g., full width/half max of the light distribution band) of the display device 136 (e.g., the display device 136 being a LCD), according to one embodiment. Typically, the width of the filter can correspond to the range of wavelengths that pass through the filter. Thus, if the backlight is monochromic, there can be substantially no shift in color and the filter can only attenuate. However, when the backlight of the display device 136 is configured to emit a plurality of primary colors, a wide filter in a particular wavelength range can be utilized in the display device 136, which can allow for greater intensity, but reduced color accuracy, or narrow filters in a particular wavelength range can be utilized in the display device 136, which can allow for reduced intensity, but increased color accuracy. Typically, LCDs have opted for greater intensity and reduced color accuracy. In this case, if the prior art electrochromic medium is used, there may be primaries that shift colors as the electrochromic medium shifts from high transmittance to low transmittance. However, even with the prior art electrochromic medium, the adverse effect the electrochromic medium may have on the light viewed there through may, at least partially, be compensated for by dynamically controlling how the light is emitted from the display device 136.

According to one embodiment, using an RGB video display (e.g., the display device 136) behind the electrochromic element 134 can compensate for adverse attenuation of the emitted light by adjusting a relative intensity of the red, green, and blue emitters in order to maintain better color rendering. For example, in the case of transmission that was greater for the blue region of the spectrum and lesser for the red region it may be desirable to decrease the intensity of the blue emitter and increase the intensity of the red emitter. This type of adjustment can be appropriate in this and other designs whether the spectral bias of the transmission is a gentle slope or one with more distance bands of transmission.

When the display device 136 is intended for use when the mirror element is dimmed, intensity adjustments may be made to compensate for any spectral bias from the coatings and, of, the activated electrochromic medium 126. The intensity adjustment may be a function of the operating voltage of the electrochromic system 138, and/or other feedback mechanism to match the relative RGB intensities appropriately for a given point in the color excursion of the electrochromic element 134.

Optionally because tolerances of electrochromic element 134 construction can include, but are not limited to, cell spacing, sheet resistances of coatings, and drive circuit components, it can be difficult to determine precisely the point on the color excursion curve a device will be based on a look up table with respect to a voltage. Also, because the electrochromic element 134 can attain the low transmittance state at lower temperatures at a lesser voltage than when at a higher temperature, the characteristic of voltage may not adequately define the position on a color excursion curve for a particular device. For example, the outside electrochromic mirror 111a, 111b may be operating at a temperature that is sufficiently different than an inside mirror 110 to place it on a different location on the color excursion curve for a given voltage. In addition some components of the electrochromic medium 126 experience a shift in their spectral absorption characteristics with temperature. So, depending on the color accuracy required for a particular display application in various transmittance states, methods other than a voltage look up table may assist some embodiments to perform more optimally. A look up table containing both element voltage and current draw data, may, in some embodiments provide a more accurate sense of the transmitted color of the element. A circuit, such as those described in U.S. Pat. No. 6,222,177, entitled "ELECTROCHROMIC ELEMENT DRIVER WITH A NEGATIVE OUTPUT RESISTANCE," the entire reference hereby being incorporated herein by reference, may also, in some embodiments, improve the accuracy of any adjustments to a display.

Figure 21:
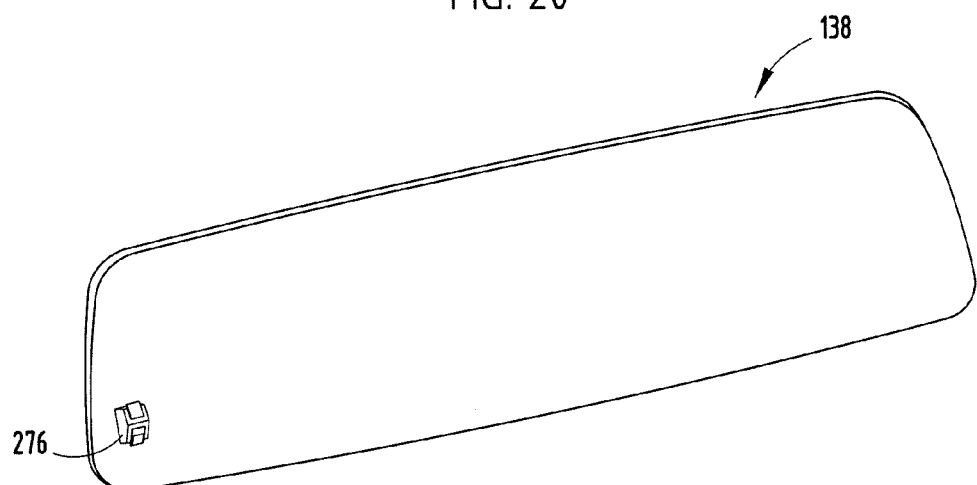
FIG. 21 is a perspective view of a rearview mirror assembly having a display device that includes a sensor, in accordance with one embodiment of the present invention.
Figure 22:
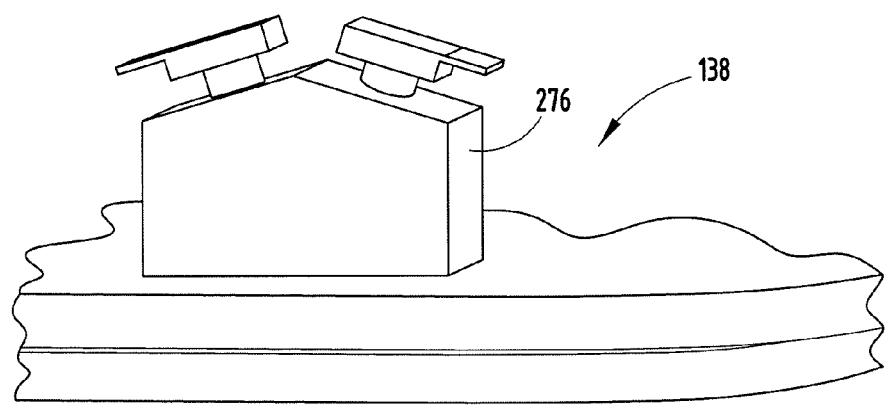
FIG. 22 is a perspective view of the display device of FIG. 21.

With respect to FIGS. 21 and 22, according to one embodiment, methods using an additional sensor 276 behind the electrochromic element 134 facing the rear of the vehicle can be used for attaining an accurate reading. If a glare sensor is in an electrochromic system 138 outside of the darkening region, such as the "chin" of an inside mirror 110 assembly, looking through a partially transmissive reflective ring bezel, or is in the bezel, another sensor just inside the darkening region can receive light from the same glare sources. When the two signals are compared, the degree of attenuation of the signal between the sources can, via a lookup table, or other algorithm, yield the position on a color excursion curve that would translate into an intensity adjustment of the colors in a display, such as an RGB display or other combinatorial color display. In another embodiment, a reflective region such as a dot can be placed on the first or second surface of an electrochromic system 138, and a signal is emitted through the electrochromic element 134 from the rear of the electrochromic element 134 and the reflected signal measured. Based on the attenuation of that signal, the degree of dimming of the display device 136 can, and therefore its position on a color excursion curve, can be determined and, again, adjustments to the display device 136 can be made. The light signal reflected by the dot could be of a single spectral makeup, or it could be pulsed between signals of different make ups. If an RGB display were being adjusted, it could in some embodiments be advantageous to quickly pulse between at least one red light, at least one blue light, and at least one green light for the signal to the reflector of similar spectral characteristics used in the display device 136, and adjust the RGB display based on the relative attenuation detected between those signals.

When used as an inside rearview mirror, the inside mirror assembly 110 can exhibit a high end reflectance of at least about sixty percent (60%) while also exhibiting a transmittance of at least five percent (5%) and at least the area in front of the display device 136, according to one embodiment. The display device 136 can be an LCD that, together with the electrochromic element 134 can be configured to provide a luminosity when viewed through the electrochromic element 134 of at least about two hundred fifty candelas per meter squared (250 cd/m$^2$). Alternatively, depending upon the requirements, suitable luminosity can be at least about four hundred candelas per meter squared (400 cd/m$^2$), at least about five hundred candelas per meter squared (500 cd/m$^2$), at least about six hundred candelas per meter squared (600 cd/m$^2$), at least about seven hundred candelas per meter squared (700 cd/m$^2$), at least about one thousand candelas per meter squared (1,000 cd/m$^2$), at least about one thousand five hundred candelas per meter squared (1,500 cd/m$^2$), at least about two thousand seven hundred fifty candelas per meter squared (2,750 cd/m$^2$), at least about thirty-five hundred candelas per meter squared (3,500 cd/m$^2$), at least about five thousand candelas per meter squared (5,000 cd/m$^2$), and at least about eight thousand candelas per meter squared (8,000 cd/m$^2$).

Referring again to FIGS. 7A-7H, the coatings of the third surface 114a can be sealably bonded to the coatings on the second surface 112b in a spaced-apart and parallel relationship by a seal member 116 disposed near the outer perimeter of both second surface 112b and third surface 114a. Seal member 116 may be any material that is capable of adhesively bonding the coatings on the second surface 112b to the coatings on the third surface 114a to seal the perimeter such that electrochromic material 126 does not leak from chamber 125. Optionally, the layer of transparent conductive coating 128 and the layer of reflector/electrode 120 may be removed over a portion where the seal member is disposed (typically not the entire portion, otherwise the drive potential could not be applied to the two coatings). In such a case, seal member 116 can typically bond well to glass.

The performance requirements for a perimeter seal member 116 used in an electrochromic system 138 are similar to those for a perimeter seal used in an LCD. The seal should have good adhesion to glass, metals and metal oxides; can have low permeabilities for oxygen, moisture vapor, and other detrimental vapors and gases; and cannot interact with or poison the electrochromic or liquid crystal material it is meant to contain and protect. The perimeter seal can be applied by means commonly used in the LCD industry, such as by silk-screening or dispensing. Totally hermetic seals, such as those made with glass frit or solder glass, can be used, but the high temperatures involved in processing (usually near four hundred fifty degrees (450° C.)) this type of seal can cause numerous problems, such as glass substrate warpage, changes in the properties of transparent conductive electrode, and oxidation or degradation of the reflector. Because of their lower processing temperatures, thermoplastic, thermosetting, or UV curing organic sealing resins can be used. Because of their excellent adhesion to glass, low oxygen permeability and good solvent resistance, epoxy-based organic sealing resins can be used. These epoxy resin seals may be UV curing, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments can be used. Cured resin crosslink density can be controlled by use of mixtures of mono-functional, di-functional, and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 116 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ, and 2P4MZ available from Shikoku Fine Chemicals, Tokyo, Japan; "ERISYS" DDA or DDA accelerated with U-405, 24EMI, U-410, and U-415 available from CVC Specialty Chemicals, Maple Shade, N.J.; and "AMICURE" PACM, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812 S, R202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z-6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif.

The layer of a transparent electrically conductive material 128 can be deposited on the second surface 112b to act as an electrode. Transparent conductive material 128 may be any material which bonds well to front element 112, is resistant to corrosion to any materials within the electrochromic system 138, resistant to corrosion by the atmosphere, has minimal diffuse or specular reflectance, high light transmission, near neutral coloration, and good electrical conductance. Transparent conductive material 128 may be fluorine-doped tin oxide, doped zinc oxide, indium zinc oxide ($Zn_3In_2O_6$), indium tin oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey Owens-Ford Co. of Toledo, Ohio, or other transparent conductors. Exemplary electrochromic systems are described in U.S. Pat. No. 7,688,495, entitled "THIN-FILM COATINGS, ELECTRO-OPTIC ELEMENTS AND ASSEMBLIES INCORPORATING THESE ELEMENTS," U.S. Patent Application Publication No. 2008/0302657, entitled "METHOD AND APPARATUS FOR ION MILLING," U.S. Patent Application Publication No. 2007/0201122, entitled "THIN-FILM COATINGS, ELECTRO-OPTIC ELEMENTS AND ASSEMBLIES INCORPORATING THESE ELEMENTS," and U.S. patent application Ser. No. 12/691,830, entitled "IMPROVED THIN-FILM COATINGS, ELECTRO-OPTIC ELEMENTS AND ASSEMBLIES INCORPORATING THESE ELEMENTS," the entire references hereby being incorporated herein by reference.

Generally, the conductance of transparent conductive material 128 will depend on its thickness and composition. IMI generally has superior conductivity compared with the other materials. Exemplary IMIs are described in U.S. Patent Application Publication No. 2007/0206263, entitled "ELECTRO-OPTICAL ELEMENT INCLUDING IMI COATINGS," the entire reference hereby incorporated herein by reference. IMI is, however, known to undergo more rapid environmental degradation and suffer from interlayer delamination. The thickness of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material 130 may be deposited between transparent conductive material 128 and the second surface 112b to suppress the reflection of any unwanted portions of the electromagnetic spectrum. According to one embodiment, half-ware ITO having a thickness of approximately 1450 Å, or eighty percent (80%) ITO having a thickness of approximately 1150 Å can be utilized.

Examples of electrochromic systems, display devices, and/or mirrors and components thereof are described in Canadian Patent No. 1,300,945, entitled "AUTOMATIC REARVIEW MIRROR SYSTEM FOR AUTOMOTIVE VEHICLES," U.S. Pat. No. 6,700,692, entitled "ELECTROCHROMIC REARVIEW MIRROR ASSEMBLY INCORPORATING A DISPLAY/SIGNAL LIGHT," U.S. Pat. No. 5,940,201, entitled "ELECTROCHROMIC MIRROR WITH TWO THIN GLASS ELEMENTS AND A GELLED ELECTROCHROMIC MEDIUM," U.S. Pat. No. 5,928,572, entitled "ELECTROCHROMIC LAYER AND DEVICES COMPRISING SAME," U.S. Pat. No. 5,434,407, entitled "AUTOMATIC REARVIEW MIRROR INCORPORATING LIGHT PIPE," U.S. Pat. No. 5,448,397, entitled "OUTSIDE AUTOMATIC REARVIEW MIRROR FOR AUTOMOTIVE VEHICLES," U.S. Pat. No. 6,157,480, entitled "SEAL FOR ELECTROCHROMIC DEVICES," U.S. Pat. No. 6,170,956, entitled "REARVIEW MIRROR WITH DISPLAY," U.S. Pat. No. 5,808,778, entitled "ELECTRO-OPTIC REARVIEW MIRROR FOR AUTOMOTIVE VEHICLES," U.S. Pat. No. 6,356,376, entitled "ELECTROCHROMIC REARVIEW MIRROR INCORPORATING A THIRD SURFACE METAL REFLECTOR AND A DISPLAY/SIGNAL LIGHT," U.S. Pat. No. 6,512,624, entitled "ELECTROCHROMIC REARVIEW MIRROR INCORPORATING A THIRD SURFACE PARTIALLY TRANSMISSIVE REFLECTOR," U.S. Pat. No. 7,009,751, entitled "ELECTROCHROMIC REARVIEW MIRROR INCORPORATING A THIRD SURFACE PARTIALLY TRANSMISSIVE REFLECTOR," U.S. Pat. No. 6,870,656, entitled "ELECTROCHROMIC REARVIEW MIRROR ELEMENT INCORPORATING A THIRD SURFACE REFLECTOR," U.S. Pat. No. 7,209,277, entitled "ELECTROCHROMIC REARVIEW MIRROR INCORPORATING A THIRD SURFACE REFLECTOR WITH AT LEAST ONE GRAPHICAL INDICIA," U.S. Pat. No. 7,417,781, entitled "ELECTROCHROMIC REARVIEW MIRROR INCORPORATING A THIRD SURFACE REFLECTOR," U.S. Pat. No. 6,020,987, entitled "ELECTROCHROMIC MEDIUM CAPABLE OF PRODUCING A PRE-SELECTED COLOR," U.S. Patent Application Publication No. 2009/0296190, entitled "REARVIEW MIRROR ASSEMBLIES WITH ANISOTROPIC POLYMER LAMINATES," U.S. Pat. No. 4,902,108, entitled "SINGLE-COMPARTMENT, SELF-ERASING, SOLUTION-PHASE ELECTROCHROMIC DEVICES, SOLUTIONS FOR USE THEREIN, AND USES THEREOF," U.S. Pat. No. 5,128,799, entitled "VARIABLE REFLECTANCE MOTOR VEHICLE MIRROR," U.S. Pat. No. 5,278,693, entitled, "TINTED SOLUTION-PHASE ELECTROCHROMIC DEVICES," U.S. Pat. No. 5,280,380, entitled "UV-STABILIZED COMPOSITIONS AND METHODS," U.S. Pat. No. 5,282,077, entitled "VARIABLE REFLECTANCE MIRROR," U.S. Pat. No. 5,294,376, entitled "FINISHER FOR AN IMAGE FORMING APPARATUS," U.S. Pat. No. 5,336,448, entitled "ELECTROCHROMIC DEVICES WITH BIPYRIDINIUM SALT SOLUTIONS," U.S. Pat. No. 5,818,625, entitled "DIMMABLE REARVIEW MIRROR INCORPORATING A THIRD SURFACE METAL REFLECTOR," U.S. Pat. No. 6,441,943, entitled "INDICATORS AND ILLUMINATORS USING A SEMICONDUCTOR RADIATION EMITTER PACKAGE," U.S. Pat. No. 6,521,916, entitled "RADIATION EMITTER DEVICES AND METHOD OF MAKING THE SAME," and U.S. Pat. No. 6,020,987, entitled "ELECTROCHROMIC MEDIUM CAPABLE OF PRODUCING A PRE-SELECTED COLOR," the entire references hereby being incorporated herein by reference.

Typically, thin silver or silver alloy layers are higher in blue-green transmission and lower in blue-green light reflection which imparts a yellow hue to the reflected image. For purposes of explanation and not limitation, a 2000 Å ITO underlayer of approximately ¾ wave in thickness can supplement the reflection of blue-green light which results in a more neutral hue in reflection. Other odd quarter wave multiples (e.g., ¼,⅝,⅞, etc.) can also be effective in reducing reflected hue. It should be noted that other transparent coatings, such as (F)SnO or (AL)ZnO, or a combination of dielectric, semiconductive, or conductive coatings, can be used to supplement blue-green reflection and produce a more neutral reflected hue in the same manner.

Referring to FIG. 3 for one embodiment of the present invention, a reflector/electrode that is made from a single layer of a reflective silver or silver alloy 121 is provided that is in contact with at least one solution-phase electrochromic material. The layer of silver or silver alloy covers at least part of the entire third surface 114a of second element 114. The reflective silver alloy means a homogeneous or non-homogeneous mixture of silver and one or more metals, or an unsaturated, saturated, or supersaturated solid solution of silver and one or more metals. The thickness of reflective layer 121 ranges from about 50 Å to about 2000 Å, or from about 200 Å to about 1000 Å. If reflective layer 121 is disposed directly to the glass surface, the glass surface can be treated by plasma discharge to improve adhesion. Examples of coatings and electrochromic systems are described in U.S. Pat. No. 7,746,534, entitled "THIN-FILM COATINGS, ELECTRO-OPTIC ELEMENTS AND ASSEMBLIES INCORPORATING THESE ELEMENTS," the entire reference hereby being incorporated herein by reference.

Figure 4:
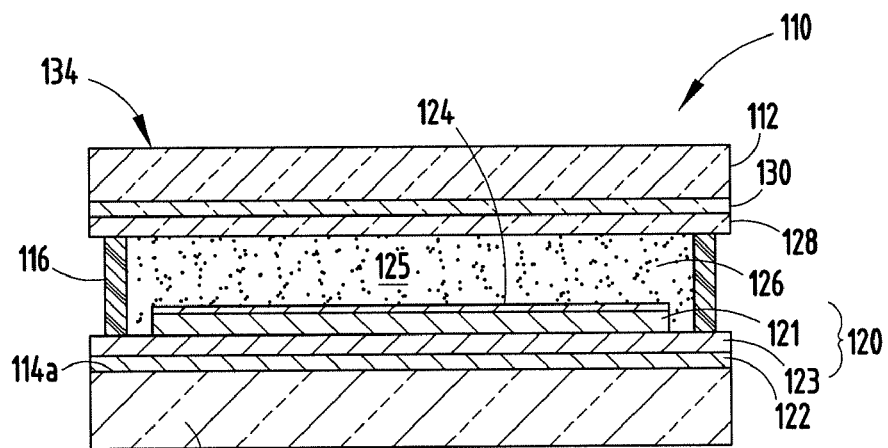
FIG. 4 is a cross-sectional view of an electrochromic mirror incorporating an alternate embodiment of a third surface reflector/electrode, taken on the line IV-IV of FIG. 2, in accordance with one embodiment of the present invention.

In another embodiment, the reflector/electrode 120 shown in FIG. 4 has at least two layers (121 and 122), where at least one layer of a base material 122 covers substantially the entire portion of the third surface 114a and at least one layer of a reflective material 121 covers the inner section of the third surface 114a, but does not cover the peripheral edge portion 125 where seal member 116 is disposed. Peripheral portion 125 may be created by masking that portion of layer 122 during deposition of the layer of reflective material 121, or the layer of reflective material may be deposited over the entire third surface and subsequently removed or partially removed in the peripheral portion. The masking of layer 122 may be accomplished by use of a physical mask or through other well-known techniques, such as photolithography and the like. Alternatively, layer 122 may be partially removed in the peripheral portion by a variety of techniques, such as, for example, by etching (laser, chemical, or otherwise), mechanical scraping, sandblasting, or otherwise. Laser etching can be used because of its accuracy, speed, and control. Partial removal is preferably accomplished by laser etching in a pattern where enough metal is removed to allow the seal member 116 to bond directly to the third surface 114a while leaving enough metal in this area such that the conductance in this area is not significantly reduced.

In addition, an optional intermediate layer of a conductive material 123 may be placed over the entire area of third surface 114a and disposed between the reflective layer 121 and the base layer 122, or it may be placed only under the area covered by layer 121, (e.g., not in peripheral edge portion 125). If this optional intermediate layer is utilized, it can cover the entire area of third surface 114a or it may be masked or removed from the peripheral edge portion as discussed above.

An optional flash over-coat layer 124 may be coated over the reflective layer 121. The reflective layer 121, the optional intermediate layer 123, and the base layer 122 can have properties similar to that described herein, except that the layer of reflective material 121 need not bond well to the epoxy seal, since it is removed in the peripheral portion where the seal member 116 is placed. Because the interaction with the epoxy seal is removed, silver metal itself, in addition to the alloys of silver described herein, will function as the reflective layer. Alternatively, an adhesion promoter can be added to the sealing material which enhances adhesion to silver or silver alloys and the reflective layer can be deposited over most of the third surface including substantial portions under the seal area. Such adhesion promoters are disclosed in U.S. Pat. No. 6,157,480, entitled "IMPROVED SEAL FOR ELECTROCHROMIC DEVICES," the entire reference hereby being incorporated herein by reference.

Figure 5A:
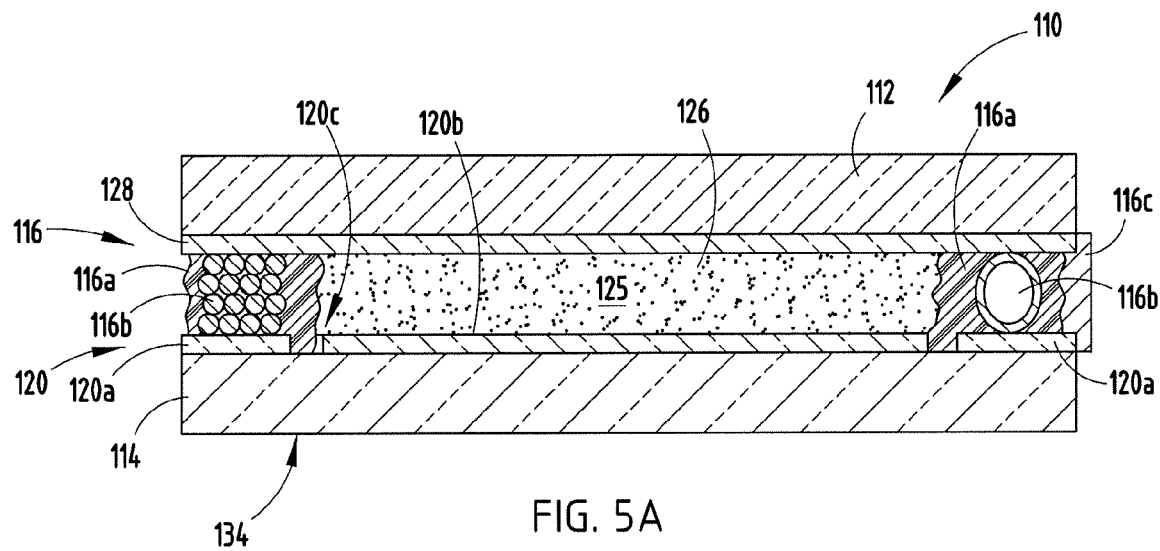
FIG. 5A is a cross-sectional view of an electrochromic system having an improved arrangement for applying a drive potential to the transparent conductor on the second surface of the mirror, in accordance with one embodiment of the present invention.
Figure 5B:
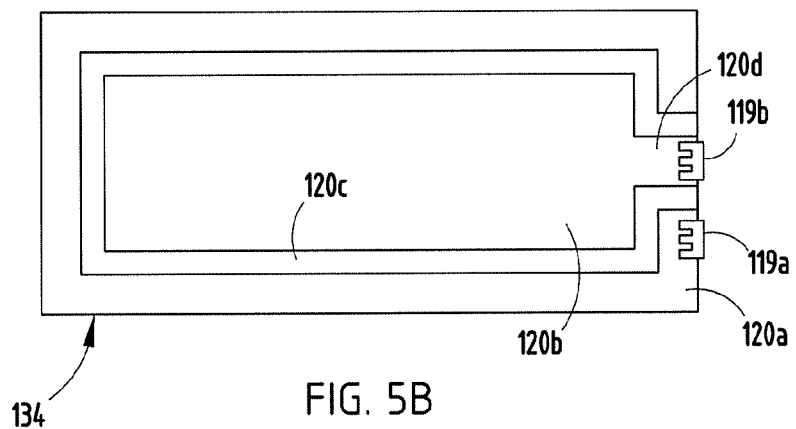
FIG. 5B is a top view of the third surface reflector of FIG. 5A, in accordance with one embodiment of the present invention.
Figure 6:
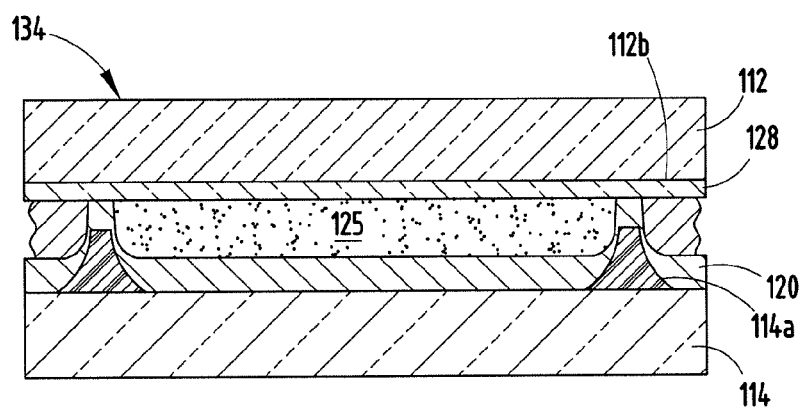
FIG. 6 is a cross-sectional view of an electrochromic system using a cured and machine-milled epoxy seal to hold the transparent elements in a spaced-apart relationship, in accordance with one embodiment of the present invention.
Figure 7A:
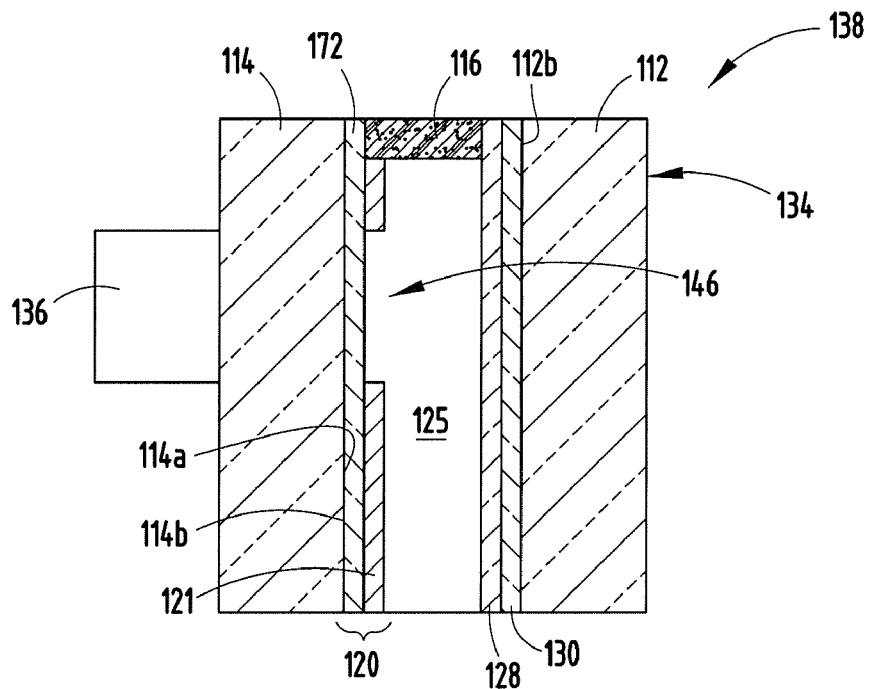
FIGS. 7A-7H are partial cross-sectional views of alternative constructions of an electrochromic system, in accordance with various embodiments of the present invention.
Figure 7B:
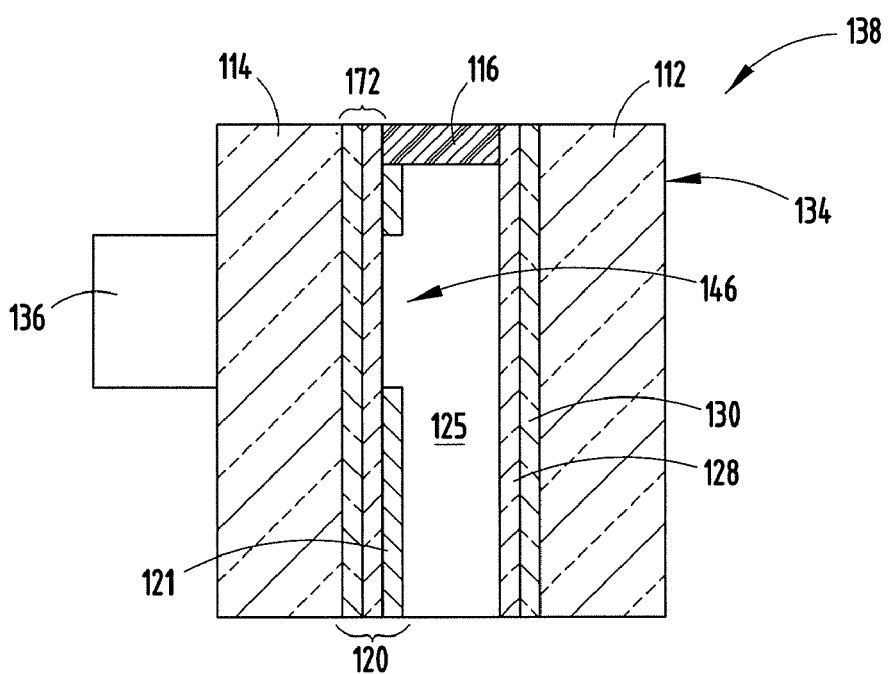
Figure 7C:
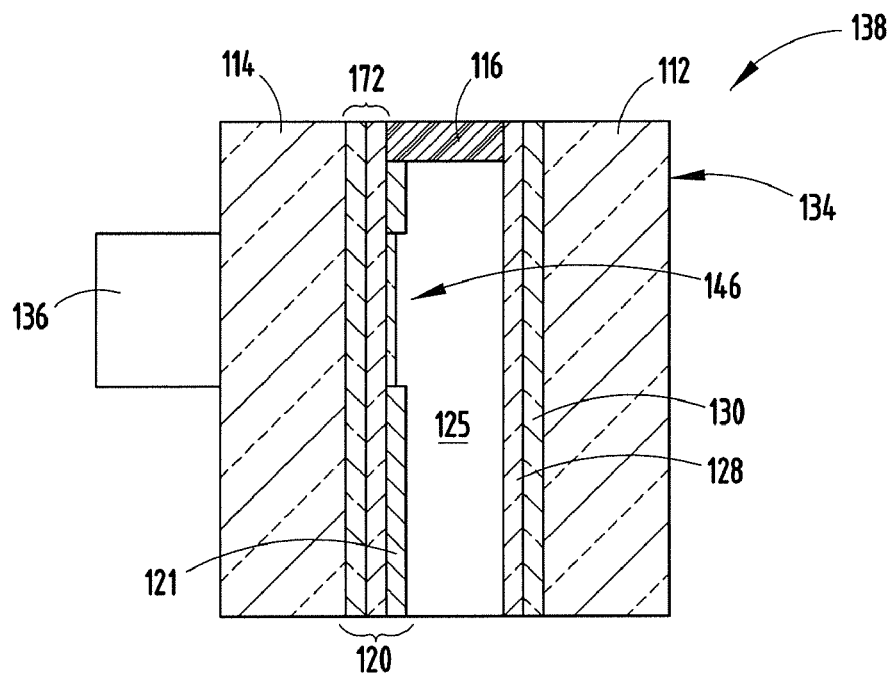
Figure 7D:
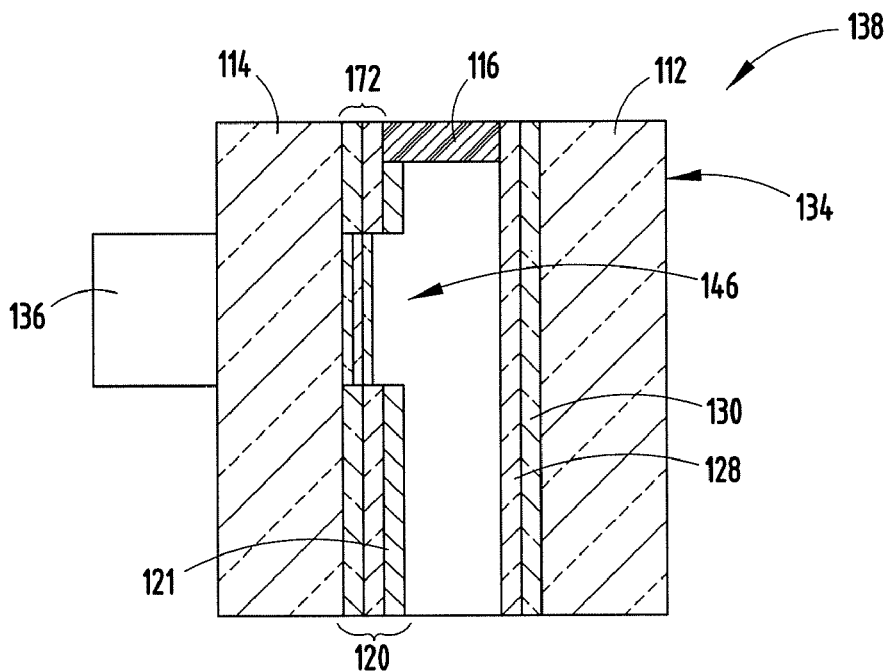
Figure 7E:
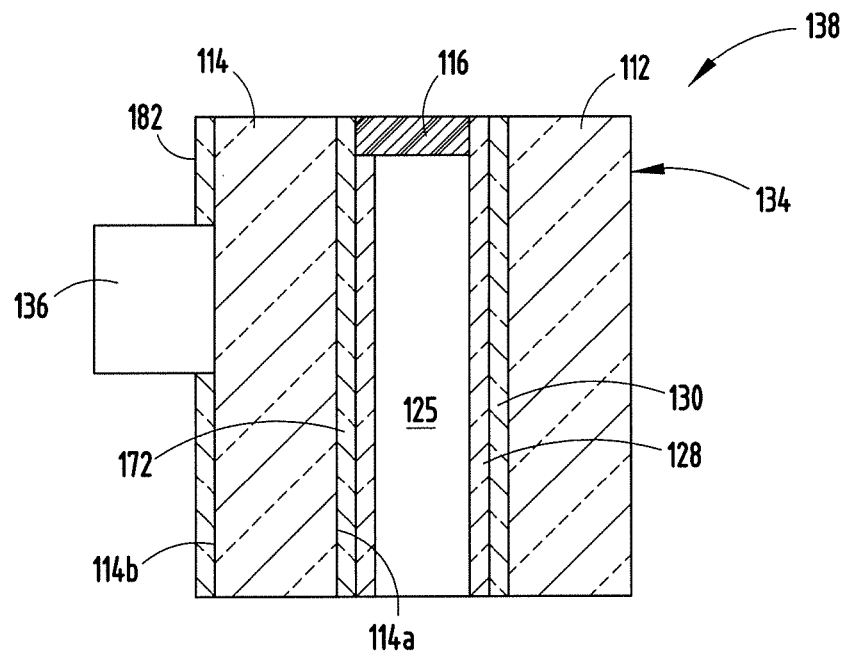
Figure 7F:
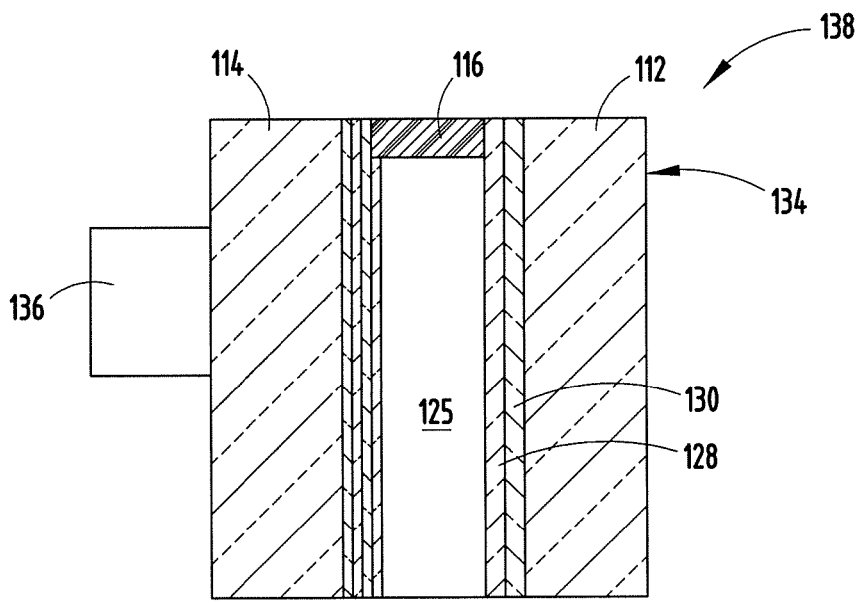
Figure 7G:
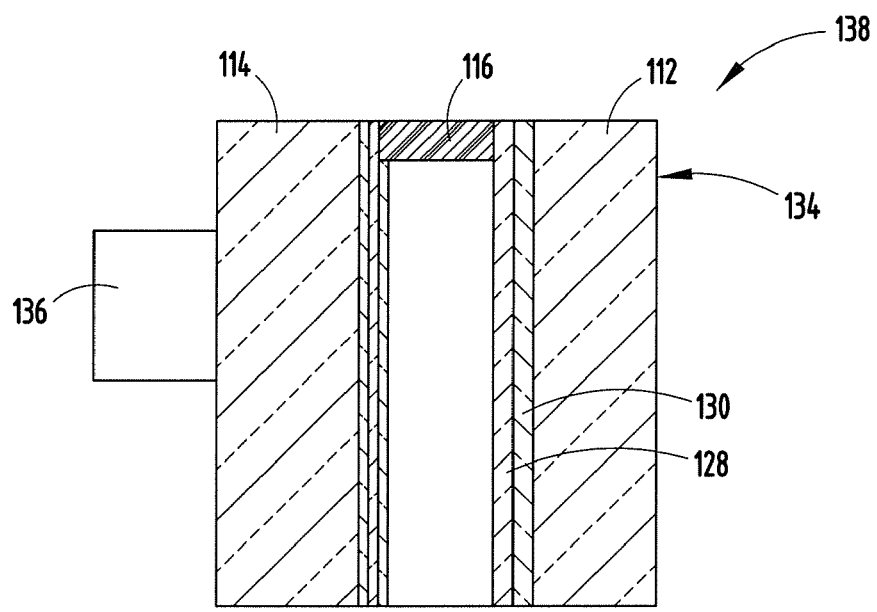
Figure 7H:
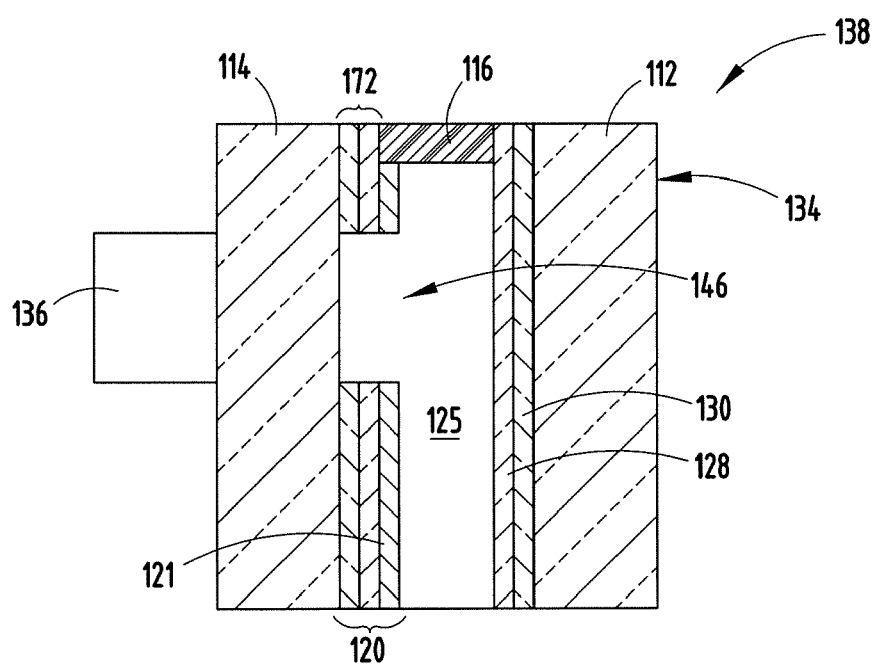
Figure 8:
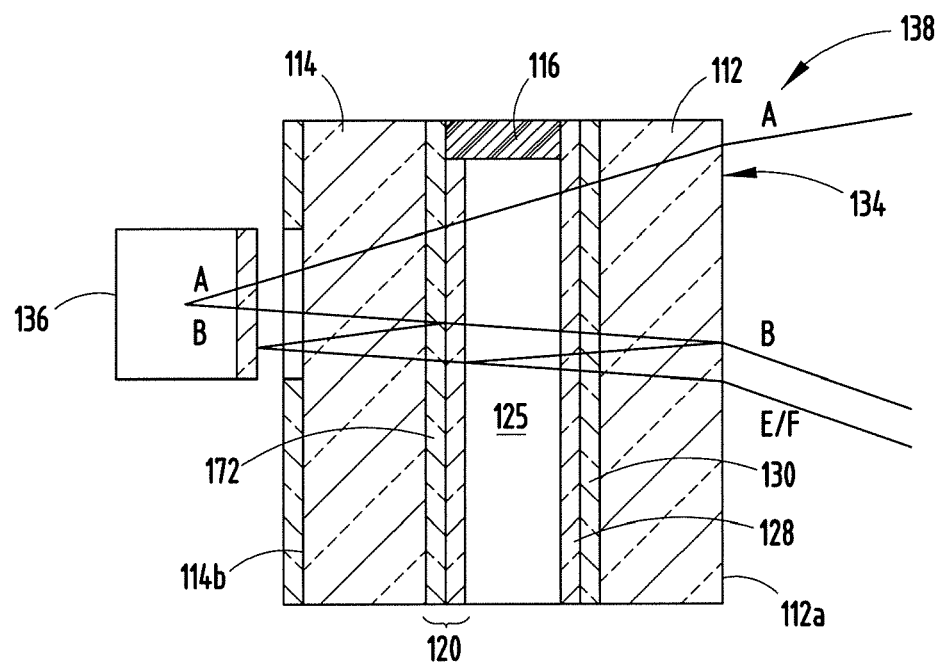
FIG. 8 is a partial cross-sectional view of an electrochromic system, in accordance with one embodiment of the present invention.
Figure 9A:
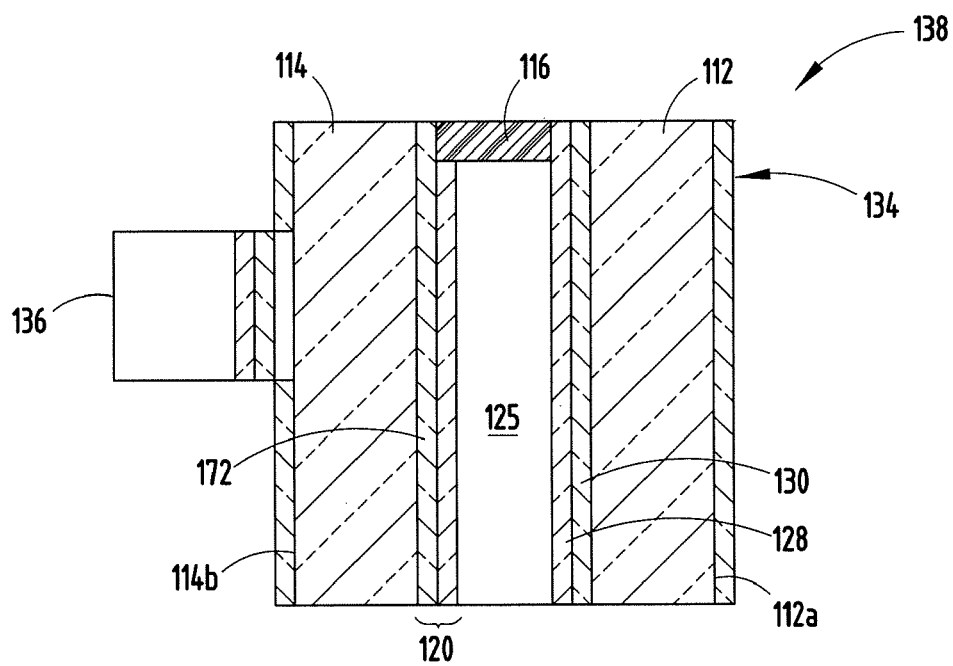
FIGS. 9A-9G are partial cross-sectional views of additional constructions of an electrochromic system, in accordance with various embodiments of the present invention.
Figure 9B:
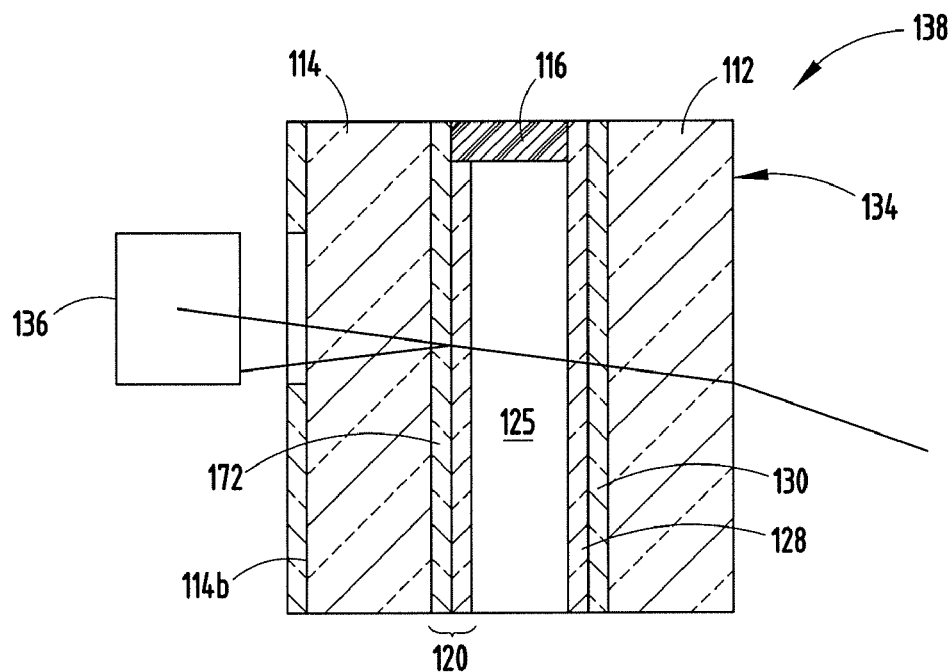
Figure 9C:
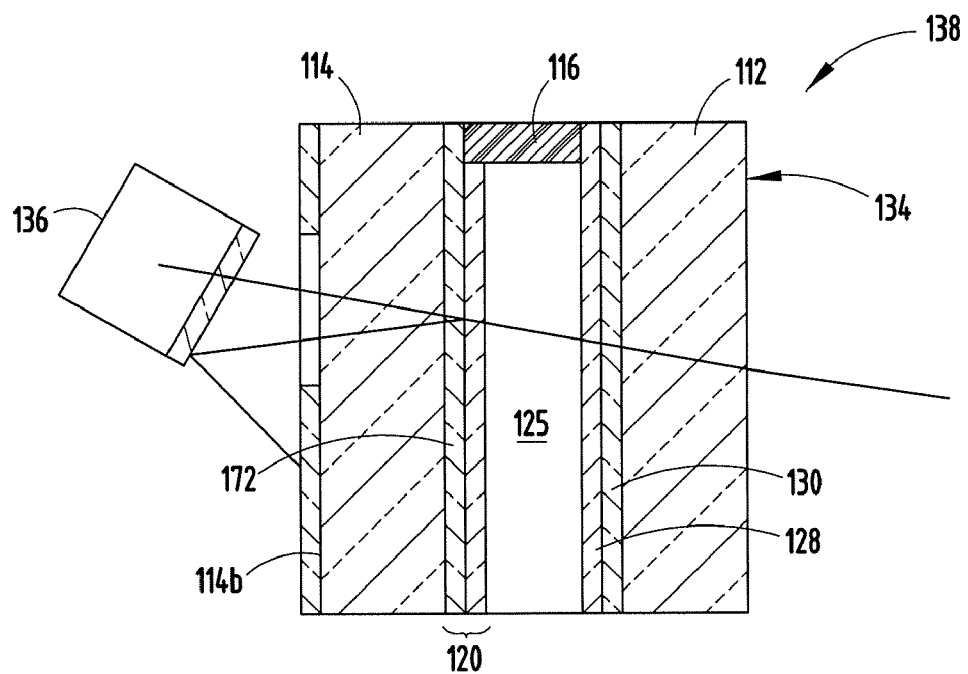
Figure 9D:
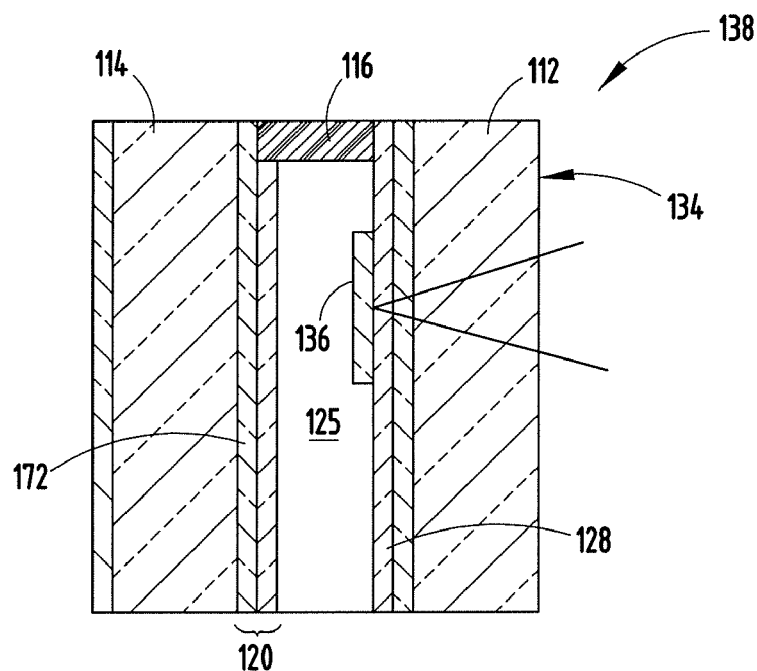
Figure 9E:
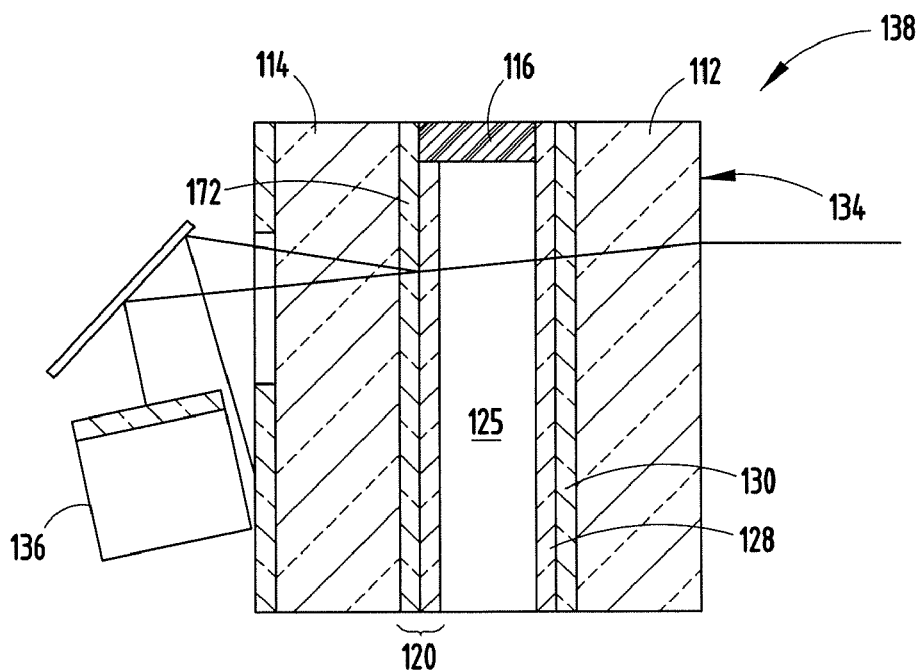
Figure 9F:
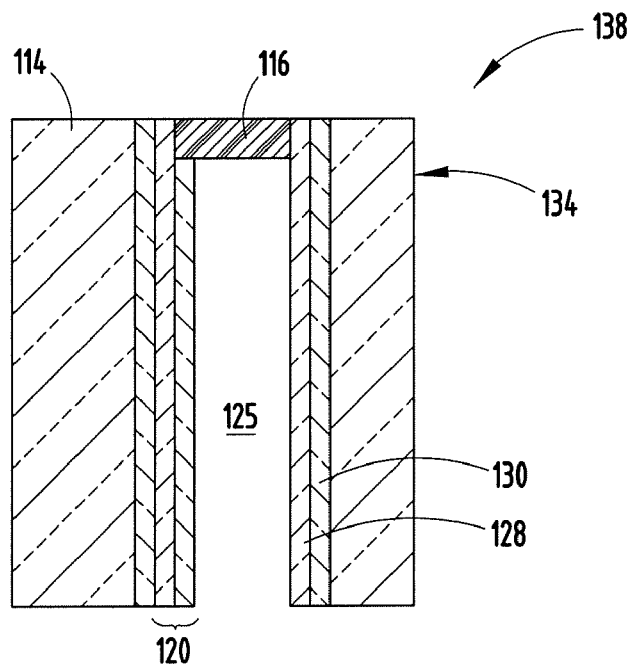
Figure 9G:
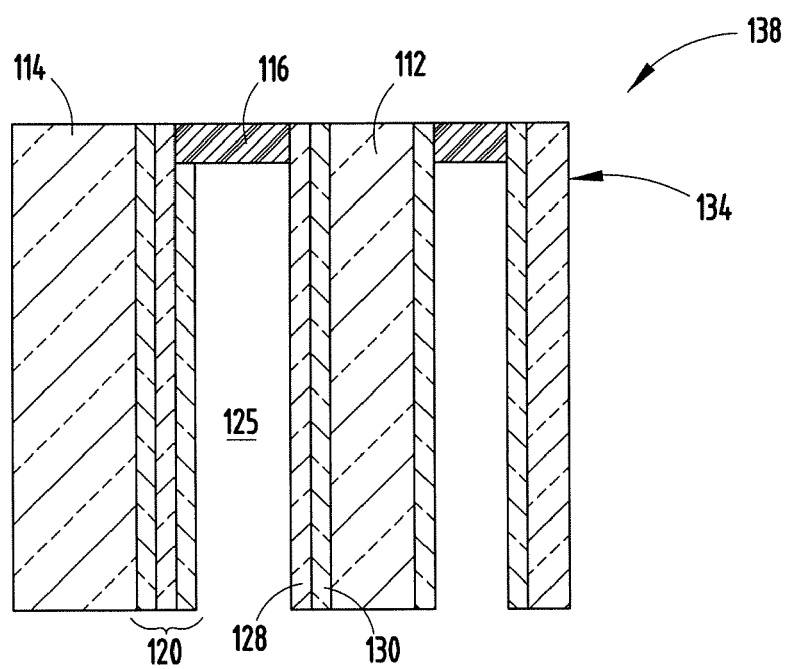

Referring now to FIGS. 5A and 5B, an improved mechanism for applying a drive potential to the layer of transparent conductive material 128 is shown. Electrical connection between the power supply and the layer of transparent conductive material 128 is made by connecting the buss bars (or clips 119a) to the area of reflector/electrode 120a, such that the drive potential travels through the area of reflector/electrode 120a and conductive particles 116b in sealing member 116 before reaching the transparent conductor 128. The reflector/electrode must not be present in area 120c, so that there is no chance of current flow from reflector/electrode area 120a to 120b. This configuration is advantageous in that it allows connection to the transparent conductive material 128 nearly all the way around the circumference, and therefore improves the speed of dimming and clearing of the electrochromic media 126.

In such a configuration, sealing member 116 comprises a typical sealing material, (e.g., epoxy 116a, with conductive particles 116b contained therein). The conductive particles may be small, such as, for example, gold, silver, copper, etc., coated plastic with a diameter ranging from about 5 microns to about 80 microns, in which case there should be a sufficient number of particles to ensure sufficient conductivity between the reflector/electrode area 120a and the transparent conductive material 128. Alternatively, the conductive particles may be large enough to act as spacers, such as, for example, gold, silver, copper, etc., coated glass or plastic beads. The reflector/electrode 120 is separated into two distinct reflector/electrode areas (120a and 120b, separated by an area 120c devoid of reflector/electrode). There are many methods of removing the reflector/electrode 120 from area 120c, such as, for example, chemical etching, laser ablating, physical removal by scraping, etc. Deposition in area 120c can also be avoided by use of a mask during deposition of reflector/electrode. Sealing member 116 with particles 116b contacts area 120a such that there is a conductive path between reflector/electrode area 120a and the layer of transparent conductive material 128. Thus, electrical connection to the reflector/electrode area 120b that imparts a potential to the electrochromic medium is connected through clips 119b to the electronic circuitry at reflector/electrode area 120d (FIG. 5B). No conductive particles 116b can be placed in this reflector/electrode area 120b because of the possibility of an electrical short between reflector/electrode area 120b and the layer of transparent conductive material 128. If such an electrical short occurred, the electrochromic system 138 would not operate properly. Additionally, no conductive seal 116b should be present in area 120b.

Layer 121 may be made of any of the reflective materials described above and can be made of silver or a silver alloy. The thickness of reflective layer 121 in the arrangement shown in FIG. 7A can be between 30 Å and 800 Å. The thickness of layer 121 will depend on the desired reflectance and transmittance properties. For an inside rearview mirror, layer 121 can have a reflectance of at least sixty percent (60%) and a transmittance through window 146 of ten percent (10%) to fifty percent (50%). For an outside mirror, the reflectance can be above thirty-five percent (35%) and the transmittance can be approximately ten percent (10%) to fifteen percent (15%), and/or at least twenty percent (20%) for those regions that are in front of one of the lights of a signal light.

Window 146 in layer 121 may be formed by masking window area 146 during the application of the reflective material. At this same time, the peripheral region of the third surface 114a may also be masked so as to prevent materials such as silver or silver alloy (when used as the reflective material) from being deposited in areas to which seal 116 must adhere, so as to create a stronger bond between seal 116 and coating 172 or element 114. Additionally, an area in front of sensor 160 (FIG. 2) may also be masked.

The masking of window 146 in layer 121 may be a discrete mask such that none of the material of layer 121 is deposited within window area 146, or a gradient mask may be utilized, which gradually reduces the amount of the material of layer 121 from the periphery of window 146 to its center. The extent of the gradient masking may vary considerably such that virtually none of the material of layer 121 is provided over much of the display area of window 146 with just gradient edges surrounding window 146 to a configuration whereby all of window 146 is covered with at least some portion of the material of layer 121. Alternative constructions are illustrated in FIGS. 6, 7B-7H, 8, and 9A-9G. It should be noted that the optical constants of materials vary somewhat with deposition method and conditions employed. These differences can have a substantial effect on the actual optical values and optimum thicknesses used to attain a value for a given coating stack.

Figures 34A, 34B, 35:
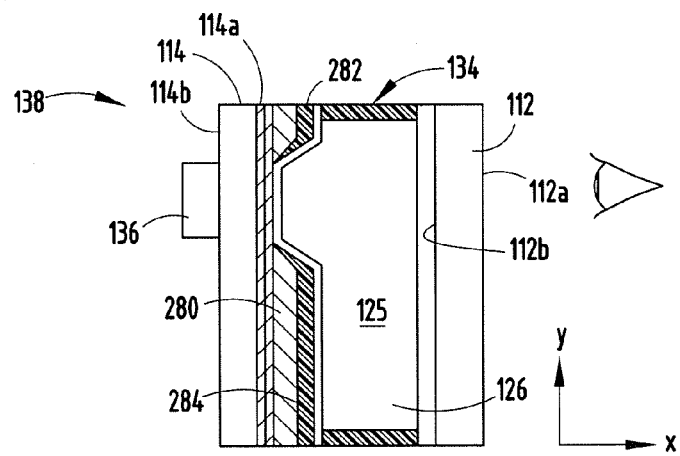
FIG. 34A is a table illustrating calculated reflective color for various idealized thin film stacks in the low reflectance state, in accordance with one or more embodiments of the present invention.
FIG. 34B is a table illustrating three examples of coating stacks that can provide neutral reflected color, in accordance with one or more embodiments of the present invention.
FIG. 35 is a cross-sectional view of an electrochromic system that includes a graded transition between an opaque area and a display area, in accordance with one embodiment of the present invention.

Another embodiment is illustrated in FIG. 35, wherein the electrochromic device 138 (e.g., a multi-zone mirror element) can be structured with a stack 278 having an upper reflecting layer 284, the thickness of which is not substantially uniform but rather slightly variable. In the following description, therefore, a reference is made to elements of the general thin-film structure of the embodiment of the electrochromic element 134, as illustrated in FIG. 35, and the differences in thin-film structure are emphasized. The electrochromic element 134, as illustrated in FIG. 35, can also include a supporting base 286, which has a base layer 288, an ITO layer 290, an opaque region 292, a transflective region 294, and a transition region 296.

The properties of the stack are summarized in the table of FIG. 36 as a function of a one-dimensional position (corresponding to the y-axis of FIG. 35) along the third surface 114a of the electrochromic element 134. The electrochromic element 134 can include three metallic layers that change in thickness, which can be positioned across the third surface 114a. Such metallic layers can include, but are not limited to, a layer of Chromium 280, a layer of Ruthenium 282, and a layer of silver alloy 284. The essentially opaque area can be seen to extend approximately between the positions identified as −0.75 in and 5 in across the substrate. The transflective display area, extending approximately between the positions of −5 in and 1.75 in, utilizes only three of the five layers listed in table of FIG. 36. In this embodiment, the graded Chromium opacifying layer 280, deposited on the supporting base that can include a glass substrate and a base bi-layer of $TiO_2$ and ITO, asymptotically extends into the transflective display area. A flash opacifying layer 282 of Ruthenium, deposited above the Chromium layer 280, extends asymptotically into the transflective display area beyond the extent of the Chromium layer 280. The fairly complicated thickness profile of an upper continuous reflecting layer 284 of silver alloy assures a substantially linear change in reflectance between the opaque area and display area.

Yet another alternative embodiment represents a modification of the electrochromic system 138 of FIG. 35 by employing a non-uniform reflective layer 284. Such an embodiment may generally achieve an approximately uniform reflectance in excess of at least fifty percent (50%) across the surface of the mirror element and a transmittance levels below approximately five percent (5%) in the opaque area and below approximately fifty percent (50%) in the transflective area. In a specific embodiment, an approximately uniform reflectance of about sixty-five percent (65%) across the surface of the mirror element may be achieved, while simultaneously keeping transmittance level well below a half percent (0.5%) in the opaque area and above twenty percent (20%) in the transflective area. The geometry of thin-film layers comprising a thin-film stack that may be deposited on the third surface to achieve such properties, as described in the table of FIG. 37.

Figures 38, 39:
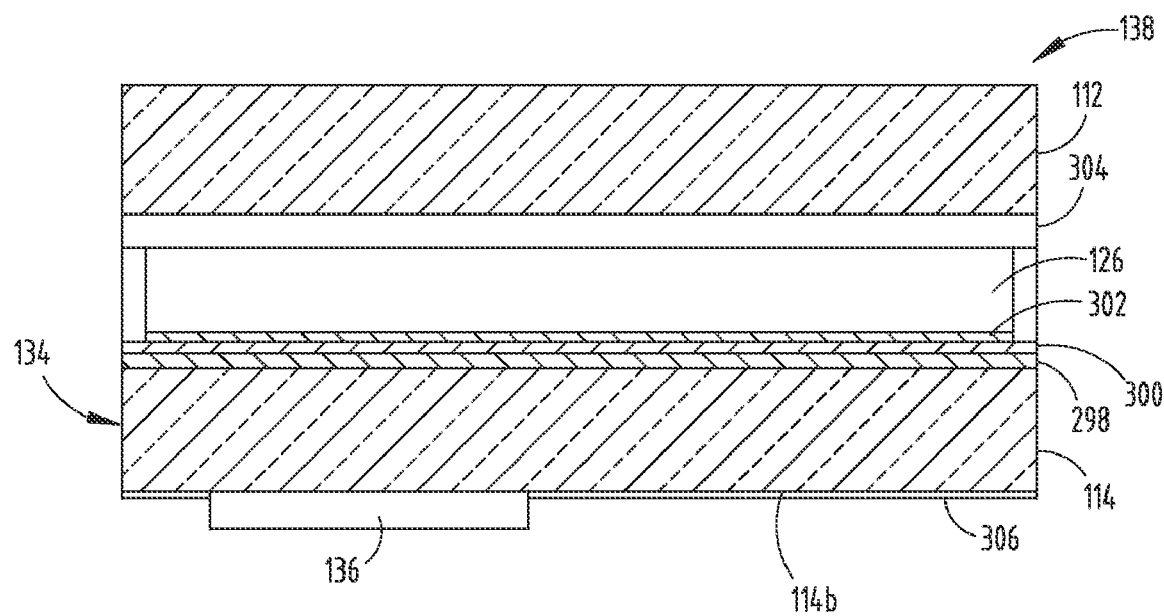
FIG. 38 is a cross-sectional view of an electrochromic system, in accordance with one embodiment of the present invention.
FIG. 39 is a table of characteristics of a stack in an electrochromic system, in accordance with one embodiment of the present invention.

With respect to FIG. 38, another exemplary embodiment of the electrochromic system 138 is illustrated. In such an embodiment, at least one of the front element 112 and the rear element 114 can include an approximately 1.6 mm glass substrate. A $TiO_2$ layer 298 can be approximately 144 Å thick, and an ITO layer 300 can be approximately 180 Å thick. A silver alloy layer 302 can be approximately 240 Å thick, and additionally or alternatively, include approximately seven percent (7%) gold. The cell spacing filled with the electrochromic medium 126 can be approximately 160 microns, and the ITO layer 304 can be approximately 1450 Å thick. An appliqué layer 306 can be on the fourth surface 114b. Various exemplary characteristics of the electrochromic system 138 are described in the table of FIG. 39.

By way of explanation and not limitation, the electrochromic medium 126 can include at least one solvent, at least one anodic electroactive material, and at least one cathodic electroactive material. One or more of the solvent, the anodic electroactive material, and the cathodic electroactive material can be adapted to reduce a perceived color change of light viewed there through (e.g., be approximately neutral). Examples of such electrochromic mediums are described in U.S. Patent Application Publication No. 2010/0073754, entitled "ULTRAVIOLET LIGHT STABILIZING COMPOUNDS AND ASSOCIATED MEDIA AND DEVICES," U.S. Pat. No. 7,428,091, entitled "SEMICONDUCTOR DEVICE HAVING DELAY DRIFT COMPENSATION CIRCUIT THAT COMPENSATES FOR DELAY DRIFT CAUSED BY TEMPERATURE AND VOLTAGE VARIATIONS IN CLOCK TREE," and U.S. Pat. No. 7,256,924, entitled "MULTI-CELL ELECTROCHROMIC DEVICES," the entire references hereby being incorporated herein by reference. Other examples are discussed in U.S. Pat. No. 6,141,137, entitled "ELECTROCHROMIC MEDIA FOR PRODUCING A PRESELECTED COLOR," and U.S. Pat. No. 6,037,471, entitled "ELECTROCHROMIC COMPOUNDS," the entire references hereby being incorporated herein by reference.

As described above, the components of the electrochromic element 134 can be selected to reduce adverse attenuation effects of the electrochromic medium 126 in various transmittance states. For purposes of explanation and not limitation, the below Examples 1-17, referenced in the tables of FIGS. 17A-17I, describe various electrochromic solutions, which can be adapted to at least partially reduce a perceived color change of light viewed through the electrochromic element 134, as described above.

EXAMPLE #1

Prior Art

In a flask, under a nitrogen purge, is added 567.5 milligrams of 5,10-dimethyl-5,10-dihydrophenazine, 16.3 milligrams of 1,1',2,2',3,3',4,4',5,5'-decamethyl ferrocene, 677.3 milligrams of TINUVIN 384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1,779.8 milligrams of 1,1'-di(octyl)-4,4'-dipyridinium bis tetrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective minor elements are vacuum-filled with this solution. These minor elements are heated to 85° C. for 2 hours to cure the polyurethane gel and then are wired to a variable voltage power supply. LED backlighting is placed behind the elements and they are then darkened at various potentials and color measurements are taken. The construction of the electrochromic transflective mirror element, configured with LED backlighting, for Examples 1-13, is described below.

EXAMPLE #2

In a flask, under a nitrogen purge, is added 510.7 milligrams of 5,10-dimethyl-5,10-dihydrophenazine, 132.3 milligrams of 5,10-dineopentyl-5,10-dihydro-2,7-[2-(ethyl)hexyl]phenazine, 16.3 milligrams of 1,1',2,2',3,3',4,4',5,5'-decamethyl ferrocene, 677.3 milligrams of TINUVIN 384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1,779.8 milligrams of 1,1'-di(octyl)-4,4'-dipyridinium bis tetrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #3

In a flask, under a nitrogen purge, is added 499.4 milligrams of 5,10-dimethyl-5,10-dihydrophenazine, 158.8 milligrams of 5,10-dineopentyl-5,10-dihydro-2,7-[2-(ethyl)hexyl] phenazine, 16.3 milligrams of 1,1',2,2',3,3',4,4',5,5'-decamethyl ferrocene, 677.3 milligrams of TINUVIN384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1,779.8 milligrams of 1,1'-di(octyl)-4,4'-dipyridinium bis tretrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #4

In a flask, under a nitrogen purge, is added 499.4 milligrams of 5,10-dimethyl-5,10-dihydrophenazine, 158.8 milligrams of 5,10-dineopentyl-5,10-dihydro-2,7-[2-(ethyl)hexyl]phenazine, 16.3 milligrams of 1,1',2,2',3,3',4,4',5,5'-decamethyl ferrocene, 677.3 milligrams of TINUVIN384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1,779.8 milligrams of 1,1'-di(octyl)-4,4'-dipyridinium bis tetrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #5

In a flask, under a nitrogen purge, is added 521.6 milligrams of 5,10-dimethyl-5,10-dihydrophenazine, 105.8 milligrams of 5,10-dineopentyl-5,10-dihydro-2,7-[2-(ethyl)hexyl] phenazine, 16.3 milligrams of 1,1',2,2',3,3',4,4',5,5'-decamethyl ferrocene, 677.3 milligrams of TINUVIN384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1,779.8 milligrams of 1,1'-di(octyl)-4,4'-dipyridinium bis tetrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective minor elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #6

In a flask, under a nitrogen purge, is added 533.0 milligrams of 5,10-dimethyl-5,10-dihydrophenazine, 79.4 milligrams of 5,10-dineopentyl-5,10-dihydro-2,7-[2-(ethyl)hexyl] phenazine, 16.3 milligrams of 1,1',2,2',3,3',4,4',5,5'-decamethyl ferrocene, 677.3 milligrams of TINUVIN384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1,779.8 milligrams of 1,1'-di(octyl)-4,4'-dipyridinium bis tetrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #7

In a flask, under a nitrogen purge, is added 437.2 milligrams of 5,10-dimethyl-5,10-dihydrophenazine, 254.8 milligrams of 5,10-dineopentyl-5,10-dihydro-2,7-[2-(ethyl) hexyl] phenazine, 16.3 milligrams of 1,1',2,2',3,3',4,4',5,5'-decamethyl ferrocene, 677.3 milligrams of TINUVIN384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1724.2 milligrams of 1,1'-di(octyl)-4,4'-dipyridinium bis tetrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #8

In a flask, under a nitrogen purge, is added 382.6 milligrams of 5,10-dimethyl-5,10-dihydrophenazine, 382.2 milligrams of 5,10-dineopentyl-5,10-dihydro-2,7[2-(ethyl)hexyl] phenazine, 16.3 milligrams of 1,1',2,2',3,3',4,4',5,5'-decamethyl ferrocene, 677.3 milligrams of TINUVIN384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1724.2 milligrams of 1,1'-di(octyl)-4,4'-dipyridinium bis tetrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #9

In a flask, under a nitrogen purge, is added 685.8 milligrams of 5,10-dineopentyl-5,10-dihydrophenazine, 181.3 milligrams of 5,10-dineopentyl-5,10-dihydro-2,7[2-(ethyl) hexyl] phenazine, 16.3 milligrams of 1,1',2,2',3,3',4,4',5,5'-decamethyl ferrocene, 677.3 milligrams of TINUVIN384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1646.3 milligrams of 1,1'-di(octyl)-4,4'-dipyridinium bis tetrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #10

In a flask, under a nitrogen purge, is added 563.5 milligrams of 5,10-dineopentyl-5,10-dihydrophenazine, 367.5 milligrams of 5,10-dineopentyl-5,10-dihydro-2,7-[2-(ethyl) hexyl]phenazine, 16.3 milligrams of 1,1',2,2',3,3',4,4',5,5'-decamethyl ferrocene, 677.3 milligrams of TINUVIN 384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1646.3 milligrams of 1,1'-di(octyl)-4,4'-dipyridinium bis tetrafluoroborate, 20.6 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #11

In a flask, under a nitrogen purge, is added 563.5 milligrams of 5,10-dineopentyl-5,10-dihydrophenazine, 367.5 milligrams of 5,10-dineopentyl-5,10-dihydro-2,7-[2-(ethyl) hexyl]phenazine, 16.3 milligrams of 1,1',2,2',3,3',4,4',5,5'-decamethyl ferrocene, 677.3 milligrams of TINUVIN 384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1646.3 milligrams of 1,1'-di(octyl)-4,4'-dipyridinium bis tetrafluoroborate, 41.2 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #12

In a flask, under a nitrogen purge, is added 586.0 milligrams of 5,10-dineopentyl-5,10-dihydrophenazine, 382.2 milligrams of 5,10-dineopentyl-5,10-dihydro-2,7-[2-(ethyl)

hexyl]phenazine, 16.3 milligrams of 1,1',2,2',3,3',4,4',5,5'-decamethyl ferrocene, 677.3 milligrams of TINUVIN 384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1629.6 milligrams of 1,1'-di(octyl)-4,4'-dipyridinium bis tetrafluoroborate, 82.4 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #13

In a flask, under a nitrogen purge, is added 1,339.5 milligrams of 5,10-dineopentyl-5,10-dihydrophenazine, 509.6 milligrams of 5,10-dineopentyl-5,10-dihydro-2,7-[2-(ethyl) hexyl] phenazine, 32.6 milligrams of 1,1',2,2',3,3',4,4',5,5'-decamethyl ferrocene, 1354.7 milligrams of TINUVIN 384™ (Ciba Geigy), 35.2 grams of 1:10 2(hydroxy)-ethyl methacrylate: methacrylate copolymer, 0.48 milligrams of dibutyl tin diacetate and 82 grams of propylene carbonate. This solution is stirred and heated at 85° C. for 2 hours to dissolve. To a second flask, that is being purged with nitrogen, is added 3259.3 milligrams of 1,1'-di(octyl)-4,4'-dipyridinium bis tetrafluoroborate, 165.2 milligrams of 1,1',2,2',3,3',4,4',5,5'-decamethyl ferrocinium tetrafluoroborate, 360 milligrams of LUPRANATE™ (BASF) and 116 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #14

In a flask, under a nitrogen purge, is added 1,172.1 milligrams of 5,10-dineopentyl-5,10-dihydrophenazine, 764.4 milligrams of 5,10-dineopentyl-5,10-dihydro-2,7-[2-(ethyl) hexyl]phenazine, 32.6 milligrams of 1,1',2,2',3,3',4,4',5,5'-decamethyl ferrocene, 1354.7 milligrams of TINUVIN 384™ (Ciba Geigy), 35.2 grams of 1:10 2(hydroxy)-ethyl methacrylate: methacrylate copolymer, 0.48 milligrams of dibutyl tin diacetate and 82 grams of propylene carbonate. This solution is stirred and heated at 85° C. for 2 hours to dissolve. To a second flask, that is being purged with nitrogen, is added 3259.3 milligrams of 1,1'-di(octyl)-4,4'-dipyridinium bis tetrafluoroborate, 165.2 milligrams of 1,1',2,2',3,3',4,4',5,5'-decamethyl ferrocinium tetrafluoroborate, 360 milligrams of LUPRANATE™ (BASF) and 116 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken. The construction of the electrochromic transflective mirror element, configured with LED backlighting, for Examples 14-16, is described below.

EXAMPLE #15

In a flask, under a nitrogen purge, is added 1,339.5 milligrams of 5,10-dineopentyl-5,10-dihydrophenazine, 509.6 milligrams of 5,10-dineopentyl-5,10-dihydro-2,7-[2-(ethyl) hexyl] phenazine, 32.6 milligrams of 1,1',2,2',3,3',4,4',5,5'-decamethyl ferrocene, 1354.7 milligrams of TINUVIN 384™ (Ciba Geigy), 35.2 grams of 1:10 2(hydroxy)-ethyl methacrylate: methacrylate copolymer, 0.48 milligrams of dibutyl tin diacetate and 82 grams of propylene carbonate. This solution is stirred and heated at 85° C. for 2 hours to dissolve. To a second flask, that is being purged with nitrogen, is added 3259.3 milligrams of 1,1'-di(octyl)-4,4'-dipyridinium bis tetrafluoroborate, 165.2 milligrams of 1,1',2,2',3,3',4,4',5,5'-decamethyl ferrocinium tetrafluoroborate, 360 milligrams of LUPRANATE™ (BASF) and 116 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #16

In a flask, under a nitrogen purge, is added 1,255.8 milligrams of 5,10-dineopentyl-5,10-dihydrophenazine, 637.0 milligrams of 5,10-dineopentyl-5,10-dihydro-2,7-[2-(ethyl) hexyl]phenazine, 32.6 milligrams of 1,1',2,2',3,3',4,4',5,5'-decamethyl ferrocene, 1354.7 milligrams of TINUVIN 384™ (Ciba Geigy), 35.2 grams of 1:10 2(hydroxy)-ethyl methacrylate: methacrylate copolymer, 0.48 milligrams of dibutyl tin diacetate and 82 grams of propylene carbonate. This solution is stirred and heated at 85° C. for 2 hours to dissolve. To a second flask, that is being purged with nitrogen, is added 3259.3 milligrams of 1,1'-di(octyl)-4,4'-dipyridinium bis tetrafluoroborate, 165.2 milligrams of 1,1',2,2',3,3',4,4',5,5'-decamethyl ferrocinium tetrafluoroborate, 360 milligrams of LUPRANATE™ (BASF) and 116 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken.

EXAMPLE #17

In a flask, under a nitrogen purge, is added 608.5 milligrams of 5,10-dineopentyl-5,10-dihydrophenazine, 396.9 milligrams of 5,10-dineopentyl-5,10-dihydro-2,7-[2-(ethyl) hexyl]phenazine, 16.3 milligrams of 1,1',2,2',3,3',4,4',5,5'-decamethyl ferrocene, 677.3 milligrams of TINUVIN 384™ (Ciba Geigy), 17.6 grams of 1:10 2(hydroxy)-ethyl methacrylate: methacrylate copolymer, 0.24 milligrams of dibutyl tin diacetate and 41 grams of propylene carbonate. This solution is stirred and heated at 85° C. for 2 hours to dissolve. To a second flask, that is being purged with nitrogen, is added 1,668.6 milligrams of 1,1'-di(octyl)-4,4'-dipyridinium bis tetrafluoroborate, 82.4 milligrams of 1,1',2,2',3,3',4,4',5,5'-decamethyl ferrocinium tetrafluoroborate, 180 milligrams of LUPRANATE™ (BASF) and 58 grams of propylene carbonate. This solution is stirred at room temperature to dissolve. The solutions are combined and mixed thoroughly. This solution is de-gassed under vacuum and then 137 micron transflective mirror elements are vacuum-filled with this solution. These mirror elements are heated to 85° C. for 2 hours to cure the polyurethane gel and then are wired to a variable voltage power supply. The transmittance of the devices is altered at various potentials and color measurements are taken. The construction of the electrochromic transflective mirror element, configured with LED backlighting, for Example 17, is described below.

For the above Examples 1-13 electrochromic cells were constructed as follows. A layer of ITO of approximately 145 nm thickness was deposited on sheets of approximately 1.6 mm soda lime float glass prior to being cut to the shape of an inside automotive mirror. Layers of $TiO_2$ of approximately 45 nm and ITO of approximately 22 nm were successively deposited forming a bi-layer on sheets of 1.6 mm soda lime float glass prior to being cut to the shape of an inside automotive mirror. On the pieces of glass having the coatings of $TiO_2$ and ITO, additional coatings were deposited having a somewhat complicated profile as described below. Onto the $TiO_2$/ITO bi-layer, a layer of chrome was deposited. This layer had a thickness of approximately 50 nm outside of the region in front of the display device and was not deposited in front of the display device. Onto the chrome layer and additional layer of ruthenium was deposited. This layer had a thickness of approximately 5.0 nm outside the region in front of the display and was not deposited in front of the display device. Next, a layer of silver/gold alloy (93% silver/7% gold) was deposited. This layer had a thickness of approximately 9 nm outside the region in front of the display device and a thickness of approximately 16 nm in front of the display device. In addition, there was a gradient to the layers of chrome, ruthenium, and silver/gold alloy between the areas in front of the display device and away from the display device such that the reflectance difference between the two areas are not readily discernable to an observer. The techniques for obtaining a gradient with good aesthetic transition are in accordance with the teachings of U.S. Patent Application Publication No. 2009/0207513, entitled, "MULTI-ZONE MIRRORS." Reference can also be made to FIGS. 35 and 36 and the accompanying text. On the ITO coated side of the piece of glass (i.e., surface two in the completed element), a bead of epoxy containing spacers was deposited, this was laid up onto the second piece such that the coated surfaces face one another (i.e., the reflective surface would be the third surface of the electrochromic element) and so that an opening remained to facilitate the vacuum fill of the electrochromic medium, such that there remained an offset between the glass pieces allowing for electrical connection. The epoxy was cured and the elements were then filled with the electrochromic medium (fluid/gel) systems described in Examples 1-13 and plugged with a UV cured material.

For the above Examples 14-16 electrochromic cells were constructed as follows. A layer of ITO of approximately 115 nm thickness was deposited on sheets of approximately 1.6 mm soda lime float glass prior being cut to the shape of an inside automotive mirror. Layers of $TiO_2$ of approximately 45 nm and ITO of approximately 22 nm were successively deposited forming a bi-layer on separate sheets of 1.6 mm soda lime float glass prior to being cut to the shape of an inside automotive mirror. On the piece of glass having the coatings of $TiO_2$/ITO bi-layer an additional coating of silver/gold alloy (93% silver/7% gold) was deposited to a thickness of approximately 23 nm. Onto the ITO coated side of the piece of glass (i.e., surface two in the completed element), a bead of epoxy containing spacers was deposited, this was laid up to the second piece such that the reflective surfaces faced one another (i.e., the reflective surface would be the third surface of the electrochromic element) and so that an opening remained to facilitate the vacuum fill of electrochromic medium and such there remained an offset between the glass pieces allowing for electrical connection. The epoxy was cured and the elements were then vacuum backfilled with the electrochromic medium (fluid/gel) systems described in Examples 14-16 and plugged with a UV cured material.

For the above Example 17 electrochromic assembly was constructed as follows. A layer of ITO of approximately 115 nm was deposited on sheets of approximately 1.6 mm soda lime float glass prior to being cut to the shape of an inside automotive mirror. Onto the ITO coated side of one of the pieces of glass (i.e., surface two of the completed element), a bead of epoxy containing spacers was deposited, this was laid up onto the second similar piece so that the coated surfaces faced one another and so that there was an opening remained to facilitate the vacuum fill of the electrochromic medium, such that there remained an offset between the glass pieces allowing for electrical connection. The epoxy was cured and the element was then vacuum backfilled with the electrochromic medium (fluid/gel) system described in Example 17 and plugged with a UV cured material. An anisotropic polymer film "DBEF-Q" available from 3M corporation was also cut to mirror shape. The DBEF-Q film was then laminated (i.e., at approximately 105° C. at approximately 190 psig) between the electrochromic element described above and an approximately 1.1 mm piece of soda lime glass cut to the shape of an inside mirror in accordance with teachings found in U.S. Patent Application Publication No. 2010/0110553, entitled "REARVIEW MIRROR ASSEMBLIES WITH ANISOTROPIC POLYMER LAMINATES," the entire reference hereby being incorporated herein by reference. This additional glass had coatings on the surface that is in contact with the DBEF-Q film. The coating deposited on the glass surface was a layer of $TiO_2$ of approximately 55 nm and a layer of ITO of approximately 5 nm was deposited onto the layer of $TiO_2$ forming a bi-layer. A layer of chrome of approximately 50 nm was deposited onto the $TiO_2$/ITO bi-layer in the areas that are not in front of the display device. This layer of chrome has a graded thickness in the area around the display. The DBEF-Q film was oriented such that its polarization of high transmittance was lined up with the polarization of the display device in accordance with teachings found in the above-referenced U.S. Patent Application Publication No. 2010/0110553.

Photopic measurements wherein described were taken with equipment known commonly in the industry as MacBeth Color Eye 7000A Spectrophotometer, Ocean Optics USB 4000 Spectro radiometer and Photo Research PR-705 Spectro radiometer. The Photopic instrument incident angle is orientated perpendicular to the mirror front surface at normal zero degrees (0°) horizontal, zero degrees (0°) vertical of a distance approximately fourteen inches (14 in) away from the front surface of the mirror. Individual colors were produced with standard LED light source NICHIA™ NSSW064A shined through the display LTA035B3J1F which is fully driven in color modes red, green, blue, amber, and yellow.

LTA035B3J1F is a normally white Active Matrix TFT display and the white state is considered non-driven from the display point of view.

The above embodiments and examples are particularly well suited for primaries that have relatively broad widths. Many displays are often constructed with light sources and liquid crystals optimized for high brightness. As stated above this generally requires that the red, green, and blue primaries have a relatively wide bandwidth to maximize the light transmittance. When coupled with a white light source this approach can lead to displays with high light intensity levels. The trade-off is lower color accuracy of the display due to the wide bandwidths of the primaries. The electrochromic chemistry discussed and defined above with respect to the electrochromic element provides relatively uniform light attenuation during the darkening excursions (e.g., lowering the transmittance state) of the electrochromic media. This allows the electrochromic system to maintain color accuracy in the high transmittance, low transmittance, and the intermediate states.

Figures 23, 24:
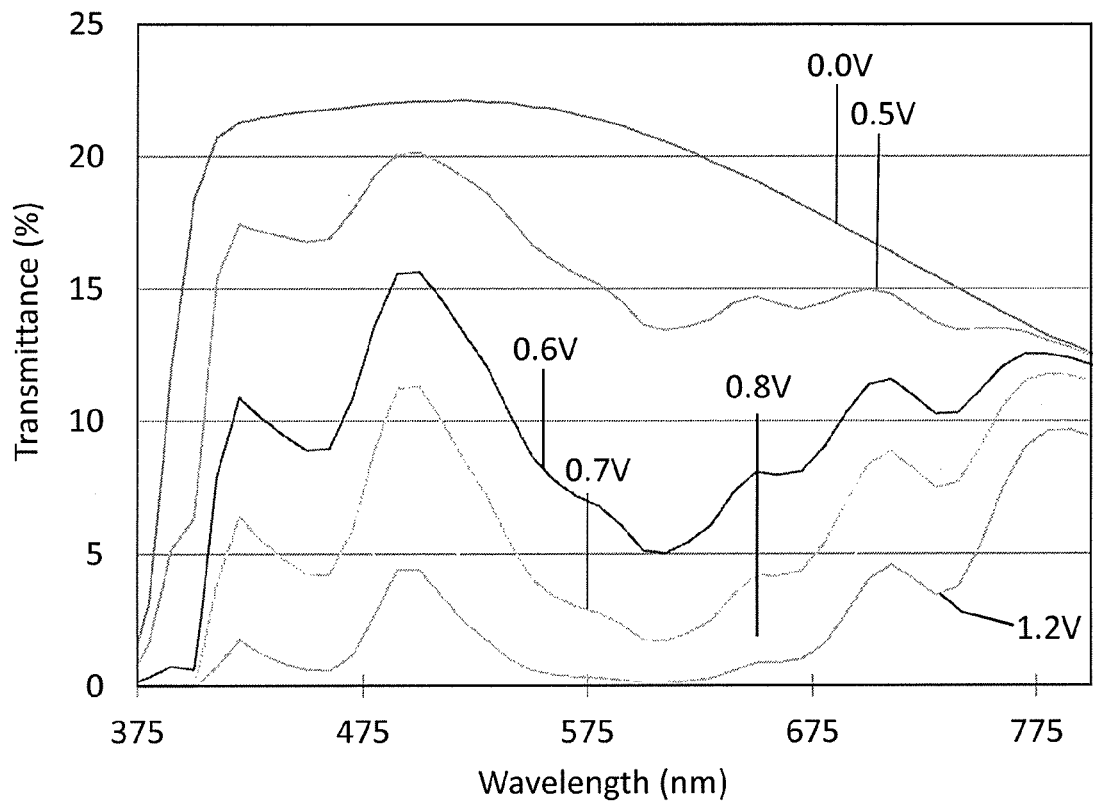
FIG. 23 is a chart illustrating examples of transmittance at various wavelengths in an electrochromic system at various applied potentials, in accordance with one embodiment of the present invention.
FIG. 24 is a table illustrating $\Delta E_{u',v'}$ for exemplary primaries, in accordance with one embodiment of the present invention.

FIG. 23 illustrates the transmittance of the electrochromic system 138 with various applied potentials. The 0.0 V curve is the high transmittance case while the 1.2 V curve is the low transmittance state. The intermediate states are noted with the applied potentials (i.e., the 0.5 V curve, the 0.6 V curve, the 0.7 V curve, and the 0.8 V curve). The data of FIG. 23 was simulated using thin film models. The electrochromic element 134 was modeled with two 1.6 mm thick pieces of glass. The ITO layer on the second surface 112b was 145 nm thick (½ wave), the transflective electrode on the third surface 114a has a 45 nm $TiO_2$ layer directly on the glass, an 18 nm ITO layer on the $TiO_2$ layer and a 25 nm silver gold alloy layer on the ITO layer. The electrochromic model was set at 190 microns and the optical constants of the fluid are comparable to the prior art reference in Example 1 above. As shown in FIG. 23, the transmittance spectra has varying transmittance versus wavelength at the different applied potentials. The non-equivalent transmittance spectra result in non-uniform modulation of the RGB primaries resulting in color shifts, as discussed in detail herein.

As can be seen from FIG. 23, it does not appear that dual or more primaries can be selected that will maintain color accuracy since the change in transmittance with applied potential changes dramatically with wavelength. However, in accordance with an embodiment of the present invention, an alternate approach to broad primaries is to use narrow primaries. Some types of LEDs provide a narrow wavelength distribution. For the examples below the wavelength bandwidth for the primaries was set to 5 nm or less full width half max. It should be appreciated that alternate wavelength bandwidths are possible. The exemplary color below is in the u',v' system with an approximately 10 degree observer.

Figure 25:
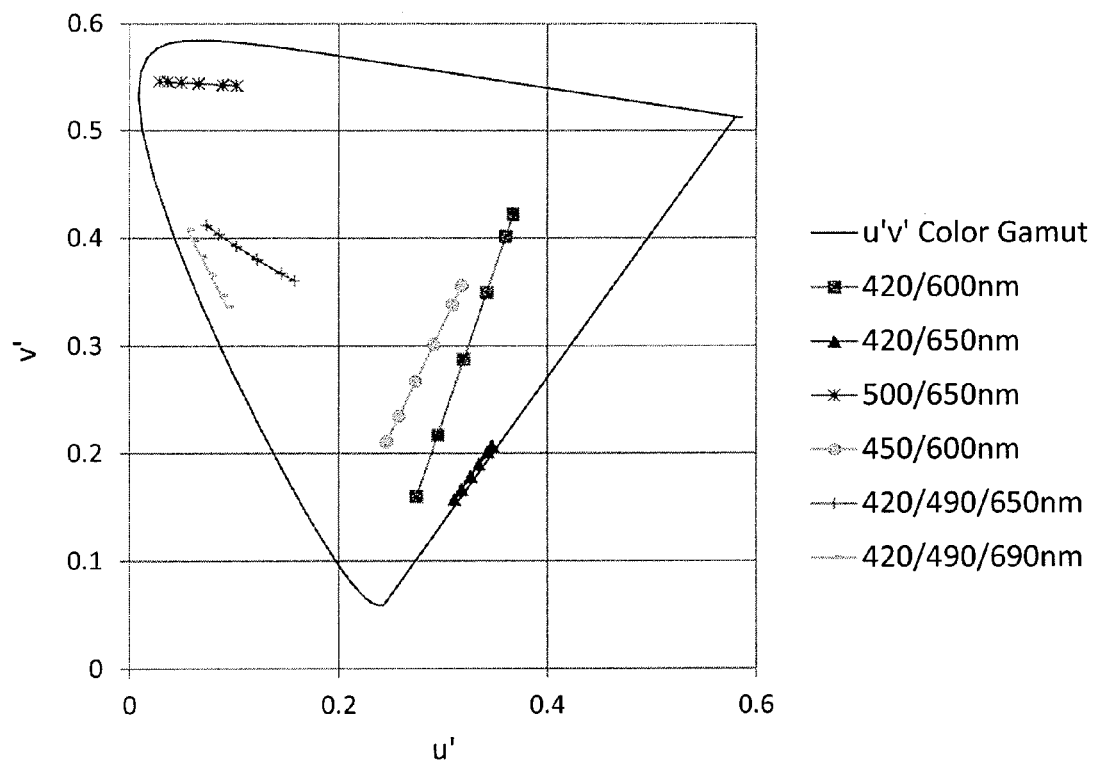
FIG. 25 is a chart illustrating examples of u',v' values at various wavelength combinations, in accordance with one embodiment of the present invention.

The use of narrow primaries is not a universal solution. For the electrochromic system 138 having the characteristics of FIG. 23, we have determined that only a very narrow set of primary combinations can preserve color accuracy during the darkening excursion for an electrochromic system 138 or other electro-optic system. The table of FIG. 24 and the chart of FIG. 25 illustrate the color $\Delta E_{u',v'}$ values between the high transmittance states and the intermediate states. The primary pairs or triplets in this example are a sample of the possible primary combinations wavelength pairs. These are meant to be representative of the high $\Delta E_{u',v'}$ values that will arise with random pairings of primaries.

Figure 26:
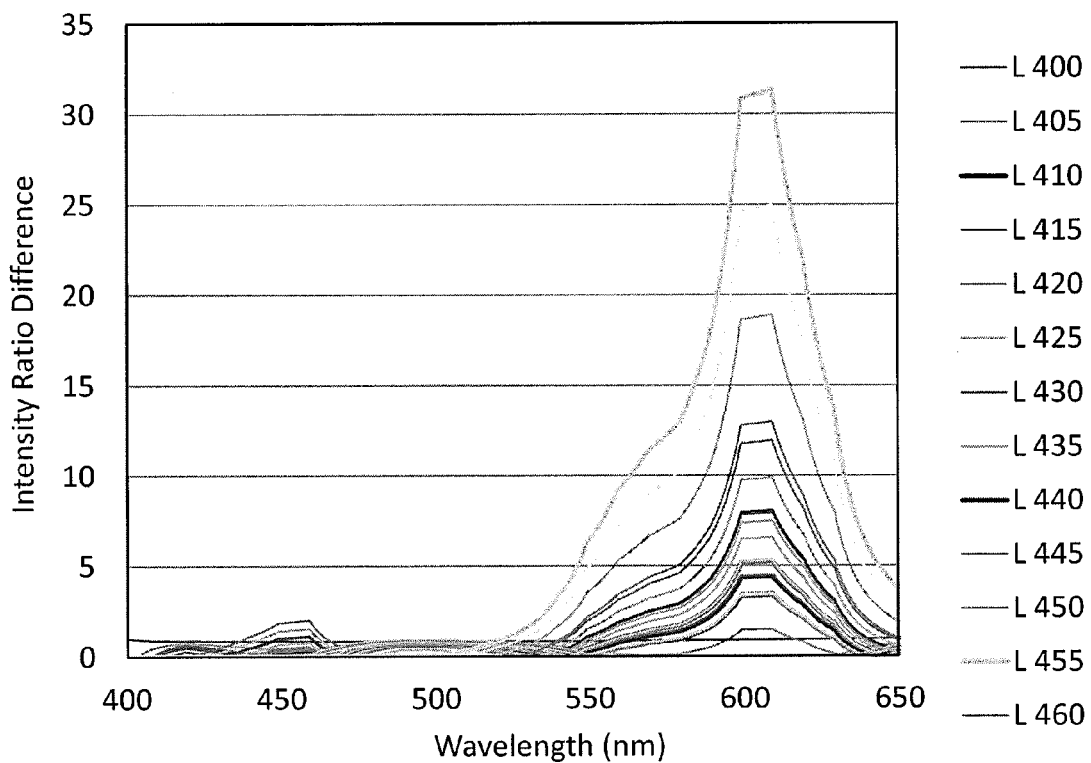
FIG. 26 is a chart illustrating exemplary intensity ratio differences at various wavelengths, in accordance with one embodiment of the present invention.
Figure 27:
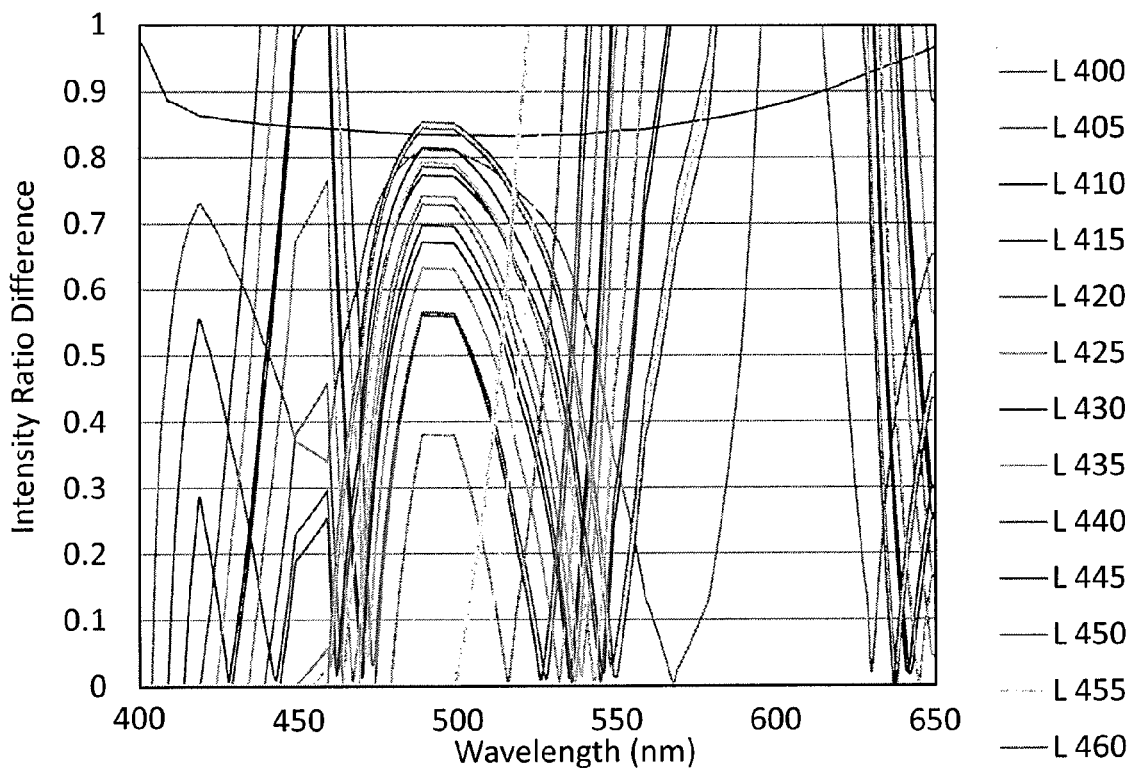
FIG. 27 is a chart illustrating exemplary intensity ratio differences at various wavelengths, in accordance with one embodiment of the present invention.

A method was developed to determine viable primaries whose relative intensities do not change to a large extent during the darkening excursion. The ratio of intensities of potential primary pairs can be calculated for the high and low transmittance states and then compared. By way of explanation and not limitation, the intensity ratio was calculated for 400 nm to every wavelength from 401 nm to 675 nm for each nanometer wavelength. The calculations were then repeated for 405, 410, ... 500 nm instead of the 400 nm primary. FIGS. 26 and 27 (same information on different vertical scales) show the calculated difference in intensities for the high and low transmittance states. Suitable primaries are obtained when the difference is approximately zero.

As can be determined from FIGS. 26 and 27, the vast majority of potential primary pairs have intensity ratio differences that are relatively high. In order to have relatively low $\Delta E_{u',v'}$ values over the darkening excursion, the difference in the intensity ratios can be less than 0.75. Alternatively, the differences in the intensity ratio can be less than 0.50 or less than 0.25. It can be beneficial to select primary pairs wherein the intensity ratio differences are near zero. For this condition the primary pairs are most stable and will be more robust in practice.

Figure 28:
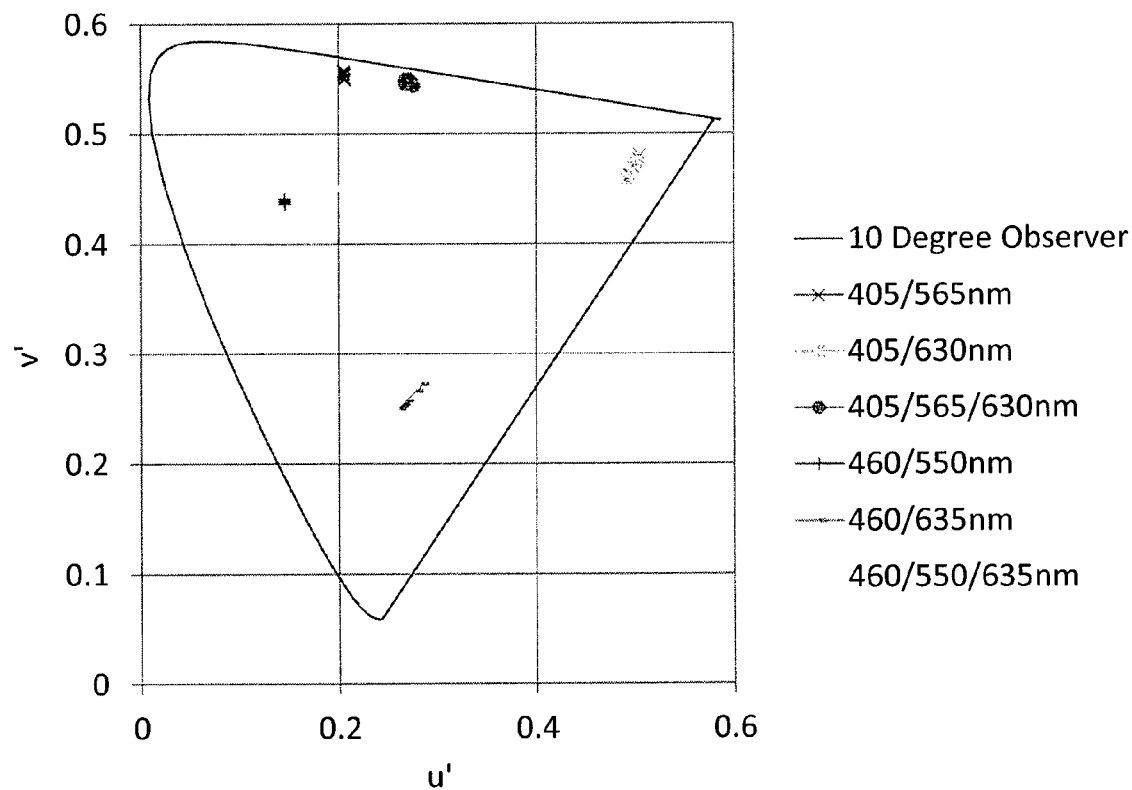
FIG. 28 is a chart illustrating examples of u',v' values at various wavelength combinations, in accordance with one embodiment of the present invention.

FIG. 28 shows the color for optimal primary pairs and triplets whose color is stable over the darkening excursion of the electrochromic medium 126. Pairs 405/565, 405/630, 460/550, 460/635 and triplets 405/565/630 and 460/550/635 exhibit small $\Delta E_{u',v'}$ values over the darkening excursion. The table of FIG. 29 shows the $\Delta E_{u',v'}$ values for these primary combinations.

Figures 29, 30:
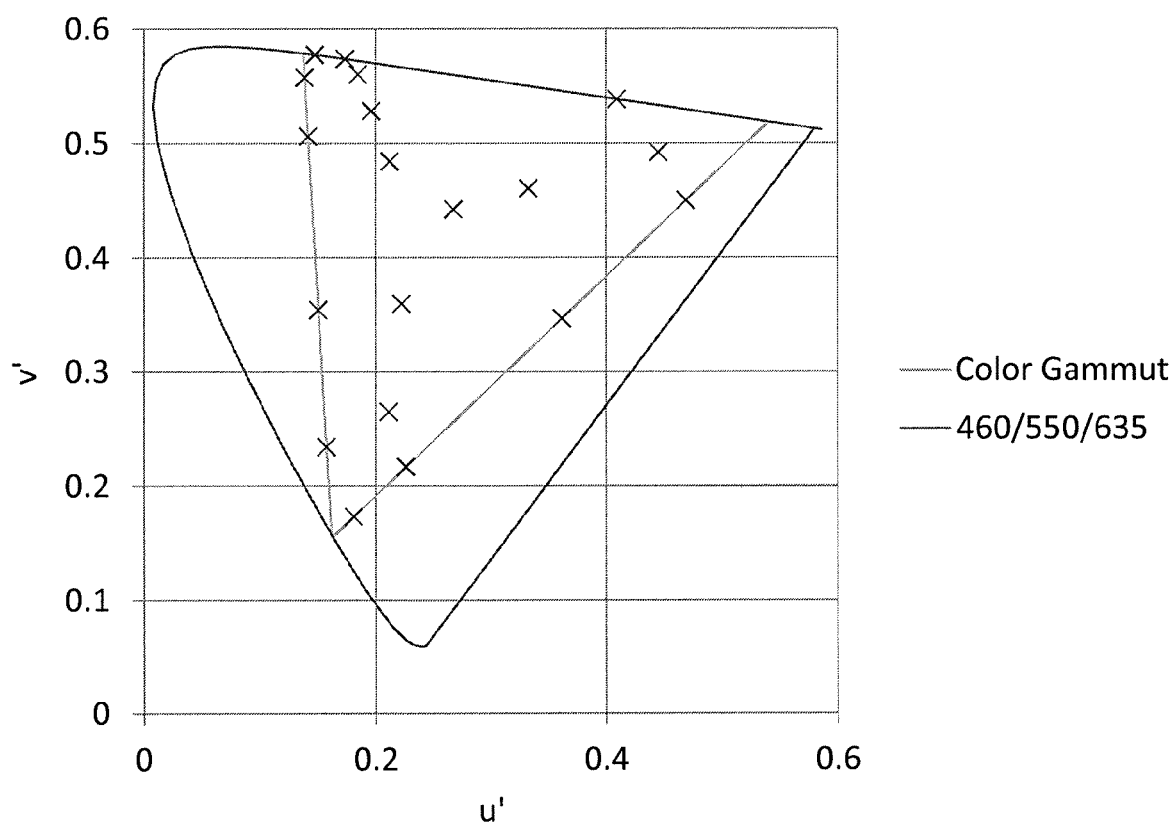
FIG. 29 is a table illustrating $\Delta E_{u',v'}$ for exemplary primaries, in accordance with one embodiment of the present invention.
FIG. 30 is a chart illustrating examples of u',v' values at various wavelengths, in accordance with one embodiment of the present invention.

The color gamut for the 460/550/635 triplet is shown in FIG. 30. The triangle defines the attainable colors possible with this primary system. The dots (or "x") represent colors attained by adjusting the intensity levels of the primaries. The table of FIG. 31 illustrates the relative intensities of the primaries, an average $\Delta E_{u',v'}$, and the maximum $\Delta E_{u',v'}$ for the points shown in FIG. 30.

The color stability for this technique can be dependent on the transmittance characteristics of the electrochromic medium 126 and the width of the primaries. Depending on the transmittance spectra versus applied potential one or more primary combinations may be viable for a given system.

Additionally or alternatively, the coatings or stacks of the electrochromic element 134 can be configurable to compensate for the adverse affects on color rendering that are caused by the light viewed through other components of the electrochromic element 134. Exemplary coating stacks are described in U.S. Provisional Patent Application Ser. No. 60/779,369, entitled "COATINGS AND REARVIEW ELEMENTS INCORPORATING THE COATINGS," U.S. Provisional Patent Application Ser. No. 60/810,921, entitled "ELECTROCHROMIC REARVIEW MIRROR ASSEMBLY INCORPORATING A DISPLAY/SIGNAL LIGHT," and U.S. Provisional Patent Application Ser. No. 60/888,686, entitled "ELECTRO-OPTIC ELEMENT WITH IMPROVED TRANSPARENT CONDUCTOR," the entire references hereby incorporated herein by reference.

One exemplary stack can have a reflectance of approximately sixty percent to sixty-five percent (60%-65%), a transmittance of approximately twenty percent to twenty-five percent (20%-25%) and a non-opaque coating, such that a bright display device can be in optimal communication behind the rear element 114 without utilizing a hard mask. The exemplary stack can have a display zone with a reduced reflectance to increase transmittance, and an opaque appliqué. Another exemplary stack has a transflective region and a non-transflective, hard masked region. Yet another exemplary state has a reflectance display zone of approximately sixty-five percent (65%) and a non-display, opaque area.

Figure 18:
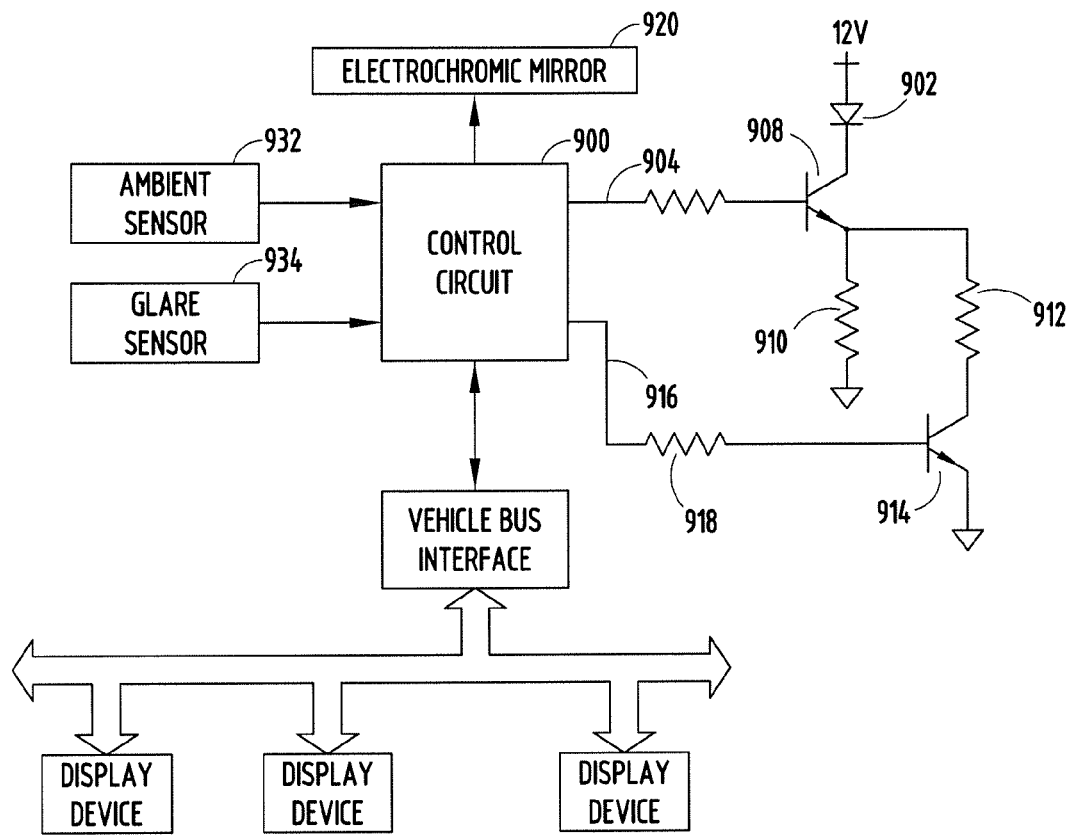
FIG. 18 is an electrical circuit diagram in block and schematic form for controlling a contrast ratio of a display associated with an electrochromic mirror, in accordance with one embodiment of the present invention.

To increase the dynamic range, a control circuit constructed in accordance with the present invention utilizes two or more different current ranges for driving the LED display depending upon whether nighttime or daytime conditions are present. An exemplary control circuit for performing this function is shown in FIG. 18. As illustrated, the circuit includes a control circuit 900, which may include a microprocessor also functioning as an inside mirror control circuits, which is coupled to an ambient light sensor 932, a glare sensor 934, and an electrochromic element 920 having a construction similar to those disclosed above. Thus, control circuit 900 may perform various control functions for controlling the reflectivity of electrochromic mirror element 920 in response to light levels sensed by ambient sensor 932 and glare sensor 934.

One of the purposes of the circuit shown in FIG. 18 is to control the brightness of one or more LEDs 902 of an indicator, signal light, or display. In general, the brightness of light emitted from an LED is a function of the current flowing through the LED. Control circuit 900 controls the amount of current flowing through LED 902 by generating a pulse-width modulated signal 904 that is provided through a resistor 906 to the base of a current-sourcing transistor 908. The source of transistor 908 is coupled to LED 902 and the drain is coupled to ground via a resistor 910. The drain of transistor 908 is selectively coupled to ground via another current path through a resistor 912 and a switching transistor 914. The resistance of second resistor 912 is preferably significantly less than the resistance of resistor 910 such that when switching transistor 914 is conducting, the amount of current flowing through sourcing transistor 908 and LED 902 is significantly increased. The conducting status of switching transistor 914 is controlled in accordance with a day/night signal 916 issued from control circuit 900 and supplied to the base of transistor 914 via a resistor 918.

Although the above-described circuit is utilized for controlling one or more LEDs of a display, a similar arrangement may be configured for controlling the brightness of various other forms of displays that may be utilized within a rearview mirror assembly or other vehicle accessory.

The various embodiments of the electrochromic medium 126 of the present invention taught above enable neutral and stable color in the high transmittance state, the low transmittance state, and the intermediate states for transmitted light. In some embodiments it may also beneficial for the electrochromic system 138 to have neutral reflected color in the high reflectance state, the low reflectance state, and the intermediate states. The neutral reflected color provides a desirable aesthetic appearance of the mirror as well as rendering the true colors of the objects in the reflected images. As described above, the electrochromic system 138 can be configured to reduce a perceived color change of transmitted light as the electrochromic medium 126 alters between transmittance states. Generally, the reflected light can be ambient light that is light other than the light emitted from the display device 136. The electrochromic system 138 can also be configured to reduce a perceived color change of reflected light as the electrochromic medium 126 alters between transmittance states.

The reflected color is based on the summation of the reflectance of the light at each optical interface in the electrochromic system 138. Each surface of the glass is an optical interface. The reflectance at each surface is determined by the refractive index of the incident media, the refractive index of the exit media, and any coating present on the surfaces. For the first surface 112a, the incident media is air, and the exit media is the substrate, (i.e., glass and typically no coatings are present). For the second surface 112b, the incident media is glass, the exit media is the electrochromic medium 126, and there may be coatings present, such as ITO or an IMI stack. The third surface 114a has the electrochromic medium 126 as the incident media, the glass as the exit media, and in some embodiments, the transflective reflector electrode. The fourth surface 114b typically has glass as the incident media, air as the exit media, and no coatings. In other embodiments, the first surface 112a and fourth surface 114b may have one or more coatings present, or the third surface 114a can have a transparent electrode and the transflective coating may be present on the fourth surface 114b. The reflectance at each interface will vary with properties of the bounding media and any coatings present. The light from each interface adds together for each wavelength and the resultant spectrum determines the intensity of the light and the color.

When the electrochromic element 134 is in the high transmittance and reflectance state, the reflectance spectrum can be typically dominated by the reflectance of the transflector coating. In intermediate transmittance or reflectance states the reflectance can be dominated by the light from different interfaces depending on the specific absorption properties of the electrochromic medium 126. When the electrochromic element 134 is in approximately the fully low transmittance state, with a minor contribution of light from the reflector on either the third surface 114a or the fourth surface 114b reaching the observer, the appearance of the electrochromic system 138 is due mainly to a combination of light from the first and second surfaces 112a, 112b of the front substrate 112. With no coating on the first surface 112a, about four percent (4%) reflectance of relative uniform intensity across the visible spectrum from the uncoated glass interface is obtained. Reflected color is therefore primarily due to thin film interference effects from the transparent electrode on the second surface 112b.

The reflected color of the transparent conducting oxide or transparent electrode (IMI) on the second surface 112b, in one embodiment, can be due primarily from the thickness of the layer. As the thickness of the TCO is increased, the color changes. The color can be further altered by adding additional layers either above or below the TCO. A portion of the above referenced patents teach methods for reducing the color of TCO and other coatings. Materials used for transparent second surface conductive electrodes are typically materials with an approximately 1.8 index of refraction, or greater. The color impact of these conductive electrode materials can be reduced by using half wave thickness multiples, using the thinnest layer possible (or a layer with reduced thickness) for the application or by the use of one of several "non-iridescent glass structures." Non-iridescent structures will typically use either a high and low index layer under the conductive coating (see, for example, U.S. Pat. No. 4,377,613, entitled "NON-IRIDESCENT GLASS STRUCTURES," and U.S. Pat. No. 4,419,386, entitled "NON-IRIDESCENT GLASS STRUCTURES,"), or an intermediate index layer (see U.S. Pat. No. 4,308,316, entitled "NON-IRIDESCENT GLASS STRUCTURES," or U.S. Pat. No. 5,395,698, entitled "NEUTRAL, LOW EMISSIVITY COATED GLASS ARTICLES AND METHOD FOR MAKING,") or graded index layer (see U.S. Pat. No. 4,440,822, entitled "NON-IRIDESCENT GLASS STRUCTURES") to reduce color impact. IMI transparent electrodes are also referenced in a portion of the above referenced patents, wherein the reflected color in the dark state and how to alter it is addressed.

As noted above, the reflectance of the electrochromic element 134 in the low transmittance state is affected by the thickness of the TCO and whether other layers are present in the coating stack. As a result of the absorption in ITOs or other TCOs being fairly low, there is little color change in the bright state of the mirror due to thickness changes in the layer. Similarly, in a window, the ITO does not contribute substantially to the transmitted color nor is color tuning by adjusting the ITO a primary option for altering the reflected or transmitted color. In other embodiments, the absorption or transmittance characteristics of the TCO or IMI coating may be adjusted or tuned to specifically help address a deficiency due to the characteristics of another component, as discussed in greater detail herein.

Another design attribute desirable in some embodiments of the electrochromic system 138 is to have a very low reflectance in the low transmittance state as well as a neutral color. This can result in an increased or maximum dynamic range for the mirror elements. The table of FIG. 34A depicts the dark state reflectance values, color, and C* values for the electrochromic device 138 as a function of the ITO thickness calculated using thin film models. In this example, the electrochromic medium 126 is set to be substantially opaque. When the electrochromic medium 126 is not completely opaque, the reflected light from the mirror coating can add to the reflectance in FIG. 34A. As depicted, the low transmittance state reflectance can reach a minimum at about 140 to 150 nm or a ½ wave coating with a design wavelength of 550 nm. As the thickness deviates from this half wave thickness, the low transmittance state reflectance rises and the dynamic range decreases. The reflected color varies with the thickness of the ITO coating. The C* values vary also with the thickness. The most neutral color happens with a thickness less than that of a common half wave thickness (130 nm versus 150 nm).

Figure 16A:
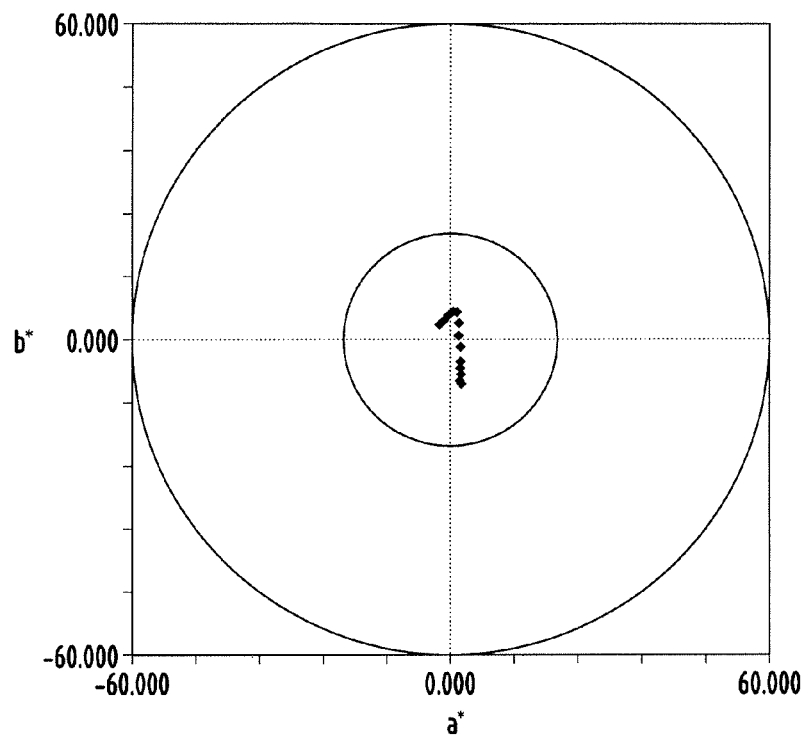
FIG. 16A is a chart illustrating a reflected color of an electrochromic system as an electrochromic medium alters transmittance states, in accordance with one embodiment of the present invention.
Figure 16B:
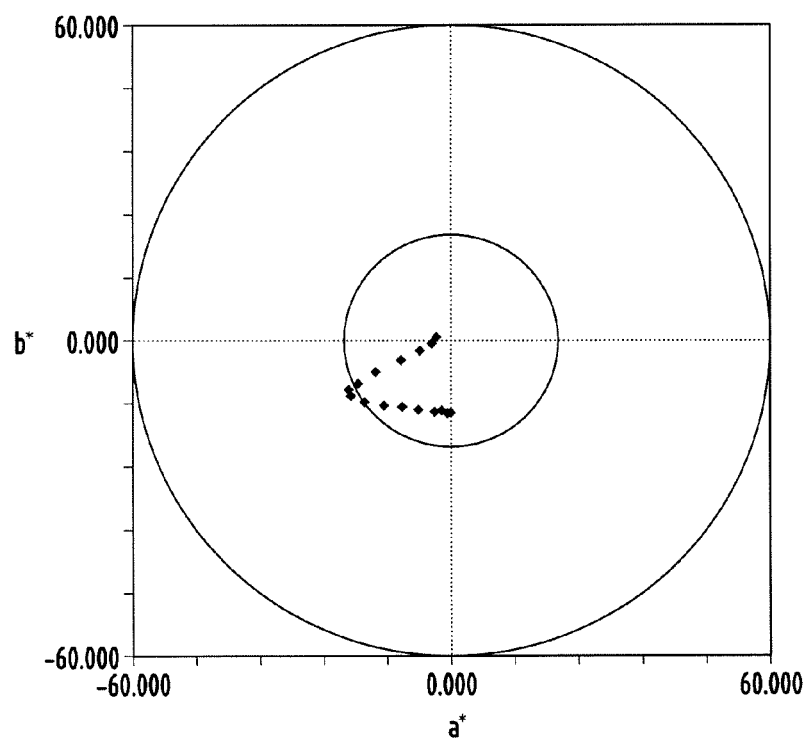
FIG. 16B is a chart illustrating a reflected color of a prior art electrochromic element as an electrochromic medium alters transmittance states.

An exemplary illustration of reflected color change of the electrochromic system 138 is illustrated in FIG. 16A, which corresponds to Example 14 with neutral chemistry and that includes an approximately 130 nm thickness ITO coating on the second surface 112b. This curve illustrates the perceived color change as the electrochromic medium 126 is altered from approximately the high transmittance state to approximately the low transmittance state. The curves remaining proximate the origin with a low C* value through the darkening curve and a particularly low C* value in the fully low transmittance state. This can be compared to the prior art curves illustrated in FIG. 16B which corresponds to Example 1 with the prior art electrochromic medium and a 150 nm ITO coating on the second surface. FIG. 16B has an increased perceived color change of the reflected light when the electrochromic medium is altering between the high transmittance state and the low transmittance state relative to FIG. 16A. The C* of the reflected light for the electrochromic system 138 can be less than approximately twenty (20), at one or more of the reflectance and/or transmittance states. Alternatively, the C* of the reflected light for the electrochromic system 138 can be less than approximately fifteen (15), or less than approximately ten (10) at one or more of the reflectance and/or transmittance states. Thus, the reflective components of the electrochromic element 134 can be substantially color neutral.

The above example demonstrates that the thickness of a single transparent conducting oxide layer (e.g., ITO) can be selected to have a beneficial effect on the reflected color of the electrochromic system 138. The following examples in Table 34B were calculated using thin film models. The optical constants of an electrochromic medium similar to Example 14 were used, which corresponds to an approximately fully opaque fluid. The optical contributions from the reflector electrode are therefore eliminated and do not contribute to the reflected color. Examples of three different coating stacks (color suppression) to provide neutral reflected color are presented. In each case the ITO thickness is at 149 nm, but the use of the various color suppression techniques work equally well for other thicknesses of ITO or other transparent conducting oxides.

In other embodiments, it may be advantageous to have a reflectance in the low reflectance state higher than that demonstrated by that attainable by the ITO layer within the thickness ranges described above. The electrochromic element 134 may be operated with applied potential values that do not allow the electrochromic medium 126 to attain its fully opaque state or the cell spacing of the electrochromic element 134 may be altered such that some desired level of reflectance from the reflector is obtained. Alternately, as described above, the transparent electrode stack comprising an IMI, a TCO layer, or the like may be modified to adjust the low end reflectance value. In particular, an additional layer or layers may be placed above or below the ITO or the TCO layer. In the table of FIG. 33 a single layer is placed below the ITO layer at a quarter wave thickness. It should be appreciated by other thicknesses may be chosen as needed without deviating from the spirit of the invention. The reflectance increases with increasing refractive index values. In other embodiments it may be advantageous to both increase the low end reflectance and have a relatively neutral color in the low reflectance state. In the table of FIG. 34B it is illustrated that for the different three layer stacks, the low end reflectance is altered while maintaining a neutral reflected color.

By way of explanation and not limitation, the electrochromic system 138 can be used as an auto-dimming rearview mirror in a motor vehicle. Alternatively, the electrochromic system 138 can be used as a dimming mirror in other environments. In an exemplary embodiment of a motor vehicle, the electrochromic system 138 can be configured to dim as a function of ambient and glare light. Further, the display device 136 can be configured to emit light (e.g., the one or more primaries projecting the display element), such as, but not limited to, text, symbol, or image in a plurality of colors while the electrochromic element 134 is in any transmittance state. Thus, the display device 136 can be configured to emit light to project images associated with warning systems, navigational systems, or other suitable systems integrated with the motor vehicle. The reduced perceived color change of the emitted light by a user as the transmittance state of the electrochromic medium 126 alters can be advantageous, so that the plurality of colors emitted by the display device 136 that can form the text, the image, and/or the symbols can be perceived approximately the same by the user without regard to the transmittance state of the electrochromic medium 126. Thus, the electrochromic medium 126, chamber 125, and other elements of the electrochromic element 134 can extend over the display device 136, and the electrochromic medium 126 does not have to be in a high transmittance state when the display device 136 is emitting light to the user.

By integrating a personal computer with a telematics system such as that disclosed in U.S. Pat. No. 6,980,092, entitled "VEHICLE REARVIEW MIRROR ASSEMBLY INCORPORATING A COMMUNICATION SYSTEM," of which the entire reference is hereby incorporated herein by reference, the computer monitor may be used for displaying various forms of information including e-mail messages and pages, turning indicators for navigational systems; service reminders based on speed and mileage; vehicle heading; school, hospital zone warnings, weather, traffic, and emergency vehicle warnings; night vision displays; advertisements; stock quotes; and other information. Textual messages and other alphanumeric data and/or symbols may be superimposed over the video images displayed on the display device. If the vehicle is equipped with appropriate rear vision cameras, such as disclosed and described in U.S. patent application Ser. No. 09/001,855, entitled "VEHICLE VISION SYSTEM," and U.S. Pat. No. 6,550,949, entitled "SYSTEMS AND COMPONENTS FOR ENHANCING REAR VISION FROM A VEHICLE," the entire references hereby being incorporated herein by reference, coupling such cameras to the display device 136 would allow a video display of a view at the rear of the vehicle to assist drivers while connecting the vehicle to a trailer and for proportional steering with respect to the trailer. Other graphics relating to the connection of the vehicle to a trailer may also be displayed.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An electrochromic system comprising:
    an electrochromic element comprising:
        a front element comprising first and second surfaces;
        a rear element comprising third and fourth surfaces, wherein said front and rear elements are sealably bonded together in a spaced-apart relationship to define a chamber, such that said second surface and said third surface face one another;
        a transparent first electrode comprising a layer of conductive material carried on said second surface;
        an electrochromic medium contained in said chamber, wherein said electrochromic medium is adapted to be in at least a high transmittance state and a low transmittance state; and
        an at least partially transmissive, partially reflective second electrode; and
    a display device in optical communication with said electrochromic element, said display device comprising:
        at least one light source; and
        said display device being configured to emit at least a first primary and a second primary, and said first and second primaries each having a first hue ($h_{ab}$) when viewed through said electrochromic element in approximately said high transmittance state and a second hue ($h_{ab}'$) when viewed through said electrochromic element in approximately said low transmittance state, wherein a change in said first and second hues ($\Delta h_{ab}$) for both first and second primaries is less than approximately 31 degrees.

2. The electrochromic system of claim 1, wherein said change in said first and second hues ($\Delta h_{ab}$) for both said first and second primaries is less than approximately 25 degrees.

3. The electrochromic system of claim 1, wherein said change in said first and second hues ($\Delta h_{ab}$) for both said first and second primaries is less than approximately 15 degrees.

4. The electrochromic system of claim 1, wherein each of said first and second primaries has a first color (u',v') when viewed through said electrochromic element in approximately said high transmittance state and a second color (u',v')' when viewed through said electrochromic element in approximately said low transmittance state, and a difference in said first and second colors ($\Delta E_{u',v'}$) for said first and second primaries is less than approximately 0.06.

5. The electrochromic system of claim 1, wherein said first primary is light having a red hue and said second primary is light having a green hue.

6. The electrochromic system of claim 1, wherein both said first and second primaries exhibit said change in hue ($\Delta h_{ab}$) of less than approximately 31 degrees when viewed through said electrochromic element in approximately said high transmittance state and said electrochromic element in a transmittance state intermediate to said high and low transmittance states.

7. The electrochromic system of claim 1, wherein said display device is further configured to emit a third primary having a first hue ($h_{ab}$) when viewed through said electrochromic element in approximately said high transmittance state and a second hue ($h_{ab}'$) when viewed through said electrochromic element in approximately said low transmittance state, and a change in said first and second hues ($\Delta h_{ab}$) is less than approximately 41 degrees.

8. The electrochromic system of claim 7, wherein said change in said first and second hues ($\Delta h_{ab}$) of said third primary is less than approximately 35 degrees.

9. The electrochromic system of claim 7, wherein said change in said first and second hues ($\Delta h_{ab}$) of said third primary is less than approximately 20 degrees.

10. The electrochromic system of claim 7, wherein said change in said first and second hues ($\Delta h_{ab}$) of said third primary is less than approximately 10 degrees.

11. The electrochromic system of claim 7, wherein said third primary has a first color (u',v') when viewed through said electrochromic element in approximately said high transmittance state and a second color (u',v')' when viewed through said electrochromic element in approximately said low transmittance state, and a difference in said first and second colors ($\Delta E_{u',v'}$) for said third primary is less than approximately 0.05.

12. The electrochromic system of claim 7, wherein said third primary is light having a blue hue.

13. The electrochromic system of claim 1, wherein said display device is further configured to emit a fourth primary having a first hue ($h_{ab}$) when viewed through said electrochromic element in approximately said high transmittance state and a second hue ($h_{ab}'$) when viewed through said electrochromic element in approximately said low transmittance state, and a change in said first and second hues ($\Delta h_{ab}$) is less than approximately 55 degrees.

14. The electrochromic system of claim 13, wherein said change in said first and second hues ($\Delta h_{ab}$) for said fourth primary is less than approximately 50 degrees.

15. The electrochromic system of claim 13, wherein said change in said first and second hues ($\Delta h_{ab}$) for said fourth primary is less than approximately 40 degrees.

16. The electrochromic system of claim 13, wherein said change in said first and second hues ($\Delta h_{ab}$) for said fourth primary is less than approximately 30 degrees.

17. The electrochromic system of claim 13, wherein said change in said first and second hues ($\Delta h_{ab}$) for said fourth primary is less than approximately 15 degrees.

18. The electrochromic system of claim 13, wherein said fourth primary has a first color (u',v') when viewed through said electrochromic element in approximately said high transmittance state and a second color (u',v') when viewed through said electrochromic element in approximately said low transmittance state, and a difference in said first and second colors ($\Delta E_{u',v'}$) for said fourth primary is less than approximately 0.05.

19. The electrochromic system of claim 13, wherein said fourth primary is light having a yellow hue.

20. The electrochromic system of claim 1, wherein a C* value of reflected light throughout a range of reflectance as said electrochromic element is altered between approximately said high transmittance state and approximately said low transmittance state is less than approximately 15.

21. A rearview mirror comprising:
an electro-optic element comprising:
a front element comprising first and second surfaces;
a rear element comprising third and fourth surfaces;
at least one reflective surface; and
an electro-optic medium in optical communication between said front element and said rear element, wherein said electro-optic medium is configured to adjust between at least a high transmittance state and a low transmittance state; and
a display device in optical communication with said electro-optic element, said display device comprising:
at least one light source; and
said display device being configured to emit at least a first primary and a second primary, and said first and second primaries each having a first hue ($h_{ab}$) when viewed through said electro-optic element in approximately said high transmittance state and a second hue ($h_{ab}'$) when viewed through said electro-optic element in approximately said low transmittance state, wherein a change in said first and second hues ($\Delta h_{ab}$) for both first and second primaries is less than approximately 31 degrees.

22. The rearview mirror of claim 21, wherein said change in said first and second hues ($\Delta h_{ab}$) for both said first and second primary primaries is less than approximately 25 degrees.

23. The rearview mirror of claim 21, wherein said change in said first and second hues ($\Delta h_{ab}$) for both said first and second primaries is less than approximately 15 degrees.

24. The rearview mirror of claim 21, wherein each of said first and second primaries has a first color (u',v') when viewed through said electro-optic element in approximately said high transmittance state and a second color (u',v')' when viewed through said electro-optic element in approximately said low transmittance state, and a difference in said first and second colors ($\Delta E_{u',v'}$) for said first and second primaries is less than approximately 0.06.

25. The rearview mirror of claim 21, wherein said first primary is light having a red hue and said second primary is light having a green hue.

26. The rearview mirror of claim 21, wherein both said first and second primaries exhibit said change in hue ($\Delta h_{ab}$) of less than approximately 31 degrees when viewed through said electro-optic element approximately in said high transmittance state and said electro-optic element in a transmittance state intermediate to said high and low transmittance states.

27. The rearview mirror of claim 21, wherein said display device is further configured to emit a third primary having a first hue ($h_{ab}$) when viewed through said electro-optic element in approximately said high transmittance state and a second hue ($h_{ab}'$) when viewed through said electro-optic element in approximately said low transmittance state, and a change in said first and second hues ($\Delta h_{ab}$) is less than approximately 41 degrees.

28. The rearview mirror of claim 27, wherein said change in said first and second hues ($\Delta h_{ab}$) of said third primary is less than approximately 35 degrees.

29. The rearview mirror of claim 27, wherein said change in said first and second hues ($\Delta h_{ab}$) of said third primary is less than approximately 20 degrees.

30. The rearview mirror of claim 27, wherein said change in said first and second hues ($\Delta h_{ab}$) of said third primary is less than approximately 10 degrees.

31. The rearview mirror of claim 27, wherein said third primary has a first color (u',v') when viewed through said electro-optic element in approximately said high transmittance state and a second color (u',v')' when viewed through said electro-optic element in approximately said low transmittance state, and a difference in said first and second colors ($\Delta E_{u',v'}$) for said third primary is less than approximately 0.05.

32. The rearview mirror of claim 27, wherein said third primary is light having a blue hue.

33. The rearview mirror of claim 21, wherein said display device is further configured to emit a fourth primary having a first hue ($h_{ab}$) when viewed through said electro-optic element in approximately said high transmittance state and a second hue ($h_{ab}'$) when viewed through said electro-optic element in approximately said low transmittance state, and a change in said first and second hues ($\Delta h_{ab}$) is less than approximately 55 degrees.

34. The rearview mirror of claim 33, wherein said change in said first and second hues ($\Delta h_{ab}$) for said fourth primary is less than approximately 50 degrees.

35. The rearview mirror of claim 33, wherein said change in said first and second hues ($\Delta h_{ab}$) for said fourth primary is less than approximately 40 degrees.

36. The rearview mirror of claim 33, wherein said change in said first and second hues ($\Delta h_{ab}$) for said fourth primary is less than approximately 30 degrees.

37. The rearview mirror of claim 33, wherein said change in said first and second hues ($\Delta h_{ab}$) for said fourth primary is less than approximately 15 degrees.

38. The rearview mirror of claim 33, wherein said fourth primary has a first color (u',v') when viewed through said electro-optic element in approximately said high transmittance state and a second color (u',v')' when viewed through said electro-optic element in approximately said low transmittance state, and a difference in said first and second colors ($\Delta E_{u',v'}$) for said fourth primary is less than approximately 0.05.

39. The rearview minor of claim 33, wherein said fourth primary is light having a yellow hue.

40. The rearview minor of claim 21, wherein a C* value of reflected light throughout a range of reflectance as said electro-optic medium is altered between approximately said high transmittance state and approximately said low transmittance state is less than 15.

41. A electrochromic system comprising:
an electrochromic element comprising:
a front element comprising first and second surfaces;
a rear element comprising third and fourth surfaces, wherein said front and rear elements are sealably bonded together in a spaced-apart relationship to define a chamber, such that said second surface and said third surface face one another;
a transparent first electrode comprising a layer of conductive material carried on said second surface;
an electrochromic medium contained in said chamber, wherein said electrochromic medium is adapted to be in at least a high transmittance state and a low transmittance state; and
a partially transmissive, partially reflective layer; and
a display device in optical communication with said electrochromic element, said display device comprising:
at least one light source; and
said display device being configured to emit at least one primary that is light having at least one of a yellow hue and an amber hue, and said at least one primary having a first hue ($h_{ab}$) when viewed through said electrochromic element in approximately said high transmittance state and a second hue ($h_{ab}'$) when viewed through said electrochromic device in approximately the low transmittance state, wherein a change in said first and second hues ($\Delta h_{ab}$) is less than approximately 55 degrees.

42. An electrochromic system comprising:
an electrochromic element comprising:
- a front element comprising first and second surfaces;
- a rear element comprising third and fourth surfaces, wherein said front and rear elements are sealably bonded together in a spaced-apart relationship to define a chamber, such that said second surface and said third surface face one another;
- a transparent first electrode comprising a layer of conductive material carried on said second surface;
- an electrochromic medium contained in said chamber, wherein said electrochromic medium is adapted to be in at least a high transmittance state and a low transmittance state; and
- a partially transmissive, partially reflective layer; and a display device in optical communication with said electrochromic element, said display device comprising:
- at least one light source; and
- said display device being configured to emit a primary that is light having a blue hue, and said primary having a first hue ($h_{ab}$) when viewed through said electrochromic element in approximately said high transmittance state and a second hue ($h_{ab}'$) when viewed through said electrochromic device in approximately the low transmittance state, wherein a change in said first and second hues ($\Delta h_{ab}$) is less than approximately 49 degrees.

* * * * *

UNITED STATES PATENT AND TRADEMARK OFFICE
CERTIFICATE OF CORRECTION

PATENT NO. : 8,228,590 B2  
APPLICATION NO. : 12/852790  
DATED : July 24, 2012  
INVENTOR(S) : Kelvin L. Baumann et al.

Page 1 of 2

It is certified that error appears in the above-identified patent and that said Letters Patent is hereby corrected as shown below:

On the Title Page, item [75] Inventors;

"Henry W. Luten, Holland, MI (US)" should be --Henry A. Luten, Holland, MI (US)--;

In the Specification;

Col. 4, line 62;

"line thereof," should be --line III-III thereof,--,

Col. 13, line 4;

"a denotes" should be --a * denotes--,

Col. 16, line 20;

"degrees) (55°)" should be --degrees (55°)--,

Col. 29, line 6;

"minor" should be --mirror--,

Col. 30, line 41;

"minor" should be --mirror--,

Col. 31, line 34;

"5,10-dineopentyl-5,10-dihydro-2,7-[2-(ethyl)hexyl]" should be --5,10-dineopentyl-5,10-dihydro-2,7[2-(ethyl)hexyl]--, In the Claims;

Col. 43, claim 1, line 49;

"($h_{ab}$)" should be --$h_{ab}'$--,

Signed and Sealed this  
Twenty-sixth Day of August, 2014

Michelle K. Lee  
*Deputy Director of the United States Patent and Trademark Office*

Col. 46, claim 39, line 38;

"minor" should be --mirror--,

Col. 46, claim 40, line 40;

"minor" should be --mirror--.